(12) United States Patent
Ghuman

(10) Patent No.: US 12,199,743 B2
(45) Date of Patent: Jan. 14, 2025

(54) OPTICAL COMMUNICATIONS MODULE LINK EXTENDER INCLUDING ETHERNET AND PON AMPLIFICATION

(71) Applicant: Cox Communications, Inc., Atlanta, GA (US)

(72) Inventor: Harjinder Ghuman, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 156 days.

(21) Appl. No.: 17/813,208

(22) Filed: Jul. 18, 2022

(65) Prior Publication Data

US 2022/0353004 A1    Nov. 3, 2022

Related U.S. Application Data

(63) Continuation-in-part of application No. 17/401,968, filed on Aug. 13, 2021, now Pat. No. 11,689,287, which is a continuation-in-part of application No. 17/344,309, filed on Jun. 10, 2021, now Pat. No. 11,523,193, which is a continuation-in-part of application No. 17/175,251, filed on Feb. 12, 2021, now Pat. No. 11,323,788.

(51) Int. Cl.
*H04B 10/27*    (2013.01)
*H04J 14/02*    (2006.01)
*H04J 14/04*    (2006.01)
*H04Q 11/00*    (2006.01)

(52) U.S. Cl.
CPC .......... *H04J 14/0234* (2013.01); *H04J 14/04* (2013.01); *H04Q 11/0005* (2013.01); *H04Q 2011/0016* (2013.01)

(58) Field of Classification Search
CPC ................................ H04B 10/27; H04J 14/02
See application file for complete search history.

(56) References Cited

U.S. PATENT DOCUMENTS 5,663,818 A    9/1997  Yamamoto et al.
5,664,131 A    9/1997  Sugiya
(Continued)

OTHER PUBLICATIONS

Ghuman, H., "Coherent Access Applications for MSOs", SCTE/ISBE, 2018. (23 pages).
(Continued)

*Primary Examiner* — Shi K Li
(74) *Attorney, Agent, or Firm* — Eversheds Sutherland (US) LLP

(57) ABSTRACT

This disclosure describes, among other things, an Optical Communications Module Link Extender (OCML) including embedded Ethernet and PON amplification rather than relying on a separate amplification module for Ethernet and/or PON signals transmitted through the OCML. Providing an OCML that is able to provide the appropriate amplification to transmit both Ethernet and PON signals may be accomplished by using one or more Raman pumps on the signals transmitted in the upstream direction through the OCML (for example, upstream from one or more customer devices to one or more OLTs for PON signals. This OCML configuration may allow for a more cost-effective and efficient system with a smaller footprint than a system that relies on external amplification modules to transmit Ethernet or PON signals.

18 Claims, 28 Drawing Sheets

(56) References Cited

U.S. PATENT DOCUMENTS

| | | | |
|---|---|---|---|
| 5,742,416 A | 4/1998 | Mizrahi | |
| 5,875,054 A | 2/1999 | Onoda et al. | |
| 5,995,256 A | 11/1999 | Fee | |
| 5,995,259 A | 11/1999 | Meli et al. | |
| 5,995,274 A | 11/1999 | Sugaya | |
| 6,141,684 A | 10/2000 | McDonald et al. | |
| 6,310,716 B1 | 10/2001 | Evans et al. | |
| 6,323,994 B1 | 11/2001 | Li et al. | |
| 6,392,790 B1 | 5/2002 | Lauder et al. | |
| 6,414,769 B1 | 7/2002 | Meli et al. | |
| 6,469,825 B1 | 10/2002 | Digonnet et al. | |
| 6,480,312 B1 | 11/2002 | Okuno et al. | |
| 6,483,636 B1 | 11/2002 | Sugaya et al. | |
| 6,493,133 B1 | 12/2002 | Liang et al. | |
| 6,509,987 B1 | 1/2003 | Hunziker | |
| 6,519,060 B1 | 2/2003 | Liu | |
| 6,570,703 B2 | 5/2003 | Murakami et al. | |
| 6,580,548 B2 | 6/2003 | Islam | |
| 6,606,427 B1 | 8/2003 | Graves et al. | |
| 6,614,567 B1 | 9/2003 | Al-Salameh et al. | |
| 6,810,214 B2 | 10/2004 | Chbat et al. | |
| 6,961,522 B1 | 11/2005 | Castagnetti et al. | |
| 6,973,268 B1 | 12/2005 | Thompson | |
| 7,106,969 B1 | 9/2006 | Lichtman et al. | |
| 7,239,772 B2 | 7/2007 | Wang et al. | |
| 7,505,687 B2 | 3/2009 | Jaggi et al. | |
| 7,509,048 B2 | 3/2009 | Turpin et al. | |
| 7,565,081 B1 | 7/2009 | Britz et al. | |
| 7,773,838 B2 | 8/2010 | Lee et al. | |
| 7,796,886 B2 | 9/2010 | Jaggi et al. | |
| 7,805,073 B2 | 9/2010 | Sabat et al. | |
| 8,116,629 B2 | 2/2012 | Boduch et al. | |
| RE43,403 E | 5/2012 | Jaggi et al. | |
| 8,238,751 B1 | 8/2012 | Iannone et al. | |
| 8,320,759 B2 | 11/2012 | Boduch | |
| 8,320,760 B1 | 11/2012 | Lam et al. | |
| 8,724,997 B2 | 5/2014 | Zhang et al. | |
| 8,873,963 B2 | 10/2014 | Handelman | |
| 8,897,639 B2 | 11/2014 | Trojer et al. | |
| 8,923,697 B2 | 12/2014 | Xu et al. | |
| 8,953,942 B1 | 2/2015 | Lam et al. | |
| 9,014,557 B2 | 4/2015 | Graves et al. | |
| 9,172,492 B2 | 10/2015 | Lee | |
| 9,990,607 B1 | 6/2018 | Hua | |
| 10,211,920 B1 | 2/2019 | Khaleghi et al. | |
| 10,541,774 B1* | 1/2020 | Dai | H04B 10/272 |
| 10,587,343 B2 | 3/2020 | Mikami | |
| 10,750,256 B1 | 8/2020 | Moore et al. | |
| 2001/0015843 A1 | 8/2001 | Miyauchi et al. | |
| 2001/0019449 A1 | 9/2001 | Krummrich | |
| 2002/0000346 A1 | 1/2002 | Baranda et al. | |
| 2002/0003646 A1 | 1/2002 | Ishikawa | |
| 2002/0024706 A1 | 2/2002 | Meli | |
| 2002/0048066 A1 | 4/2002 | Antoniades et al. | |
| 2002/0089719 A1 | 7/2002 | Joo et al. | |
| 2002/0141046 A1 | 10/2002 | Joo et al. | |
| 2002/0163685 A1 | 11/2002 | Swanson | |
| 2002/0163691 A1 | 11/2002 | Wong et al. | |
| 2002/0167722 A1 | 11/2002 | Willner et al. | |
| 2002/0181048 A1 | 12/2002 | Kuykendall et al. | |
| 2003/0076560 A1 | 4/2003 | Pratt et al. | |
| 2003/0142978 A1 | 7/2003 | Lee et al. | |
| 2003/0194242 A1 | 10/2003 | Miyauchi et al. | |
| 2004/0184804 A1 | 9/2004 | Shahar | |
| 2004/0252996 A1 | 12/2004 | McNicol | |
| 2005/0141892 A1 | 6/2005 | Park et al. | |
| 2005/0158049 A1 | 7/2005 | Lee et al. | |
| 2005/0180316 A1 | 8/2005 | Chan | |
| 2005/0286896 A1 | 12/2005 | Kinoshita et al. | |
| 2006/0045528 A1 | 3/2006 | Gumaste et al. | |
| 2006/0104638 A1 | 5/2006 | Chung et al. | |
| 2006/0165412 A1 | 7/2006 | Jung et al. | |
| 2006/0239609 A1 | 10/2006 | Sorin et al. | |
| 2007/0019956 A1 | 1/2007 | Sorin et al. | |
| 2007/0212072 A1 | 9/2007 | Iannone et al. | |
| 2008/0089684 A1 | 4/2008 | Smith et al. | |
| 2009/0010648 A1 | 1/2009 | Zuhdi et al. | |
| 2009/0074417 A1 | 3/2009 | Vassilieva et al. | |
| 2009/0110398 A1 | 4/2009 | Pfeiffer | |
| 2009/0129774 A1 | 5/2009 | Jaggi et al. | |
| 2009/0208212 A1 | 8/2009 | Lee et al. | |
| 2009/0220231 A1 | 9/2009 | Zimmel et al. | |
| 2009/0297152 A1 | 12/2009 | Bainbridge et al. | |
| 2010/0046946 A1 | 2/2010 | Cao et al. | |
| 2010/0046950 A1 | 2/2010 | Cao et al. | |
| 2010/0054740 A1 | 3/2010 | Lee et al. | |
| 2010/0119223 A1 | 5/2010 | Ferrari et al. | |
| 2010/0189442 A1 | 7/2010 | Grobe | |
| 2010/0239257 A1 | 9/2010 | Grossman et al. | |
| 2010/0266283 A1 | 10/2010 | Beckett | |
| 2010/0278535 A1 | 11/2010 | Kim | |
| 2010/0316386 A1 | 12/2010 | Luk et al. | |
| 2011/0158650 A1 | 6/2011 | Cavaliere et al. | |
| 2011/0299858 A1 | 12/2011 | Mazzini et al. | |
| 2011/0302578 A1 | 12/2011 | Isci et al. | |
| 2012/0020668 A1 | 1/2012 | Trojer et al. | |
| 2012/0087648 A1 | 4/2012 | Gao et al. | |
| 2012/0148245 A1 | 6/2012 | Bowler et al. | |
| 2012/0315047 A1 | 12/2012 | Iannone et al. | |
| 2012/0322383 A1 | 12/2012 | Kennedy | |
| 2013/0039656 A1 | 2/2013 | Lam et al. | |
| 2013/0057948 A1 | 3/2013 | Simonneau et al. | |
| 2013/0084064 A1 | 4/2013 | Akasaka | |
| 2013/0266318 A1 | 10/2013 | Manaf et al. | |
| 2014/0099117 A1 | 4/2014 | Way | |
| 2014/0161446 A1 | 6/2014 | Lee et al. | |
| 2014/0233954 A1 | 8/2014 | Lee et al. | |
| 2015/0043410 A1 | 2/2015 | Chaturvedi et al. | |
| 2015/0043919 A1 | 2/2015 | Handelman | |
| 2015/0139654 A1 | 5/2015 | Mandelbaum et al. | |
| 2015/0249314 A1 | 9/2015 | Onaka | |
| 2015/0249520 A1 | 9/2015 | Badar et al. | |
| 2015/0304033 A1 | 10/2015 | Girogi et al. | |
| 2015/0326441 A1 | 11/2015 | Smith et al. | |
| 2015/0365191 A1 | 12/2015 | Lee et al. | |
| 2016/0087747 A1 | 3/2016 | Way | |
| 2016/0192043 A1 | 6/2016 | Shukunami et al. | |
| 2016/0197697 A1 | 7/2016 | Bonk et al. | |
| 2016/0269127 A1 | 9/2016 | Ghuman | |
| 2016/0360302 A1* | 12/2016 | Noll | H04L 41/5096 |
| 2017/0134113 A1 | 5/2017 | Lam et al. | |
| 2017/0237483 A1 | 8/2017 | Barnard | |
| 2017/0272197 A1* | 9/2017 | Binti Ahmad | H04B 10/2972 |
| 2018/0139148 A1 | 5/2018 | Gamage et al. | |
| 2018/0212706 A1 | 7/2018 | Ghuman | |
| 2018/0261968 A1 | 9/2018 | Yaman et al. | |
| 2018/0261971 A1 | 9/2018 | Yaman et al. | |
| 2019/0036802 A1 | 1/2019 | Kuttuva Jeyaram et al. | |
| 2019/0037286 A1 | 1/2019 | Ghuman et al. | |
| 2019/0097727 A1 | 3/2019 | Mikami | |
| 2019/0129918 A1 | 5/2019 | Moon et al. | |
| 2019/0132049 A1 | 5/2019 | Cai et al. | |
| 2019/0140765 A1 | 5/2019 | Ghuman | |
| 2019/0181952 A1 | 6/2019 | Jia et al. | |
| 2019/0215059 A1 | 7/2019 | Johansson et al. | |
| 2019/0215091 A1 | 7/2019 | Johansson | |
| 2019/0348812 A1 | 11/2019 | Kawai | |
| 2019/0370049 A1 | 12/2019 | Gopalan | |
| 2019/0386767 A1 | 12/2019 | Yuki et al. | |
| 2020/0067622 A1 | 2/2020 | Nakano | |
| 2020/0099546 A1 | 3/2020 | Haag et al. | |
| 2020/0136898 A1 | 4/2020 | Patel et al. | |
| 2020/0092732 A1 | 5/2020 | Raj et al. | |
| 2020/0153502 A1 | 5/2020 | Buset et al. | |
| 2021/0067264 A1 | 3/2021 | Abe | |
| 2021/0289272 A1 | 9/2021 | Ghuman | |

OTHER PUBLICATIONS

Bindhiaq, et al., "Recent Devlopment on Time and Wavelength-Division Multiplexed Passive Optical Network (TWDM-PON) for Next-Generation Passive Optical Network Stage 2 (NG-PON2)", Optical Switching and Networking 15, 2015. (14 pages).

(56) References Cited

OTHER PUBLICATIONS

Ghuman, H., "DWDM Access for Remote PHY Networks Integrated Optical Communications Module (OCML)", 2017 Fall Technical Forum, SCTE-ISBE, NCTA, Cablelabs, 2017. (19 pages).

* cited by examiner

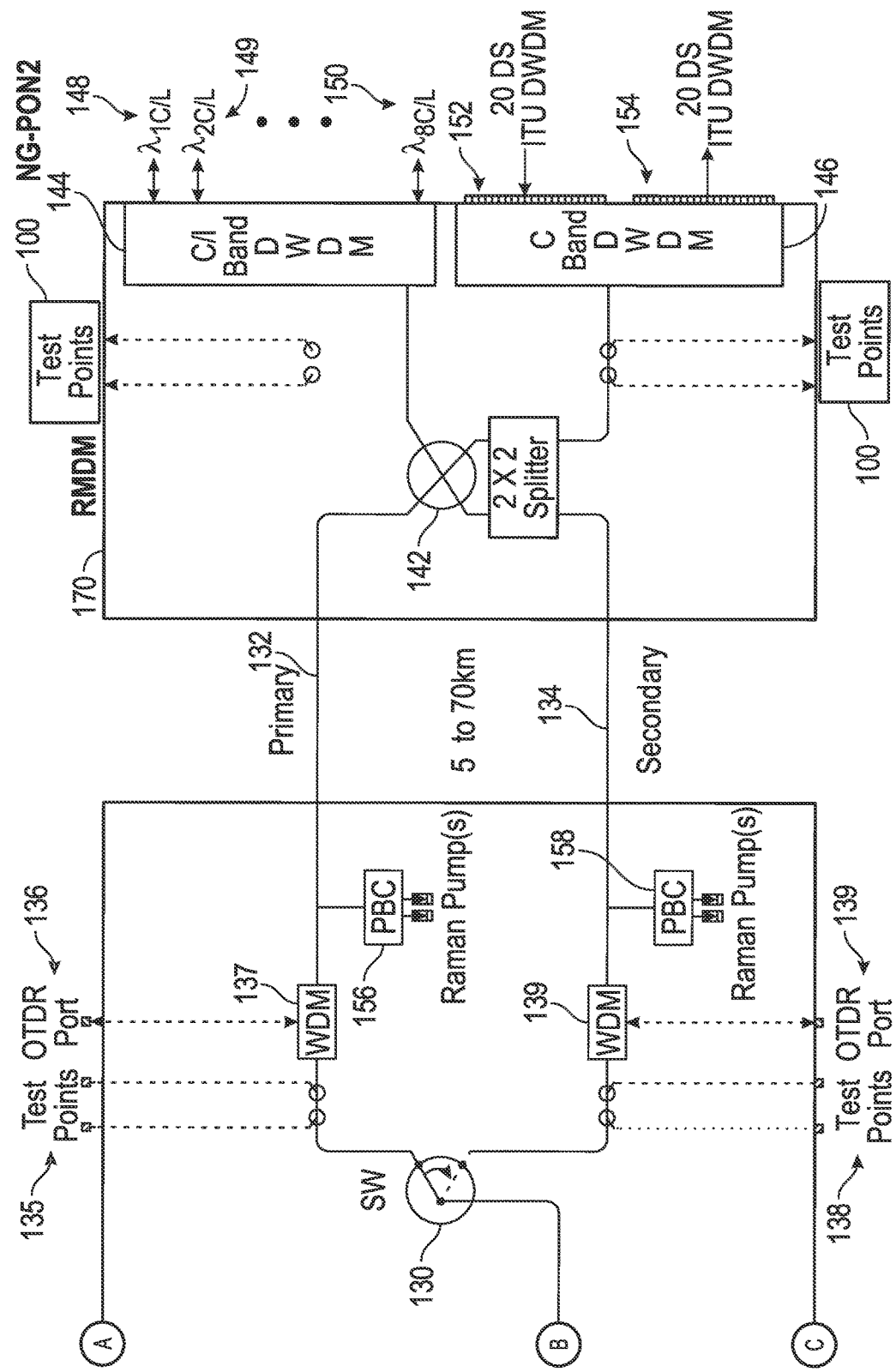
FIG. 1A (Cont...)

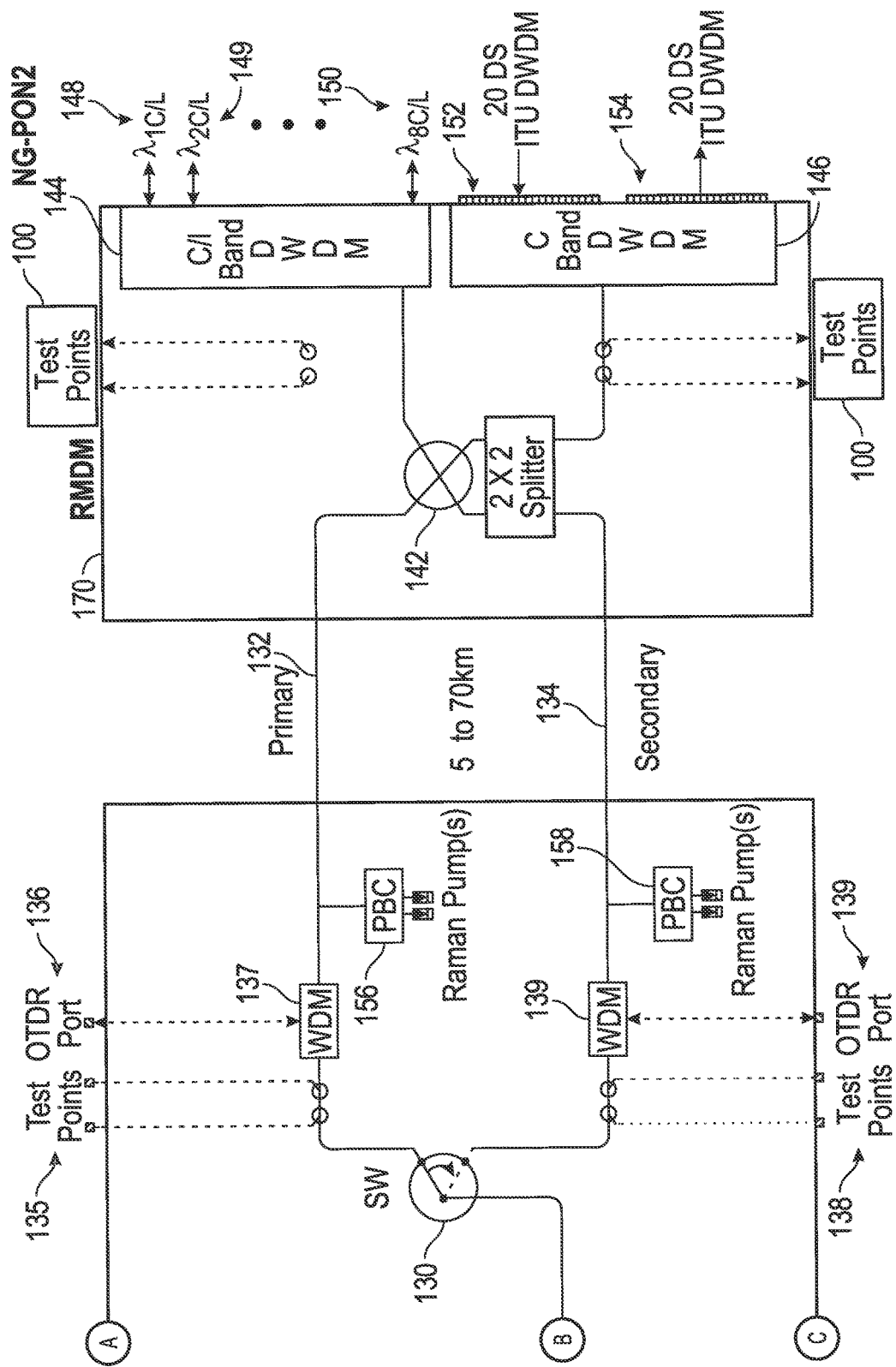
FIG. 1B (Cont...)

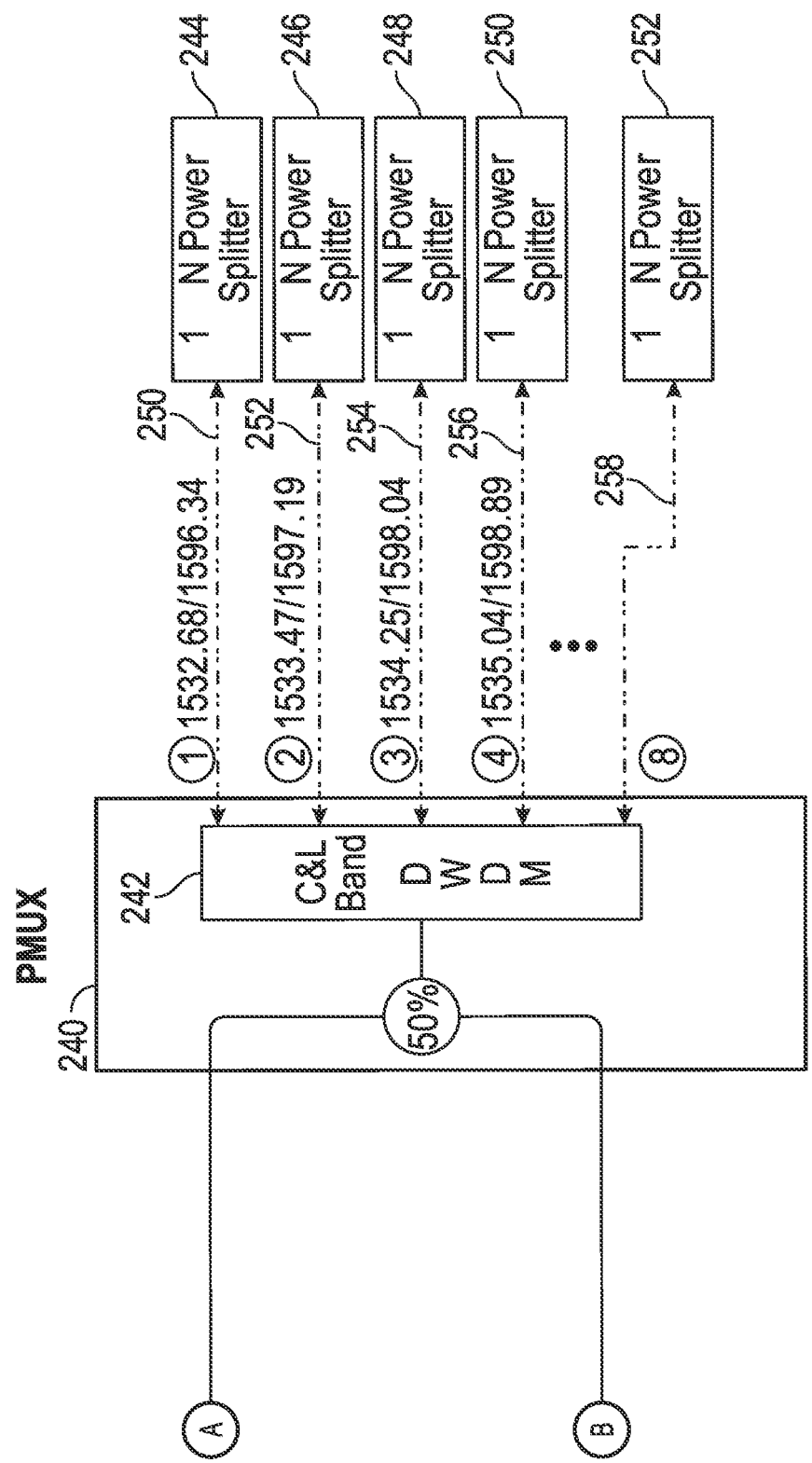
FIG. 2 (Cont...)

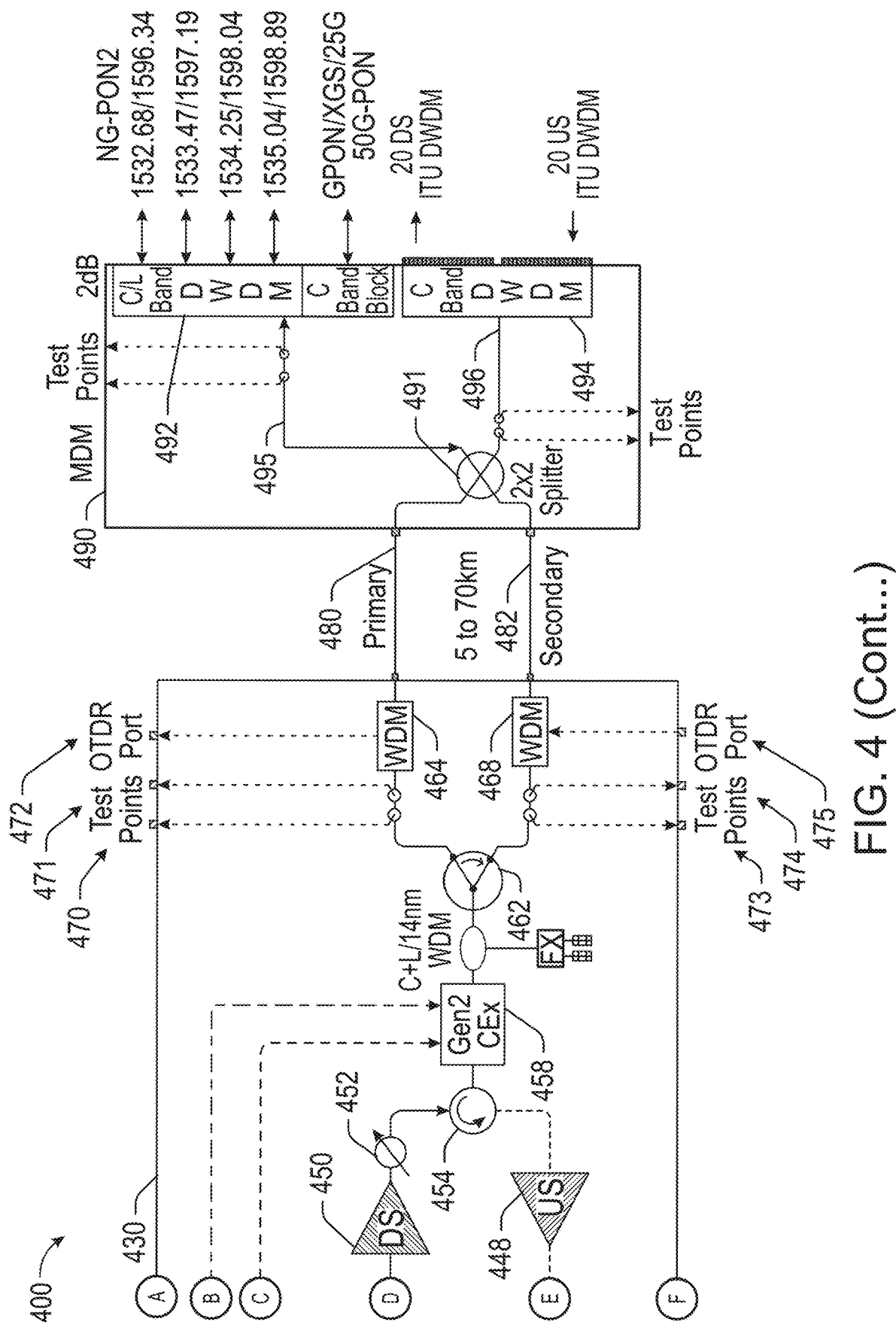
FIG. 4 (Cont...)

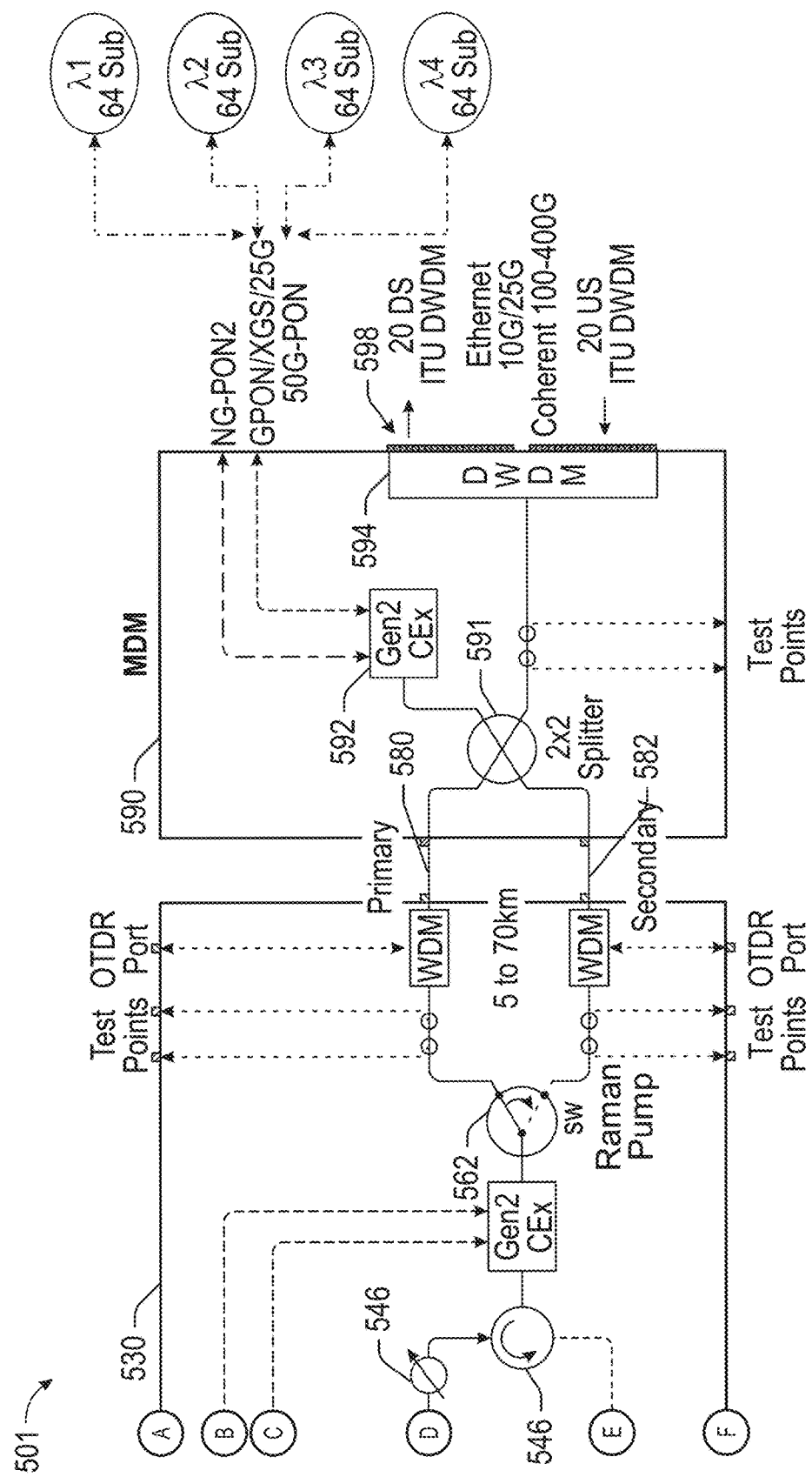
FIG. 5 (Cont...)

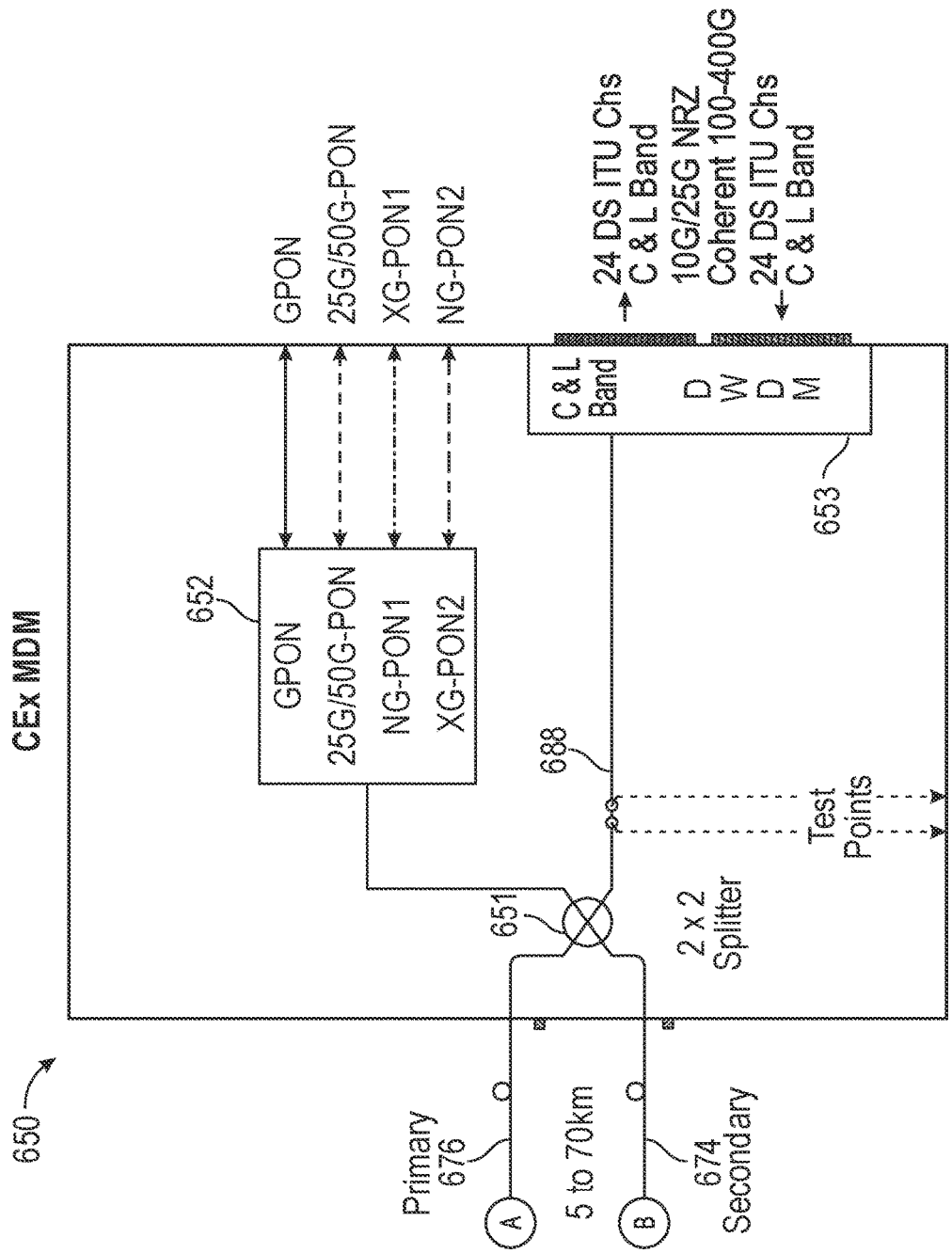
FIG. 6A (Cont...)

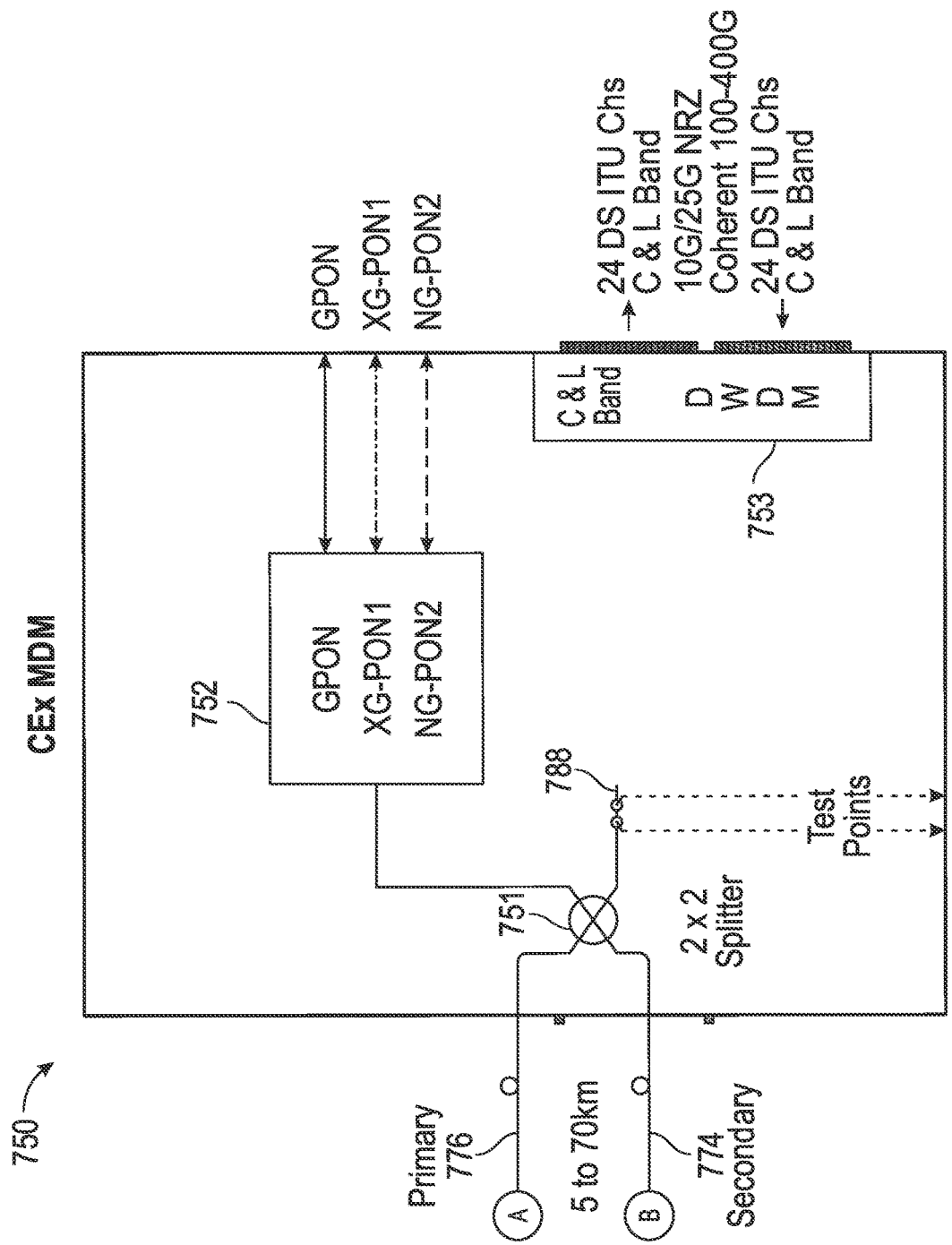
FIG. 7 (Cont...)

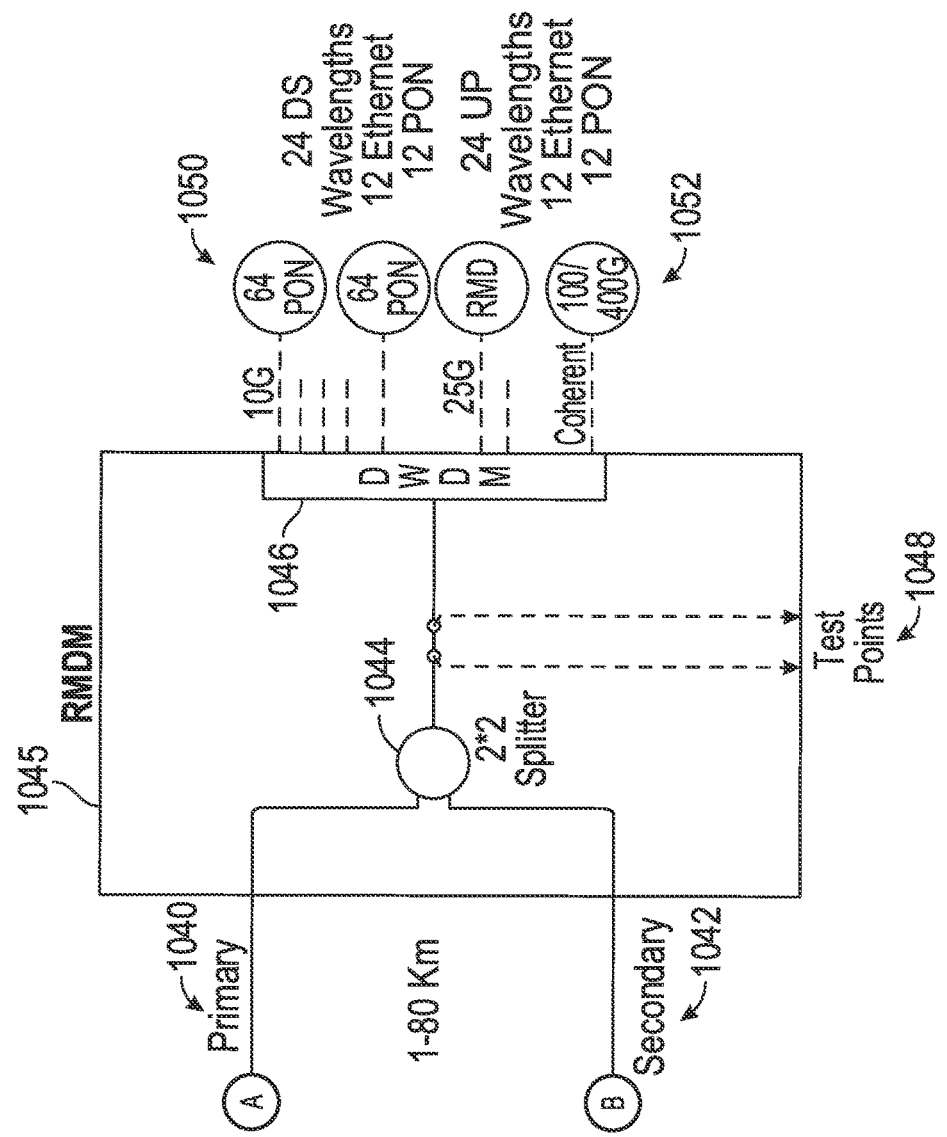
FIG. 10 (Cont...)

| Pair | Downstream ITU | Downstream Wavelength | Upstream ITU | Upstream Wavelength | |
|---|---|---|---|---|---|
| 1 | 62 | 1527.99 | 61 | 1528.77 | |
| 2 | 60 | 1529.55 | 59 | 1530.33 | |
| 3 | 58 | 1531.12 | 57 | 1531.9 | |
| 4 | 56 | 1532.68 | 55 | 1533.47 | |
| 5 | 54 | 1534.25 | 53 | 1535.04 | |
| 6 | 52 | 1535.82 | 51 | 1536.61 | 12 WLs PON |
| 7 | 50 | 1537.4 | 49 | 1538.19 | |
| 8 | 48 | 1538.98 | 47 | 1539.77 | |
| 9 | 46 | 1540.56 | 45 | 1541.35 | |
| 10 | 44 | 1542.14 | 43 | 1542.94 | |
| 11 | 42 | 1543.73 | 41 | 1544.53 | |
| 12 | 40 | 1545.32 | 39 | 1546.12 | |
| 13 | 38 | 1546.92 | 37 | 1547.72 | |
| 14 | 36 | 1548.52 | 35 | 1549.32 | |
| 15 | 34 | 1550.12 | 33 | 1550.92 | |
| 16 | 32 | 1551.72 | 31 | 1552.52 | |
| 17 | 30 | 1553.33 | 29 | 1554.13 | |
| 18 | 28 | 1554.94 | 27 | 1555.75 | 12 WLs Ethernet |
| 19 | 26 | 1556.56 | 25 | 1557.36 | |
| 20 | 24 | 1558.17 | 23 | 1558.98 | |
| 21 | 22 | 1559.79 | 21 | 1560.61 | |
| 22 | 20 | 1561.42 | 19 | 1562.23 | |
| 23 | 18 | 1563.05 | 17 | 1563.86 | |
| 24 | 16 | 1564.68 | 15 | 1565.5 | |

FIG. 11A

| Pair | Downstream ITU | Downstream Wavelength | Upstream ITU | Upstream Wavelength | | |
|---|---|---|---|---|---|---|
| 1 | 50 | 1537.4 | 62 | 1527.99 | | |
| 2 | 49 | 1538.19 | 61 | 1528.77 | | |
| 3 | 48 | 1538.98 | 60 | 1529.55 | | |
| 4 | 47 | 1539.77 | 59 | 1530.33 | | |
| 5 | 46 | 1540.56 | 58 | 1531.12 | 12 WLs PON | |
| 6 | 45 | 1541.35 | 57 | 1531.9 | | |
| 7 | 44 | 1542.14 | 56 | 1532.68 | | |
| 8 | 43 | 1542.94 | 55 | 1533.47 | | |
| 9 | 42 | 1543.73 | 54 | 1534.25 | | |
| 10 | 41 | 1544.53 | 53 | 1535.04 | | |
| 11 | 39 | 1546.12 | 52 | 1535.82 | | |
| 12 | 38 | 1546.92 | 51 | 1536.61 | | |
| 13 | 25 | 1557.36 | 37 | 1547.72 | | |
| 14 | 24 | 1558.17 | 36 | 1548.52 | | |
| 15 | 23 | 1558.98 | 35 | 1549.32 | | |
| 16 | 22 | 1559.79 | 34 | 1550.12 | | |
| 17 | 21 | 1560.61 | 33 | 1550.92 | 12 WLs Ethernet | |
| 18 | 20 | 1561.42 | 32 | 1551.72 | | |
| 19 | 19 | 1562.23 | 31 | 1552.52 | | |
| 20 | 18 | 1563.05 | 30 | 1553.33 | | |
| 21 | 17 | 1563.86 | 29 | 1554.13 | | |
| 22 | 16 | 1564.68 | 28 | 1554.94 | | |
| 23 | 15 | 1565.5 | 27 | 1555.75 | | |
| 24 | 14 | 1566.31 | 26 | 1556.56 | | |

FIG. 11B

OPTICAL COMMUNICATIONS MODULE LINK EXTENDER INCLUDING ETHERNET AND PON AMPLIFICATION

CROSS-REFERENCE TO RELATED PATENT APPLICATION

The present application is related to and claims priority from application Ser. No. 17/401,968 filed on Aug. 13, 2021 titled "OPTICAL COMMUNICATIONS MODULE LINK EXTENDER INCLUDING ETHERNET AND PON AMPLIFICATION," which is related to and claims priority from Application No. 17/344,309 filed on Jun. 10, 2021 titled "OPTICAL COMMUNICATIONS MODULE LINK EXTENDER INCLUDING ETHERNET AND PON AMPLIFICATION," which is related to and claims priority from application Ser. No. 17/175,251 filed on Feb. 12, 2021 titled "AMPLIFICATION MODULE."

FIELD OF INVENTION

This disclosure relates generally to the field of optical telecommunications and includes an integrated module with several sub-assemblies.

BACKGROUND

To understand the importance of optical networking, the capabilities of this technology have to be discussed in the context of the challenges faced by the telecommunications industry and, in particular, service providers. Most U.S. networks were built using estimates that calculated bandwidth use by employing concentration ratios derived from classical engineering formulas for modeling network usage, such as the Poisson process. Consequently, forecasts of the amount of bandwidth capacity needed for data networks were calculated on the presumption that a given individual would only use network bandwidth for six minutes each hour. These formulas did not factor in the amount of traffic generated by different devices accessing the Internet. With the advent of the Internet and the ever-increasing number of devices (for example, facsimile machines, multiple phone lines, modems, teleconferencing equipment, mobile devices including smartphones, tablets, laptops, wearable devices, and Internet of Things (IoT) devices, etc.) accessing the Internet, there has been an average increase in Internet traffic of 300 percent year over year. Had these factors been included, a far different estimate would have emerged.

As a result of this growth of devices, a large amount of bandwidth capacity is needed to provide the services required by these devices. In the 1990s, some long-distance carriers increased their capacity (bandwidth) to 1.2 Gbps over a single optical fiber pair, which was a considerable upgrade at the time. At a transmission speed of one Gbps, one thousand books can be transmitted per second. However, today, if one million families in a city decide to view a video on a Website, then network transmission rates on the order of terabits are required. With a transmission rate of one terabit, it is possible to transmit 200 million simultaneous full-duplex phone calls or transmit the text from 300 years' worth of daily newspapers per second.

BRIEF DESCRIPTION OF THE FIGURES

FIGS. 11A-11B depict example transmissions wavelengths, in accordance with the disclosure.

DETAILED DESCRIPTION

The disclosure is directed to, among other things, an Optical Communications Module Link Extender (OCML), including embedded Ethernet and PON amplification rather than relying on a separate amplification module for Ethernet and/or PON signals transmitted through the OCML. Providing an OCML that is able to provide the appropriate amplification to transmit both Ethernet and PON signals may be accomplished by using one or more Raman pumps on the signals transmitted in the upstream direction through the OCML (for example, upstream from one or more customer devices to one or more OLTs for PON signals. This OCML configuration may allow for a more cost-effective and efficient system with a smaller footprint than a system that relies on separate amplification modules to transmit Ethernet or PON signals. Since PON upstream signals may be in burst mode (for example, time domain), they may require "burst mode EDFAs," whereas conventional Ethernet signals may utilize standard erbium-doped fiber amplifiers (EDFAs). In the OCML described herein, upstream signals may be amplified via Raman pumps, so the same amplification configuration can be used for both Ethernet and PON upstream signals. Another advantage of using Raman pumps in this configuration is that they also provide downstream gain for both PON and Ethernet.

Additionally, in one or more embodiments, the OCML may also include a configuration (for example, the OCML 1011 depicted in system 1000 of FIG. 10) in which both the Ethernet and PON signals are transmitted in the downstream and upstream over only the C band. That is, the Ethernet and PON signals may share the wavelengths included in the C band. Particularly, there may be 48 wavelengths in the C band, and 24 of these wavelengths may be reserved for downstream transmissions, and 24 wavelengths may be reserved for upstream transmissions. Of the 24 downstream and upstream wavelengths, 12 may be reserved for PON signals, and 12 may be reserved for Ethernet signals. However, this is not intended to be limiting and any other number of wavelengths may be used for either of the signal types in either the downstream or upstream direction. Further examples of wavelengths that may be used by both types of signals are provided in at least FIGS. 11A-11B. With respect to these embodiments, the Raman pumps may be configured to provide maximum gain for the upstream PON signal transmissions. The configuration associated with these embodiments may allow for extended lengths of PON signal transmissions (for example, distances over 80 km).

Figure 1A:
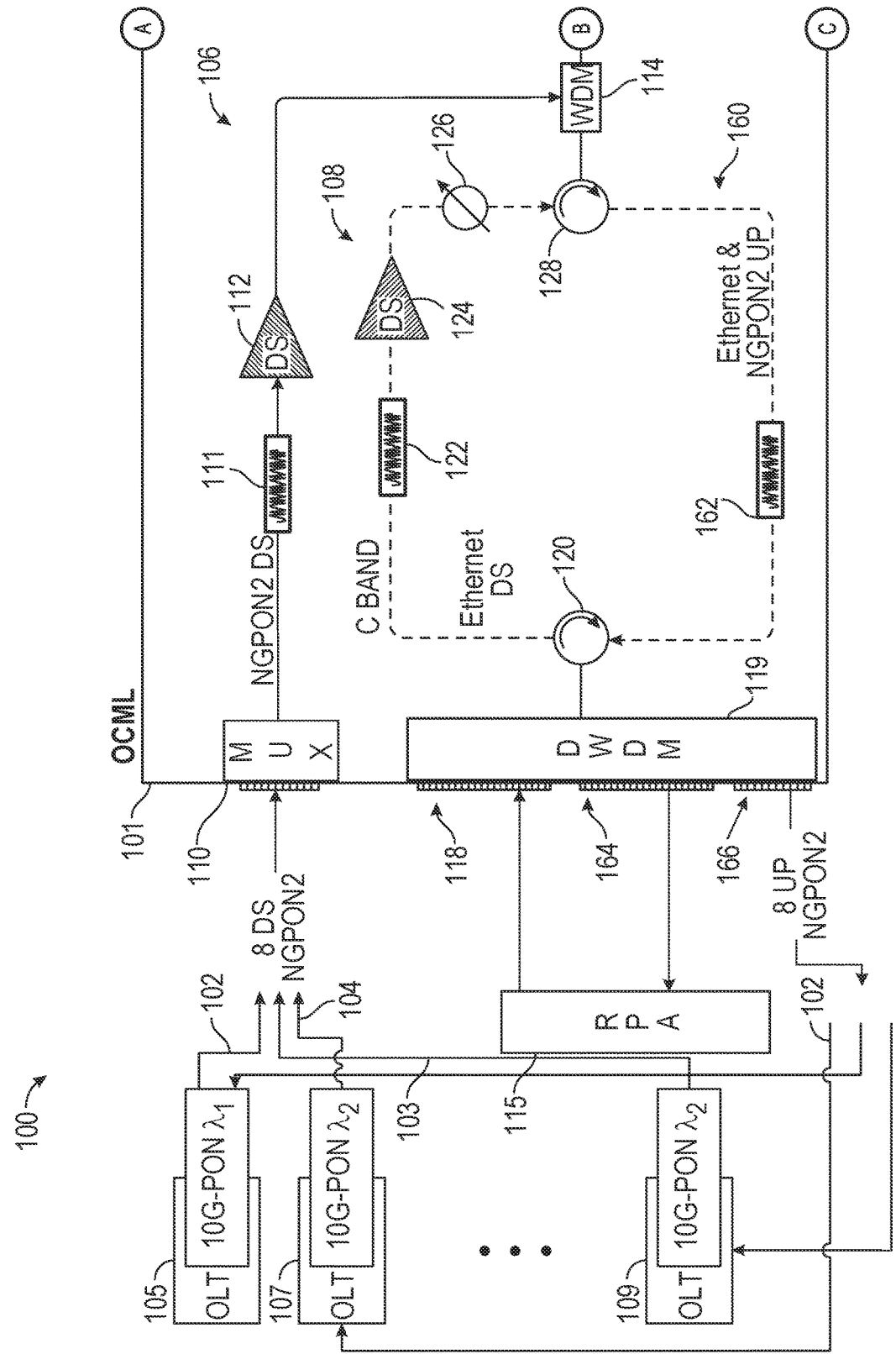
FIGS. 1A-1B depict example Optical Communications Module Link (OCML) Extenders including embedded amplification capabilities, in accordance with the disclosure.

Turning to the figures, FIG. 1A depicts an example system 100. In some embodiments, the system 100 may be a network that may involve at least Ethernet and PON signal transmissions. The system 100 may include an OCML headend 101, one or more optical line termination (OLT) devices placed at a central office (for example, OLT 105, OLT 107, OLT 109, and/or any other number of OLTs), and/or an MDM 170. In some embodiments, the OCML 101 described herein may be a single module that is capable of transmitting PON signals received from the one or more OLTs, and Ethernet signals received from an Ethernet switch along two separate downstream paths (for example, a first downstream path 106 for the PON signals and second downstream path 108 for the Ethernet signals) to the MDM 170. The Ethernet and/or PON signals may then be provided to one or more customer devices in the network (not depicted in the figure). The OCML 101 is also capable of receiving upstream PON and Ethernet signals from the MDM 170 (which may receive the signals from the customer devices) and transmitting the upstream PON and Ethernet signals to the one or more OLTs and the Ethernet switch, respectively. The OCML 101, as described herein, is capable of transmitting both the PON and Ethernet signals without the use of a separate amplification module. This reduces the complexity of the system 100 used for transmitting PON and Ethernet signals through the network.

The use of the embedded amplification capabilities in the OCML may provide a number of benefits to a network. For example, when implemented in a PON network, the amplification may allow for greater signal transmission distances from the OLT to the one or more customer devices located downstream in the network. The amplification may also allow for more effective upstream burst mode signal transmissions from the customer devices. More specifically, the use of the embedded amplification capabilities as described herein may be beneficial because PON transport may usually be limited to 20 km distances from an OLT. The amplification, however, allows data transport of up to much larger distances (for example, greater than 50 km). The amplification may also be beneficial because it may help to mitigate inherent noise problems that may arise in upstream signal transmissions that take place in a PON network. The amplification may accomplish this by including one or more Raman pumps in the upstream direction. Raman amplification on the upstream PON signals may allow for improvement in the noise-limited distance (OSNR).

In some embodiments, as mentioned above, the OCML 101 may include a first downstream path 106 for transmitting PON signals (for example, PON signal 102, PON signal 103, PON signal 104, and/or any other number of PON signals). The PON signals may be received from one or more optical line termination (OLT) devices (for example, OLT 105, OLT 107, OLT 109, and/or any other number of OLTs). For exmaple, the OLT devices may be included at a central office that is located upstream in a network relative to the OCML 101, the MDM 170, and any customer devices (not depicted in the figure). The OLT devices may also be located at any other location within the network as well. The PON signals may be received at a multiplexer 110 of the OCML 101. The multiplexer may be a device that may receive multiple inputs (for example, the PON signals) and combine them into a single output (for example, an output signal including all of the received PON signals). For example, the combined signal may include each of the received PON signals occupying different wavelengths within a given range of wavelengths. For example, the first downstream path 106 may include transmissions over the L band, which may include wavelengths in the range from 1565-1625 nm, for example. However, any other wavelengths may also be used as well. Combining the PON signals into a combined PON signal using the multiplexer 110 may allow multiple PON signals received as inputs at the OCML 101 from multiple OLTs to be transmitted over a single fiber through the OCML 101 and downstream through the network to the MDM 170.

From the multiplexer 110, the combined PON signal may optionally be transmitted to a dispersion compensation module (DCM) 111. However, in some cases, the DCM 111 may not be included within the OCML 101. The DCM 111 may be used to compensate for dispersion that combined PON signal may experience. In some embodiments, DCM 111 may be configured to balance positive and/or negative dispersion that may be introduced to the combined PON signal by the fiber. In some embodiments, DCM 111 may be configured to compensate for positive (temporal broadening of the egress optical data signal) and/or negative (temporal contraction of the egress optical data signal) dispersion introduced by fiber that is 60 km or greater in length, to reduce the sensitivity or OSNR levels of a transceiver in a DWDM located at a field hub or outside plant. More specifically, DCM 111 may be configured to reduce the sensitivity or OSNR level requirement in a photodetector or fiber-optic sensor in the transceiver, which may drastically reduce the cost of the transceivers used in the DWDM located at the field hub or outside plant. Additionally, the DCM 111 may also be tunable. That is, the DCM 111 can be tuned based on the transmission distance of a signal. For example, if a signal is being transmitted over a 60 km fiber, the tunable DCM 111 may be tuned differently than if the signal were being transmitted over a 5 km fiber. The tunable DCM 111 may be a Fiber Bragg Grating (FBG) type DCM previously described. Submitting the tunable DCM 111 (for example, the FBG) to a temperature gradient may allow a grating chirp to be changed and, accordingly, the dispersion level of the tunable DCM 111 to be tuned. Seven single gratings can be used for producing negative dispersion over a typical range from −800 to −2000 ps/nm or for producing a similar positive dispersion range. This means that the fiber link can be totally managed for dispersion for all distances which may range from 5 km to 60 km, or even greater distances.

From the DCM 111 (if applicable), the combined PON signal may be transmitted to an amplifier 112 (which may be a downstream (DS) amplifier). The amplifier 112, as well as any other amplifiers described herein, may allow operation over a full transmission spectrum, which may include at least 48 transmission channels (or any other number of channels). That is, the amplifier 112 may be a wide-band amplifier. Specifically, the amplifier 112 may be an Erbium-Doped Fiber Amplifier (EDFA), a semiconductor amplifier, or any other type of amplifier. Additionally, in some cases, the amplifier 112 may be an L band amplifier. To support 48 channels (or any other number of channels), the amplifier 112 may optimize gain flatness and noise for the broader channel range (for example, 40 channels included with some of the other OCML systems described herein to 48 channels in OCML 101). A gain of the amplifier 112 may be based at least in part on a distance that a downstream signal has to travel. For example, the gain may be a function of a fiber attenuation coefficient a, which is a measure of the intensity of the attenuation of a beam of light as it traverses a length of an optical fiber segment. The unit of measurement of the fiber attenuation coefficient is decibels (dB) per km (dB/km). For instance, the gain of amplifier 112 may be adjusted based at least in part on the attenuation coefficient and length of fiber that the egress optical data signal will travel. More specifically, in some instances, the gain of amplifier 112 may be $G=e^{(2\alpha L)}$ where $\alpha$ is the fiber attenuation coefficient, as explained above, and L is the length of the fiber (for example, the length of primary fiber 132 and/or the length of secondary fiber 134). From the amplifier 112, the combined PON signal may be transmitted to a wavelength-division multiplexer (WDM) 114, which may be described in further detail below.

In some embodiments, as mentioned above, the OCML 101 may include a second downstream path 108 for transmitting Ethernet signals (for example, Ethernet signals 118). The Ethernet signals 116 may be received by the OCML 101 from an Ethernet switch 115. The Ethernet signals 116 may be received at a DWDM 119, which may combine the Ethernet signals 116 into a multi-wavelength downstream optical data signal comprising the individual Ethernet signals 116 associated with different wavelengths of the multi-wavelength downstream optical data signal. From the DWDM 119, the multi-wavelength downstream optical data signal may be provided to a circulator 120 (which may alternatively be a WDM as well).

The circulator 120 may allow additional optical wavelengths to be utilized (for example, the full array of wavelengths included in the 48 total channels, or any other number of channels) and may enable technologies such as Quasi-Coherent and PAM4 (where the downstream and upstream wavelengths may be closer together) to be transported in an OCML-MDM infrastructure. The circulator 120 may enable the use of the same wavelength for both downstream and upstream and upstream purposes. Circulators may be one directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. circulator 120 may be round baud single or dual stage circulator that receives the downstream optical signal from the DWDM 119 and outputs a corresponding downstream optical signal to DCM 122.

The DCM 122 may function similarly to optional DCM 111. That is, The DCM 122 may be used to compensate for dispersion that multi-wavelength downstream optical data signal may experience. In some embodiments, DCM 122 may be configured to balance positive and/or negative dispersion that may be introduced to the egress optical data signal by the fiber. In some embodiments, DCM 122 may be configured to compensate for positive (temporal broadening of the egress optical data signal) and/or negative (temporal contraction of the egress optical data signal) dispersion introduced by fiber that is 60 km or greater in length, to reduce the sensitivity or OSNR levels of a transceiver in a DWDM located at a field hub or outside plant. More specifically, DCM 122 may be configured to reduce the sensitivity or OSNR level requirement in a photodetector or fiber-optic sensor in the transceiver, which may drastically reduce the cost of the transceivers used in the DWDM located at the field hub or outside plant. Additionally, the DCM 122 may also be tunable. That is, the DCMs can be tuned based on the transmission distance of a signal. For example, if a signal is being transmitted over a 60 km fiber, the tunable DCM may be tuned differently than if the signal were being transmitted over a 5 km fiber. The tunable DCM may be a Fiber Bragg Grating (FBG) type DCM previously described. Submitting the tunable DCM (for example, the FBG) to a temperature gradient may allow a grating chirp to be changed and, accordingly, the dispersion level of the tunable DCM to be tuned. Seven single gratings can be used for producing negative dispersion over a typical range from −800 to −2000 ps/nm or for producing a similar positive dispersion range. This means that the fiber link can be totally managed for dispersion for all distances which may range from 5 km to 60 km, or even greater distances.

From the DCM 122, the multi-wavelength downstream optical data signal may be transmitted to an amplifier 124. The amplifier 124 may function similarly to amplifier 112. That is, the amplifier 124 may be wide-band amplifiers. Specifically, the amplifier 124 may be an Erbium-Doped Fiber Amplifier (EDFA), a semiconductor amplifier, or any other type of amplifier. Additionally, in some cases, the amplifier 124 may be a C band amplifier. To support 48 channels (or any other number of channels), the amplifier 124 may optimize gain flatness and noise for the broader channel range (for example, 40 channels included with some of the other OCML systems described herein to 48 channels in OCML 101). A gain of the amplifier 124 may be based at least in part on a distance that a downstream signal has to travel. For example, the gain may be a function of a fiber attenuation coefficient $\alpha$, which is a measure of the intensity of the attenuation of a beam of light as it traverses a length of an optical fiber segment. The unit of measurement of the fiber attenuation coefficient is decibels (dB) per km (dB/km). For instance, the gain of amplifier 124 may be adjusted based at least in part on the attenuation coefficient and length of fiber that the egress optical data signal will travel. More specifically, in some instances, the gain of amplifier 124 may be $G=e^{(2\alpha L)}$ where a is the fiber attenuation coefficient, as explained above, and L is the length of the fiber (for example, the length of primary fiber 132 and/or the length of secondary fiber 134).

From the amplifier 124, the multi-wavelength downstream optical data signal may be transmitted to variable optical attenuator (VOA) 126. VOA 126 may receive the amplified downstream optical data signals as an input, and may be used to reduce the power levels of the downstream optical data signals. The power reduction may done by absorption, reflection, diffusion, scattering, deflection, diffraction, and dispersion of the amplified downstream optical data signals. VOA 126 may have a working wavelength range in which it absorbs all light energy equally. In some embodiments, VOA 126 may utilize a length of high-loss optical fiber that operates upon its input optical signal power level in such a way that its output signal power level is less than the input level. The variability of the output power level of VOA 126 may be achieved using a fiber coupler, where some of the power is not sent to the port that outputs but to another port. Another possibility may be to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 126 may be based on some piece of doped fiber exhibiting absorption within a certain wavelength range. The VOA 126 may also be tuned in synchronization with any of the tunable DCMs (for example, DCM 122). That is, the tunable DCMs and the VOA 126 may be tuned for the same transmission distance. It should be noted that while the figure may only show VOA(s) as being associated with the downstream Ethernet signals. However, VOAs may also be used for downstream PON signals and the upstream Ethernet/PON signals for better control and optimization of optical receive power levels.

From VOA 126, the multi-wavelength downstream optical data signal may be transmitted to circulator 128 (which may also be a WDM). Circulator 128 may function similarly to circulator 120. The circulator 128 may allow additional optical wavelengths to be utilized (for example, the full array of wavelengths included in the 48 total channels, or any other number of channels) and may enable technologies such as Quasi-Coherent and PAM4 (where the downstream and upstream wavelengths may be closer together) to be transported in an OCML-MDM infrastructure. The circulator 128 may enable the use of the same wavelength for both downstream and upstream and upstream purposes. Circulators may be one-directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. circulator 128 may be round baud single or dual stage circulator.

From the circulator 128, the multi-wavelength downstream optical data signal may be transmitted to the WDM 114. As described above, the combined PON signal transmitted through the first downstream path 106 may also be transmitted to the WDM 114. The WDM 114 may receive both of these types of signals (PON and Ethernet) and may combine them. In one or more embodiments, the WDM may comprise one or more thin film filters (TFFs) or array waveguide gratings (AWGs) that combine one or more downstream signals into a single downstream signal and separate a single upstream signal into one or more upstream signals. The WDM 114 may comprise one or more wavelength-converting transponders, where each of the wavelength-converting transponders receives optical data from a client-layer optical network such as, for example, a Synchronous optical network (SONET)/synchronous digital hierarchy (SDH), Internet protocol (IP), and/or asynchronous transfer mode (ATM) optical network (or any other types of data). Each of the wavelength-converting transponders converts the optical data signal into an electrical data signal, and then converts the electrical data signal into a second optical data signal to be emitted by a laser, where the second optical data signal is carried by one or more packets of light oscillating with wavelengths in the c band (or any other band). More specifically, each of the wavelength-converting transponders may include a laser that emits the second optical data signal. That is each of the second optical data signals may be emitted by a laser with a unique wavelength. In some embodiments, the wavelength-converting transponders may comprise two adjacent transceivers. That is, each of the wavelength-converting transponders may comprise a first transceiver that converts the optical data signal into an electrical data signal, and may comprise second transceiver that converts the electrical data signal into the second optical data signal. The second transceiver converts the electrical signal to the second optical data signal such that the second optical data signal is transmitted with the correct wavelength.

In some embodiments, a first wavelength-converting transponder, of the two wavelength-converting transponders, may emit a second optical data signal with a 1550 nm wavelength. A second wavelength-converting transponder, of the two wavelength-converting transponders, may emit a second optical data signal with a 1533 nm wavelength. For example, there may be two wavelength-converting transponders, and each of the two wavelength-converting transponders may include a laser emitting a second optical data signal with a unique wavelength. However, these are only example wavelengths that may be used, and any other wavelengths and/or number of wavelengths may also be used as well. Thus, each of the wavelength-converting transponders converts the electrical data signal into an optical data signal, and each of the wavelength-converting transponders emits, or transmits, the optical data signal, with a wavelength in the c band, to a TFF or AWG. The TFF or AWG, may combine or multiplex the optical data signals, emitted by each of the wavelength-converting transponders, into a multi-wavelength optical data signal where each of the wavelengths in the multi-wavelength optical data signal coincides with the wavelengths associated with each of the optical data signals. Returning to the example above of the two wavelength-converting transponders, the first and second wavelength-converting transponders may each receive an optical signal from a SONET/SDH client layer network. The first and second wavelength-converting transponders may each respectively convert the optical signal they received from the SONET/SDH client layer network into an electrical data signal. The first wavelength-converting transponder may convert the electrical data signal that it receives into a second optical data signal with a first wavelength. The first wavelength-converting transponder may emit, via a first laser, the second optical data signal, with the first wavelength, to the TFF or AWG. The second wavelength-converting transponder may convert the electrical data signal that it receives into a second optical data signal with a second wavelength. The second wavelength-converting transponder may emit, via a second laser, the second optical signal, with the second wavelength, to the TFF or AWG. The TFF or AWG may combine or multiplex the second optical data signal, with the first wavelength, and the second optical data signal, with the second wavelength, onto a multi-wavelength optical signal. The TFF or AWG may be referred to as an optical multiplexer.

From the WDM 114, the combined PON and Ethernet signal may then be transmitted to an optical switch 130. The optical switch 130 may connect the WDM 114, and/or any other element of the OCML 101, to a primary optical fiber 132, which effectively may connect the OCML 101 passive circuit to the outside plant. The optical switch 130 may also connect the WDM 114, and/or any other element of the OCML 101 circuit, to a secondary optical fiber 134 connecting the OCML 101 passive circuit to the outside plant. The optical switch 130 may be in a first position that connects the WDM 114 to the primary optical fiber 132, and may be in a second position that connects the WDM 114 to the secondary optical fiber 134. The optical switch 130 may be in the second position when the primary optical fiber 132 is disconnected or unresponsive. Any number of additional optical fibers may be connected to the optical switch 130 as well.

Additionally, the primary optical fiber 132 and second optical fiber 134 may include one or more test points, an Optical Time Domain Reflectometry (OTDR) port, and/or a WDM (for example, primary optical fiber 132 may include test points 135, OTDR port 136, and/or WDM 137, and secondary optical fiber 134 may include test points 138, OTDR port 139, and/or WDM 140). The test points may be used for monitoring downstream and upstream signals being transmitted over the primary fiber 132 and/or secondary fiber 134. The OTDR ports may allow for continuous monitoring of fibers in the presence of data for fiber degradation or fiber cuts. If a fiber cut happens, the OTDR may enable the location to be determined immediately, significantly reducing outages. OTDR functionality may be enabled via a WDM (for example, WDM 137 and/or WDM 140) and an external port (for example, the OTDR ports 136 and/or 139) on the OCML 101 for injecting an OTDR signal (which may be, for example, 1625 or 1650nm, or any other wavelength). The WDMs may be located after the optical switch 130 so the OTDR monitoring is independent of which link is carrying downstream traffic. Both the links may always have upstream traffic present, (for example, an MDM 170 may incorporate a 50% splitter which splits the upstream signal evenly between the primary and secondary fiber). The OCML's OTDR injection ports may be specified with a degree of required isolation between the OTDR's 1625/1650nm and traffic bearing C-band wavelengths (or any other wavelengths). This traffic could be 10 G or Coherent 100 G/200 G/400 G, for example, as well as any other types of network traffic. The additional insertion loss associated with the components required to inject the OTDR pulse and to protect transmit/receive equipment from the backscattered or transmitted OTDR signals. The additional insertion losses may be <0.5 dB and thus can be easily accommodated within the system link budget.

In some embodiments, the combined PON and Ethernet signal output to the primary fiber 132 and/or secondary fiber 134 may be transmitted to the MDM 170. The combined PON and Ethernet signal may then be received at optical splitter 142 as an ingress optical data signal. Optical splitter 142 may also be referred to as a beam splitter, and may comprise one or more quartz substrates of an integrated waveguide optical power distribution device. However, optical splitter 142 may also be any other type of optical splitter as well. Optical splitter 142 may be a passive optical network device. It may be an optical fiber tandem device comprising one or more input terminals and one or more output terminals. Optical splitter 142 may be Fused Biconical Taper (FBT) splitter or Planar Lightwave Circuit (PLC) splitter. Optical splitter 142 may be a balanced splitter wherein optical splitter 142 comprises two input fibers and one or more output fibers over which the ingress optical data signal may be spread proportionally. In some embodiments, the ingress optical data signal may not be spread proportionally across the output fibers of optical splitter 142. In some embodiments, optical splitter 142 may comprise two input fibers and two output fibers. A first input fiber of optical splitter 142 may be connected to primary fiber 132 and a second input fiber of optical splitter 142 may be connected to secondary fiber 134.

A first output fiber of optical splitter 142 may be connected to a DWDM 144. The DWDM 144 may be similar to DWDM 119 or any other coexistence filter element described herein. A second output fiber of optical splitter 142 may be connected to a DWDM 146, which may also be similar to DWDM 144, DWDM 119, or any other DWDM described herein. Because the downstream optical data signals may be multi-wavelength downstream optical data signals, including both multiple PON signals and multiple Ethernet signals, the DWDM 144 and DWDM 146 may receive the one or more PON signals and one or more Ethernet signals. The DWDM 144 and DWDM 146 may then demultiplex the one or more PON signals and one or more Ethernet signals from combined signals into the original multiple PON signals and Ethernet signals received at the OCML 101. For example, the DWDM 144 may receive the combined PON signal from the optical splitter 142 and may demultiplex the combined PON signal into the original one or more PONs signals received by the OCML 101 at the multiplexer 110 from the one or more OLTs. The MDM 170 may then output the one or more PON signals as one or more output PON signals (for example, output PON signal 148, which may correspond to PON signal 105, output PON signal 149, which may correspond to PON signal 107, and/or output PON signal 150 which may correspond to PON signal 109). Similarly, the DWDM 146 may receive the multi-wavelength downstream optical data signal (Ethernet signal) from the optical splitter 142 and may demultiplex the multi-wavelength downstream optical data signal into the original one or more Ethernet signals 118 received by the OCML 101 at the DWDM 119 from the Ethernet switch 115. The MDM 170 may then output the one or more Ethernet signals as one or more output Ethernet signals 152. In this manner, the one or more PON signals and one or more Ethernet signals may be transmitted across a network using a single OCML 101 over a single fiber (for example, primary fiber 132 and/or secondary fiber 134 without having to use additional modules for amplification purposes).

The above description of FIG. 1 may correspond to signals (for example, the one or more PON signals and/or the one or more Ethernet signals) being transmitted in the downstream direction (for example, from the one or more OLTs and the Ethernet switch to the MDM 170). Similarly, signals may be transmitted in the upstream direction (for example, from the MDM back upstream to the one or more OLTs and the Ethernet switch).

Beginning with PON signals, the MDM 170 may receive one or more upstream PON signals at the DWDM 144. In some cases, the upstream PON signals may be received at the same wavelengths associated with the one or more output PON signals described above. The upstream PON signals may then be multiplexed by the DWDM 144, which may output a combined upstream PON signal and may transmit the combined upstream PON signal to the optical splitter 142. Likewise, the MDM 170 may receive one or more upstream Ethernet signals 154 at the DWDM 146. Like the DWDM 144 with respect to the upstream PON signals, the DWDM 146 may multiplex the upstream Ethernet signals 154 and output a combined upstream Ethernet signal to the optical splitter 142. The optical splitter 142 may then transmit the combined upstream Ethernet signal and combined upstream PON signals over a single fiber (for example, the primary optical fiber 132 or the secondary optical fiber 134). Thus, the system 100 involves transmission of PON signals, and Ethernet signals over the same optical fiber in both the downstream and upstream direction.

From the MDM 170, the combined upstream Ethernet signal and combined upstream PON signal may be received by the OCML 101. In the upstream direction, the OCML 101 may use one or more Raman pumps (for example, one or more Raman pumps 156 associated with the primary optical fiber 132 and/or one or more Raman pumps 158 associated with the secondary optical fiber 134. Several Raman pumps with wavelengths and power levels optimized for maximum gain can be utilized. For instance, shorter links (<40 km) may only need two pumps, while longer (+60 m) links may utilize three pumps. The pump power and wavelengths may be chosen to maximize gain in the upstream C band signals used for the ethernet and NGPON2 in the ROCML configuration (for example, ITU 34 1550.12 nm to ITU 62 1527.99). The combined upstream Ethernet signal and combined upstream PON signal may then be provided to the WDM 137 or the WDM 139 (depending on the fiber that is used to transmit the combined upstream Ethernet signal and combined upstream PON signal from the MDM 170 to the OCML 101), and the combined upstream Ethernet signal and combined upstream PON signal may then be provied to the optical switch 130.

From the optical switch 130, the combined upstream Ethernet signal and combined upstream PON signal may be provided to the WDM 114. From the WDM 114, the combined upstream Ethernet signal and combined upstream PON signal may follow an upstream path 160 through the OCML 101. That is, from the WDM 114, the combined upstream Ethernet signal and combined upstream PON signal may be transmitted to the circulator 128. From the circulator 128, the combined upstream Ethernet signal and combined upstream PON signal may be transmitted to DCM 162 (which may function similarly to optional DCM 111, DCM 122, or any other DCM). From the DCM 162, the the combined upstream Ethernet signal and combined upstream PON signal may be transmitted to the circulator 120 and from the circulator 120 back to the DWDM 119. The DWDM 119 may then demultiplex the the combined upstream Ethernet signal and combined upstream PON signal into the original one or more upstream Ethernet signals and the one or more upstream PON signals received at the MDM 170. These demultiplexed signals may then be output back to the one or more OLTs and the Ethernet switch. For example, the DWDM 119 may demultiplex the combined upstream Ethernet signal and output one or more upstream output Ethernet signals 164 to the Ethernet switch 115. Likewise, the DWDM 119 may demultiplex the combined upstream PON signal and output one or more upstream output PON signals 116 to the one or more OLTs (for example, OLT 105, OLT 107, OLT 109, and/or any other number of OLTs). In this manner, as mentioned above, both Ethernet and PON signals may be transmitted across a network in the downstream and upstream directions using a single OCML 101 that may provide sufficient amplification for the Ethernet, and PON signals through the use of the one or more Raman pumps in the upstream direction.

Figure 1B:
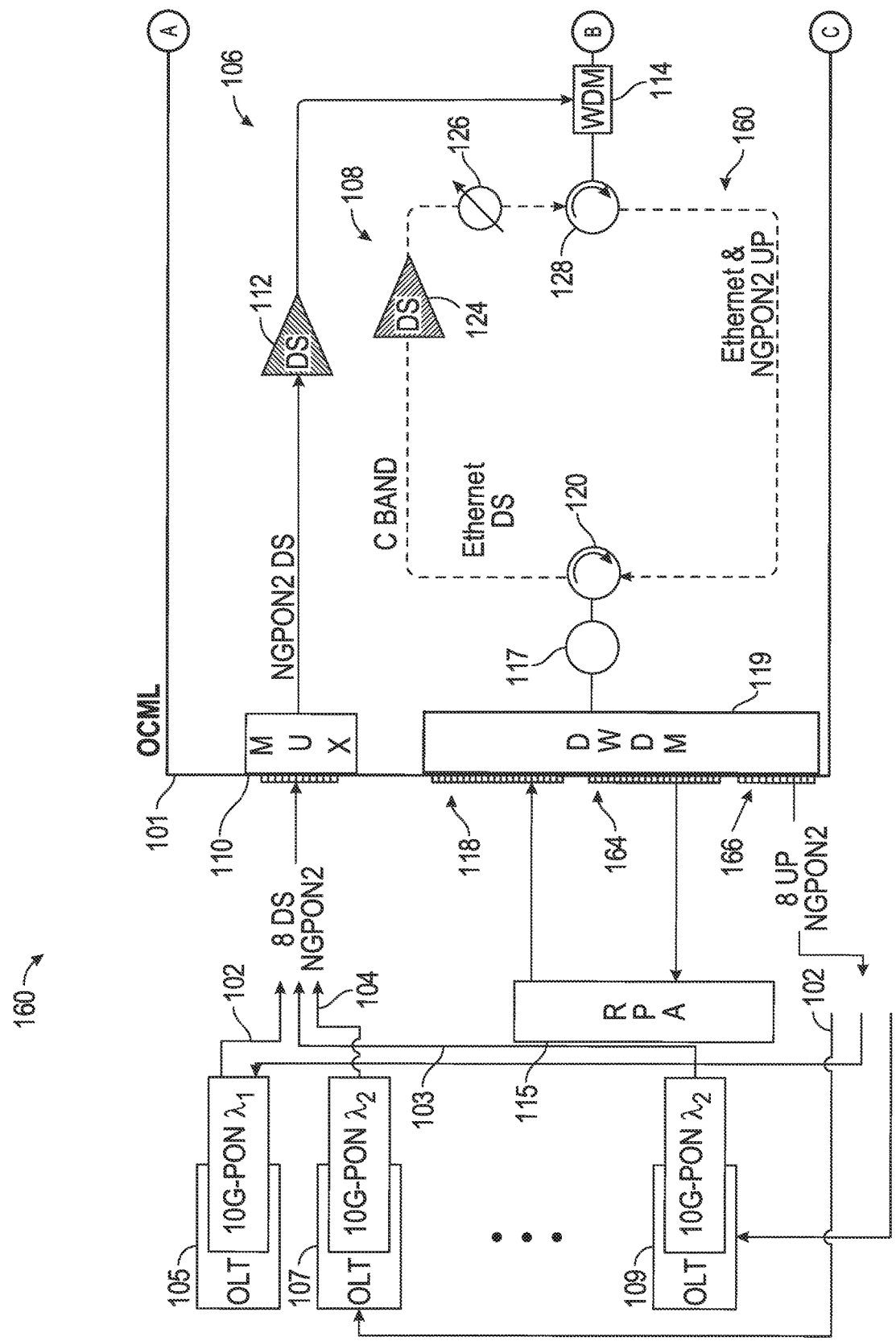

FIG. 1B depicts an example system 160. The system 160 may depict another example embodiment of a network that may involve at least Ethernet and PON signal transmissions. Similar to the system 100, the system 160 may include an OCML headend 161 (which may be similar to OCML headend 101), one or more optical line termination (OLT) devices placed at a central office (for example, OLT 105, OLT 107, OLT 109, and/or any other number of OLTs), and/or a MDM 170. The OCML headend 161 may include the same or similar elements as the OCML headend 101. However, the OCML headend 161 may differ from the OCML headend 101 in that the OCML headend 161 may include a DCM 117 in between the DWDM 119 and the circulator 120 (which may alternatively be a WDM as mentioned above). The DCM 117 may function similarly to optional DCM 111, DCM 122, and/or any other DCM described herein. That is, The DCM 117 may be used to compensate for dispersion that multi-wavelength downstream optical data signal may experience. In some embodiments, DCM 117 may be configured to balance positive and/or negative dispersion that may be introduced to the egress optical data signal by the fiber. In some embodiments, DCM 117 may be configured to compensate for positive (temporal broadening of the egress optical data signal) and/or negative (temporal contraction of the egress optical data signal) dispersion introduced by fiber that is 60 km or greater in length, to reduce the sensitivity or 0 SNR levels of a transceiver in a DWDM located at a field hub or outside plant. More specifically, DCM 117 may be configured to reduce the sensitivity or OSNR level requirement in a photodetector or fiber-optic sensor in the transceiver, which may drastically reduce the cost of the transceivers used in the DWDM located at the field hub or outside plant. Additionally, the DCM 117 in system 160 may be a fixed DCM and may be comprised of Dispersion Compensating Fiber (DCF-DCM). That is, in some cases, the DCMs depicted in the system 100 of FIG. 1A may be tunable DCMs, which may (in some cases) be brag-grating devices. The use of a non-tunable DCM may allow the DCM 117 to be bidirectional.

In some cases, embodiment depicted in FIG. 1B, with the DCM 117 in between the DWDM 119 and the circulator 120, may provide some advantages over the embodiment depicted in FIG. 1A. For example, the embodiment depicted in FIG. 1B may provide a lower-cost version of the system that may only require just one 20 km (or any other distance) DCM 117. In some cases, this may be because the DCM 117 may be a fiber DCM 117l and may be bidirectional. This may be used for fiber links from 5 to 35 km (or any other range). As an example, in this configuration, 128 PON subscribers can be supported per wavelength for a total of 1024 homes per node area. However, any other number of subscribers or homes may also be applicable. Additionally, it should be noted that while FIGS. 1A-1B shows DCMs at particular locations in systems 100 and 160; the location of the DCMs in either of these systems may not necessarily be limited to these locations, and may be found anywhere else in the systems as well.

Figure 2:
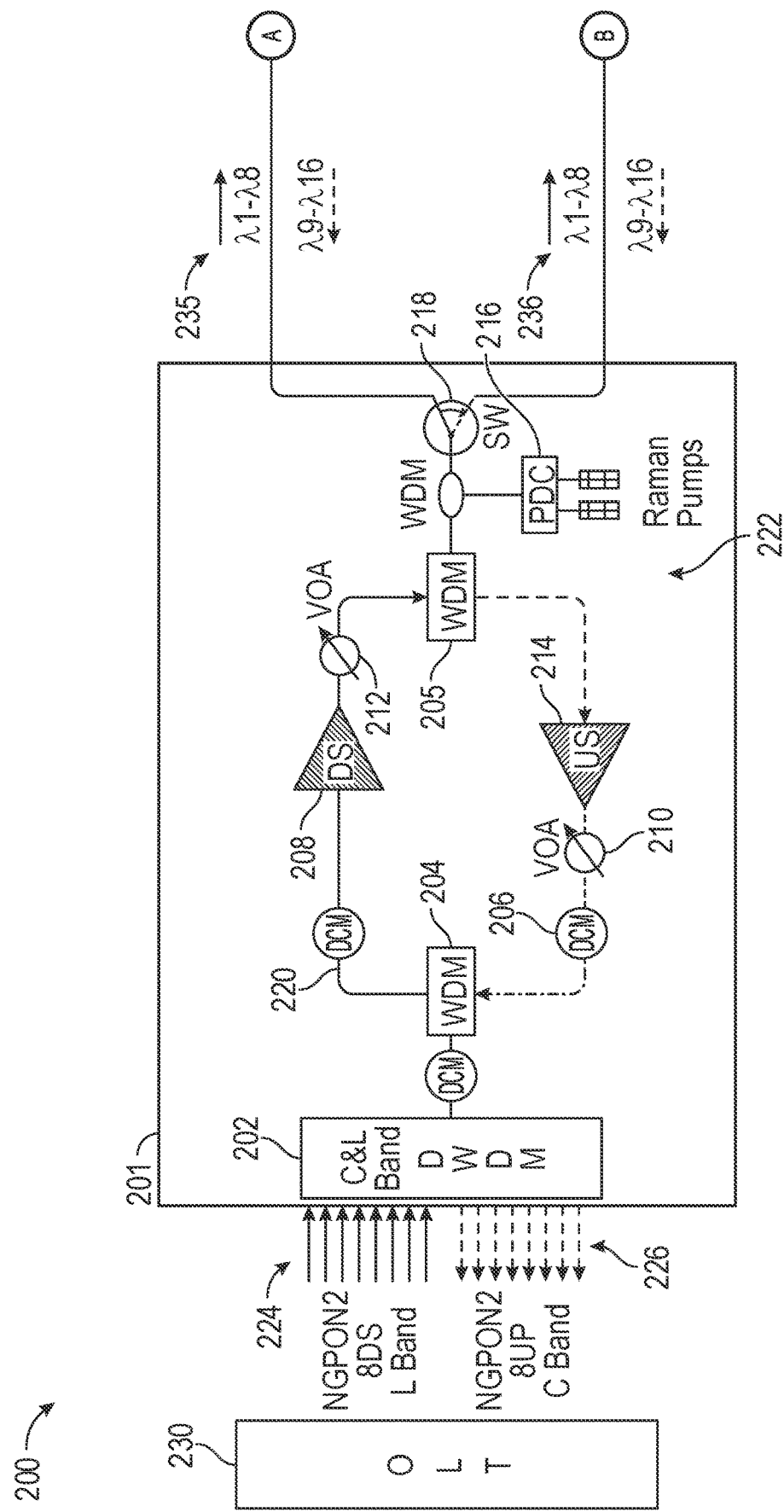
FIG. 2 depicts an example system including a discrete amplification module, in accordance with the disclosure.

FIG. 2 depicts another example system 200 that includes an example amplification module 201. In contrast with the OCML 101 depicted in FIG. 1, the amplification module 201 depicted in FIG. 2 may be a module that is separate from an OCML. That is, as described above, the OCML 101 depicted in FIG. 1 may have an integrated amplification module, whereas the amplification module 201 depicted in FIG. 2 may be an external amplification module. For example, the system 200 may be a PON network, and the amplification module 201 may be used for signal amplification within the PON network. However, the system 200 may alternatively include any other type of network as well (or any number of networks used in combination). Additionally, the amplification module 201 may also be used in conjunction with other devices in other networks as well. For example, the amplification module 201 depicted in FIG. 2 may interface with an OCML 201 that may also handle Ethernet signals (or other types of signals) in addition to the PON signals handled by the amplification module. In some embodiments, the amplification module 201 may include at least one or more dense wave division multiplexers (DWDMs) (for example, DWDM 202), one or more wavelength-division multiplexers (WDMs) (for example, WDM 204 and WDM 205), one or more dispersion compensation modules (DCMs) (for example, DCM 206, DCM 207, and DCM 209), one or more amplifiers (for example, amplifier 208 and amplifier 214), one or more variable optical amplifiers (VOAs) (for example, VOA 210 and VOA 212), one or more Raman pumps (for example, Raman pump 216), and/or one or more optical switches 218. In some embodiments, some of the elements included in the amplification module 201 may be used in downstream 220 signal transmissions (for example, DWDM 202, DCM 206 and/or DCM 207, WDM 204, amplifier 208, VOA 212, WDM 205, and/or optical switch 218), and some elements may be used in upstream 222 signal transmissions (for example, optical switch 218, Raman pump(s) 216, WDM 205, amplifier 214, VOA 212, DCM 206 and/or DCM 209, WDM 204, and/or DWDM 202). The system 200 including the amplification module 201 may further include an OLT 230, a multiplexer/demultiplexer module 240, and one or more power splitters (for example, power splitter 244, power splitter 246, power splitter 248, power splitter 250, and/or power splitter 252).

Figure 3:
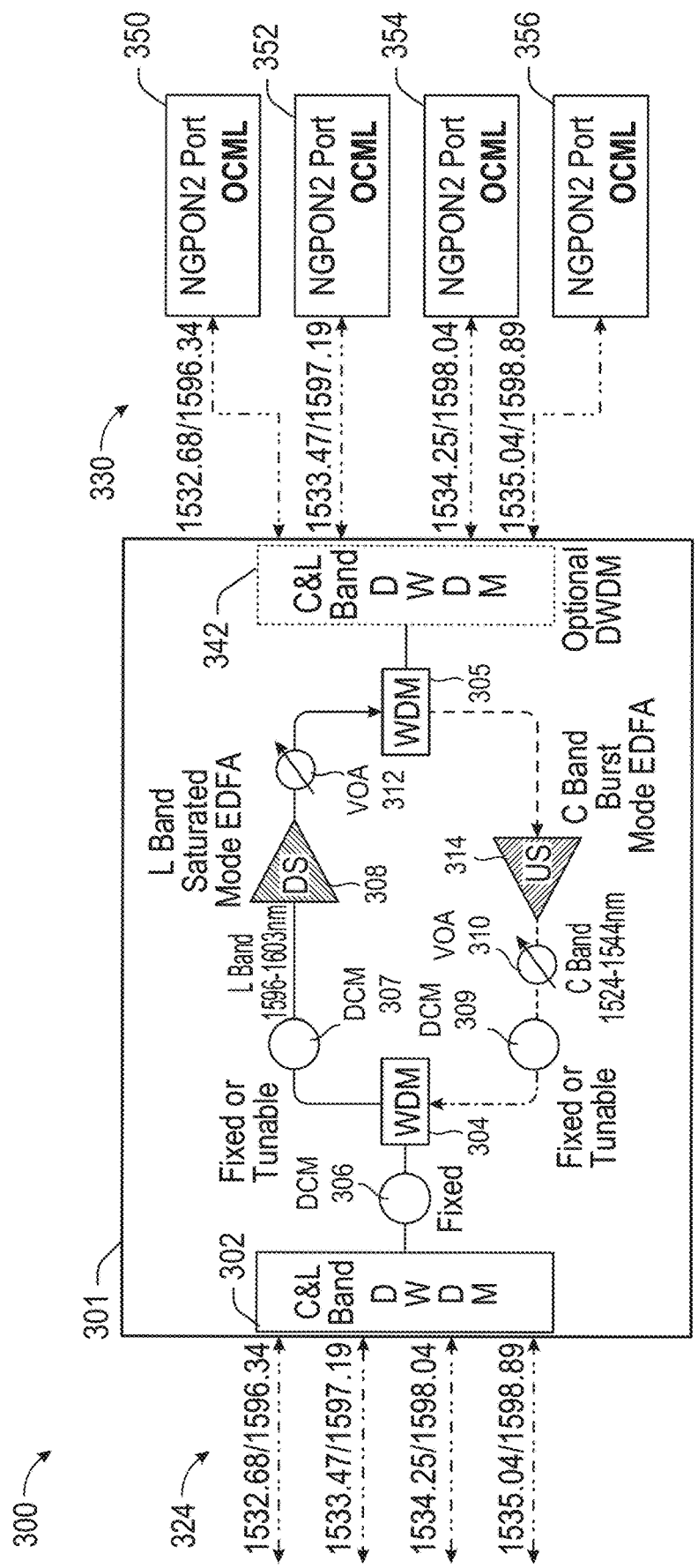
FIG. 3 depicts an example system including an amplification module used in conjunction with one or more Optical Communications Module Link (OCML) Extenders, in accordance with the disclosure.
Figure 4:
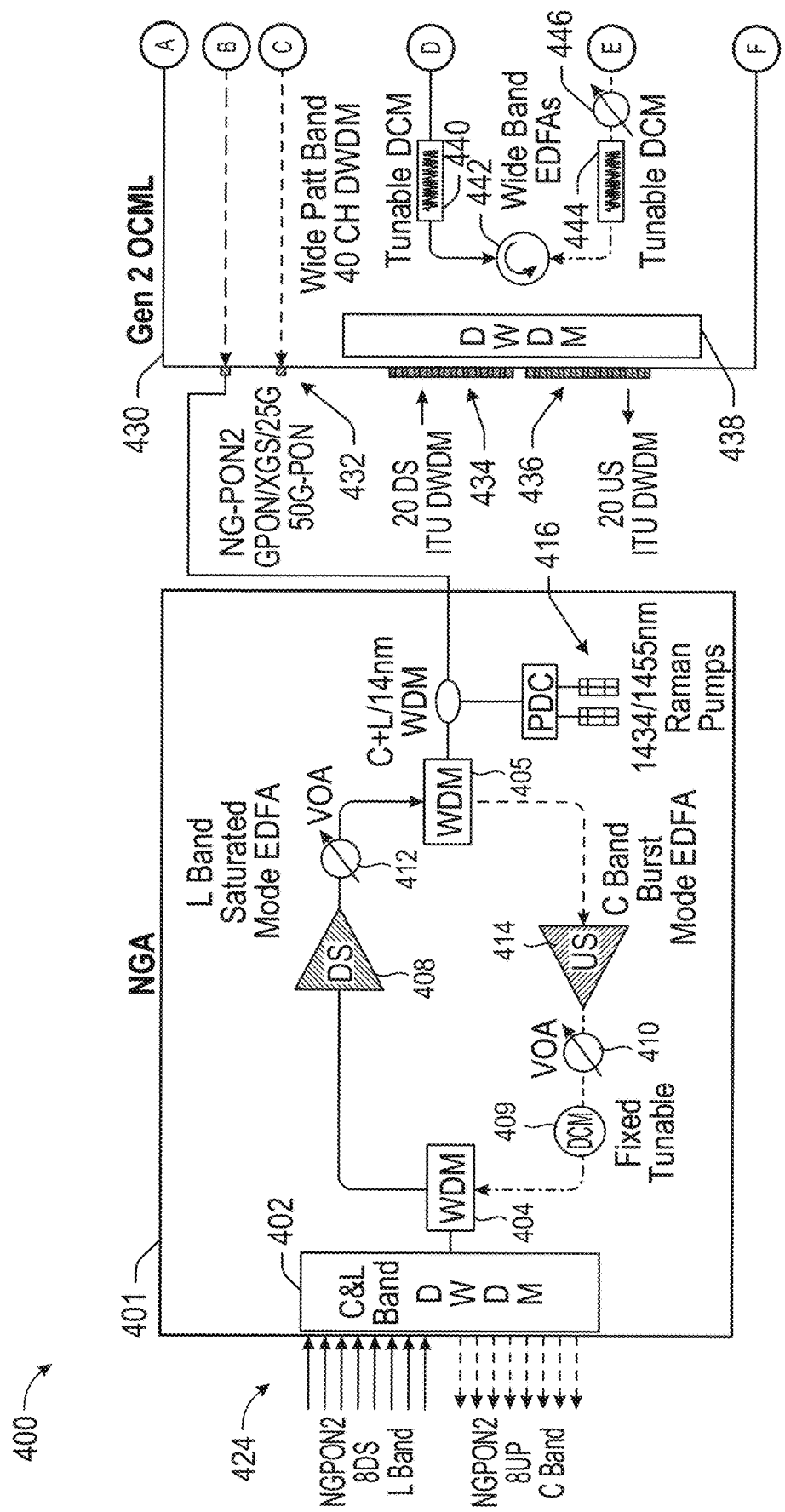
FIG. 4 depicts an amplification module used in conjunction with one or more Optical Communications Module Link (OCML) Extenders, in accordance with the disclosure.

Beginning with signal transmission through the amplification module 200 in the downstream 220 direction, the DWDM 202 may receive one or more input signals 224. The one or more inputs signals 224 may be received from the OLT 230. In some cases, the DWDM 202 may receive the input signals 224 over one or more L band channels (examples of which may be provided in Table 1 presented below), where each channel may be associated with a particular wavelength or a range of wavelengths that may be used for signal transmissions through the channel. However, in some cases, the one or more inputs 224 may also be received over both the L band and the C band, just the C band, or may also be received over any other wavelength as well. The figure may show the inputs 224 as including eight different L band channels, which may include signals of eight different wavelengths or wavelength ranges (however, any other number of inputs may also be used). The wavelengths and/or number of channels that are used may change depending on whether the amplification module 201 is used in conjunction with an OCML (for example, as illustrated in FIGS. 2-4). The DWDM 202 may serve to multiplex the one or more inputs 224 into a multi-wavelength downstream optical data signal. The multi-wavelength downstream optical data signal may have a wavelength range comprising the wavelengths included in the one or more inputs 224. In other words, the multi-wavelength downstream optical data signal may be a signal transmission that may include some or all of the input signals 224 combined as a single signal transmission. The multi-wavelength downstream optical data signal may subsequently be provided from the WDWM 202 to the DCM 206. However, in some embodiments, as mentioned below, the amplification module 206 may not include the DCM 206 and the multi-wavelength downstream optical data signal may be provided directly to the WDM 204 from the DWDM 202.

TABLE 1

| Channel | Central Frequency (THz) | Wavelength (nm) |
|---------|------------------------|-----------------|
| 1 | 187.8 | 1596.34 |
| 2 | 187.7 | 1597.19 |
| 3 | 187.6 | 1598.04 |
| 4 | 187.5 | 1598.89 |
| 5 | 187.4 | 1599.75 |
| 6 | 187.3 | 1600.60 |
| 7 | 187.2 | 1601.46 |
| 8 | 187.1 | 1602.31 |

After being output by the DWDM 202, the multi-wavelength downstream optical data signal may be provided to the DCM 206 to compensate for dispersion that the multi-wavelength downstream optical data signal may experience. In some embodiments, DCM 206 may be configured to balance positive and/or negative dispersion that may be introduced to the egress optical data signal by the fiber. In some embodiments, DCM 206 may be configured to compensate for positive (temporal broadening of the egress optical data signal) and/or negative (temporal contraction of the egress optical data signal) dispersion introduced by fiber that is 60 km or greater in length, to reduce the sensitivity or OSNR levels of a transceiver in a DWDM located at a field hub or outside plant. More specifically, DCM 206 may be configured to reduce the sensitivity or OSNR level requirement in a photodetector or fiber-optic sensor in the transceiver, which may drastically reduce the cost of the transceivers used in the DWDM located at the field hub or outside plant. Additionally, the DCM 206 may also be tunable. That is, the DCMs can be tuned based on the transmission distance of a signal. For example, if a signal is being transmitted over a 60 km fiber, the tunable DCM may be tuned differently than if the signal were being transmitted over a 5 km fiber. The tunable DCM may be a Fiber Bragg Grating (FBG) type DCM previously described. Submitting the tunable DCM (for example, the FBG) to a temperature gradient may allow a grating chirp to be changed and, accordingly, the dispersion level of the tunable DCM to be tuned. Seven single gratings can be used for producing negative dispersion over a typical range from −800 to −2000 ps/nm or for producing a similar positive dispersion range. This means that the fiber link can be totally managed for dispersion for all distances which may range from 5 km to 60 km, or even greater distances. From the DCM 206, the signal may be provided to the WDM 204. In some embodiments any of the DCMs included in the amplification module 201 may be optional. For example, the amplification module 201 may not include the DCM 206, but may rather only include the DCM 207 and/or the DCM 209. In some embodiments, the amplification module 201 may only include the DCM 206. That is, the figure may only depict example locations in which one or more DCMs may be included within the amplification module 201, but the amplification module 201 may not necessarily include all of the depicted DCMs.

The multi-wavelength downstream optical data signal may subsequently be provided to the WDM 204 (from the DWDM 202 or from the DCM 206 depending on the particular embodiment). As is depicted in the figure, signals being transmitted both in the downstream 220 direction and in the upstream 222 direction may pass through the WDM 204. The WDM 204 may serve to combine or separate signals in the downstream L band and the upstream C band (in embodiments in which the downstream includes the L band and the upstream includes the C band).

In some embodiments, the signal output from the WDM 204 (or the DCM 207 in embodiments in which the DCM 207 is included) may be provided to amplifier 208, which may be a wide-band amplifier. More specifically, the amplifier 208 may be an Erbium-Doped Fiber Amplifier (EDFA). The amplifier 208 may optimize gain flatness and noise for the broader channel. A gain of the amplifier 208 may be based, at least in part, on a distance that a downstream signal must travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, the gain of amplifier 208 may be adjusted based at least in part on the attenuation coefficient and length of fiber that the egress optical data signal will travel. More specifically, in some instances, the gain of booster optical amplifier 224 may be $G=e^{(2\alpha L)}$ where a is the fiber attenuation coefficient, as explained above, and L is the length of the fiber. The downstream optical data signals received from the WDM 204 (or the DCM 207 in embodiments in which the DCM 207 is included) may be amplified by amplifier 208 and may be provided to VOA 212.

In some embodiments, VOA 212 may receive the amplified downstream optical data signal as an input and may be used to reduce the power levels of the downstream optical data signal. The power reduction may accomplished by absorption, reflection, diffusion, scattering, deflection, diffraction, and dispersion of the amplified downstream optical data signals. VOA 212 may have a working wavelength range in which it absorbs all light energy equally. In some embodiments, VOA 212 may utilize a length of high-loss optical fiber that operates upon its input optical signal power level in such a way that its output signal power level is less than the input level. The variability of the output power level of VOA 212 may be achieved using a fiber coupler, where some of the power is not sent to the port that outputs but to another port. Another possibility may be to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 212 may be based on some piece of doped fiber exhibiting absorption within a certain wavelength range. The VOA 212 may also be tuned in synchronization with any of the tunable DCMs included in the amplification module 201 (for example, DCM 206, DCM 207, and/or DCM 209). That is, the tunable DCMs and the VOA 212 may be tuned for the same transmission distance. The VOA 212 may output the amplified downstream optical data signals to WDM 205. In some embodiments, the WDM 205 may operate similarly to the WDM 204. That is, the WDM 205 may serve to combine or separate signals in the downstream L band and the upstream C band (in embodiments in which the downstream includes the L band and the upstream includes the C band). Including a DCM in both downstream and upstream directions may allow future transport of 25 G signals.

In some embodiments, from the WDM 205, the signal may be provided to the optical switch 218. The optical switch 218 may be used to determine which fiber to use to transmit the downstream signal from the amplification module 201 to the one or more customer devices (not shown in the figure). For example, the optical switch 218 may use a first fiber 235, a second fiber 236, and/or any other number of additional fibers to transmit the signal. The ability of the optical switch 218 to select between different fibers may be beneficial in that one fiber may serve as a backup in the event that a primary fiber is experiencing an issue that may impact signal transmission. For example, fiber 235 may serve as the primary fiber for signal transmission, and fiber 236 may be used as a backup fiber if the fiber 235 is experiencing transmission issues.

After traveling down the first fiber 235 and/or the second fiber 236, the downstream signal may be received by a multiplexer/demultiplexer module 240. The multiplexer/demultiplexer module 240 may include a DWDM 242 that may serve to demultiplex the downstream signal received over the first fiber 235 or the second fiber 236 into the multiple wavelengths included within the downstream signal (for example, the DWDM 242 may serve to demultiplex the received combined signal to separate out the original input signals 224 received by the amplification module 201 from the OLT 230). The individual output signals from the multiplexer/demultiplexer module 240 (for example, output signal 250, output signal 252, output signal 254, output signal 256, and/or output signal 258) may be provided to individual power splitters (for example, power splitter 244, power splitter 246, power splitter 248, power splitter 250, and/or power splitter 252), and subsequently may be provided to one or more customer devices (not shown in the figure).

Turning to signal transmission in the upstream direction, one or more signals may be transmitted by the one or more customer devices back through the amplification module 201 and to the OLT 230. In some cases, the one or more upstream signals from the customer devices may be transmitted over the C band. Non-limiting examples of wavelengths that may be used for these upstream C band transmissions may be shown below in Table 2 (however, any other wavelengths may also be applicable as well). However, in some cases, the one or more upstream optical data signals may also be transmitted over both the L band and the C band, just the L band, or may also be received over any other wavelength as well. These ingress optical data signals may be received by the multiplexer/demultiplexer module 240. More specifically, the ingress optical data signals from the customer devices may be received by the DWDM 242. The DWDM 242 may then function similarly to the DWDM 202 at the amplification module 201 in the downstream 220 direction. For example, the DWDM 242 may multiplex the one or more ingress optical data signals including multiple C band wavelength channels into a multi-wavelength upstream optical data signal. That is, the DWDM 242 may serve to both demultiplex downstream signals and to also multiplex upstream signals. The multi-wavelength upstream optical data signal may then be transmitted back to the amplification module 201 in the upstream direction over the one or more fibers (for example, the fiber 235 and/or the fiber 236).

In some embodiments, the amplification module 201 may receive the upstream signal transmission from the multiplexer/demultiplexer module 240 at the optical switch 218. The optical switch 218 may then provide the upstream signal to one or more Raman pumps 216. Any number of Raman pumps may be used. Downstream signals may be broadcasted to all customer devices (for example, the same signals may be sent to all customer devices simultaneously so standard saturated mode EDFAs can be utilized). Upstream signals may be Time-Wavelength-Division-Multiplexed signals (TWDM-PON). That is, the upstream signals may not be transmitted at the same time, so the signals may be "bursty" in nature. The Raman pumps may then in the upstream direction may allow for better performance since they may not contribute to overall signal noise. This may be a factor in longer fiber links which may be limited by an actual optical signal to noise ratio (OSNR) of an upstream EDFA (EDFAs may add noise depending on the input optical power provided to the EDFA).

In some embodiments, the remaining elements included in the upstream 222 signal transmission direction of the amplification module 201 may also function similarly to the elements included in the downstream 220 direction. That is, the WDM 205 may receive the upstream signal and may serve to combine or separate signals in the downstream L band and the upstream C band (in embodiments in which the downstream includes the L band and the upstream includes the C band). From the WDM 205, the upstream signal may travel to the amplifier 214. The amplifier 214 may provide the signal to the VOA 210, which may provide the signal to the DCM 209, the WDM 204, and/or the DCM 206 depending on the DCMs that are included in the amplification module 201. For example, as mentioned above, in some embodiments, the amplification module 201 may only include the DCM 206, the DCMs 207 and 209, or any other combination of DCMs. In embodiments in which only the DCM 206 is included, then the upstream signal may travel from the VOA 210 directly to the WDM 204, from the WDM 204 to the DCM 206, and then to the DWDM 202. However, if the DCM 207 and DCM 209 are included and the DCM 206 is not included, then the upstream signal may travel from the VOA 210 to the DCM 209, from the DCM 209 to the WDM 204, and then directly from the WDM 204 to the DWDM 202. Finally, The DWDM 202 may then demultiplex the combined upstream data signal into one or more output signals 226, and the one or more output signals may be output from the amplification module 201 and transmitted to the OLT 230.

FIG. 3 depicts an example system 300 including an amplification module 301 that may be used in conjunction with one or more Optical Communications Module Link (OCML) Extenders (for example, OCML 350, OCML 352, OCML 354, and/or OCML 356, as well as any other number of OCMLs). Using the amplification module 301 in conjunction with one or more OCMLs may allow for Ethernet signals to be transmitted on the same fiber as signals being transmitted over a PON network. For example, the amplification module 301 may receive signals over a PON network, provide the signals to the one or more OCMLs, and the one or more OCMLs may also separately receive one or more Ethernet signals. The OCMLs may then be able to transmit the PON signals from the amplification module 301 as well as the Ethernet signals (and any other signals received by the OCMLs).

In some embodiments, the amplification module 301 may be the same as, or similar to, the amplification module 201 depicted in FIG. 2. That is, the amplification module 301 may include at least one or more dense wave division multiplexers (DWDMs) (for example, DWDM 302 and DWDM 342), one or more wavelength-division multiplexers (WDMs) (for example, WDM 304 and WDM 305), one or more dispersion compensation modules (DCMs) (for example, DCM 306, DCM 307, and DCM 309), one or more amplifiers (for example, amplifier 308 and amplifier 314), one or more variable optical amplifiers (VOAs) (for example, VOA 310 and VOA 312). Although not depicted in the figure, the amplification module 301 may also include one or more Raman pumps and/or an optical switch as well. In some embodiments, the system 300 in which the amplification module 301 is included may also include one or more OCMLs (for example, OCML 350, OCML 352, OCML 354, and/or OCML 356, as well as any other number of OCMLs). In some embodiments, the amplification module 301 may differ from the amplification module 101 in that the amplification module 301 may include a second DWDM (for example, DWDM 342). Similar to the DWDM 242 included in the multiplexer/demultiplexer module 242 in FIG. 2, the DWDM 342 may receive a downstream multi-wavelength downstream optical data signal and may demultiplex the multi-wavelength downstream optical data signal into individual signals at different wavelengths or wavelength ranges to provide to the individual OCMLs. However, the DWDM 342 may be optional in that the multi-wavelength downstream optical data signal may simply be provided to a signal OCML or all of the OCMLs.

In some embodiments, a signal may traverse through the elements of the amplification module 301 in a similar manner in which a signal may traverse through the elements of the amplification module 201. For example, the DWDM 302 may receive one or more inputs 324. The one or more inputs 324 may be received from an OLT, for example (not shown in the figure). The one or more inputs may include individual signal inputs received over different L or C band channels at different wavelengths and/or wavelength ranges (the specific wavelengths and number of inputs depicted in the figure may merely be exemplary). The DWDM 302 may multiplex the one or more inputs 324 to produce a multi-wavelength downstream optical data signal. The multi-wavelength downstream optical data signal may then be provided to either the DCM 306 or the WDM 304 depending on the embodiments (that is, the amplification module may include any of the DCM 306, DCM 307, or DCM 309 in any combination similar to the amplification module 101). From the WDM 304, the signal may be provided to the DCM 307 (in embodiments in which the DCM 307 is used). The signal may then be provided to the amplifier 308, the VOA 310, the WDM 305, and the DWDM 342. Finally, the DWDM may demultiplex the multi-wavelength upstream optical data signal back into individual signals, and the individual signals may be provided to the one or more OCMLs (for example, OCML 350, OCML 352, OCML 354, and OCML 356) as one or more outputs 330. In some cases, the one or more outputs may correspond to the same wavelengths or wavelength ranges included in the one or more inputs 324. That is, the one or more inputs 324 may traverse the amplification module 301 as a combined multi-wavelength downstream optical data signal, and may be separated again before being output from the amplification module 301 and provided to the one or more OCMLs.

In some embodiments, a signal may also transmit in the upstream direction in a similar manner. That is, the one or more OCMLs may provide one or more upstream signals to the amplification module 301. The one or more upstream signals may be transmitted over the same wavelengths as the outputs 330, in some cases. The amplification module 301 may receive the one or more upstream signals at the DWDM 342, which may multiplex the one or more upstream signals into a single multi-wavelength upstream optical data signal (similar to the manner in which the DWDM 202 multiplexes the one or more inputs 224 into the multi-wavelength downstream optical data signal). The multi-wavelength upstream optical data signal may then be provided to the WDM 305. The WDM 305 may receive the upstream signal and may serve to combine or separate signals in the downstream L band and the upstream C band (in embodiments in which the downstream includes the L band and the upstream includes the C band). From the WDM 305, the upstream signal may travel to the amplifier 314. The amplifier 314 may provide the signal to the VOA 310, which may provide the signal to the DCM 309, the WDM 305, and/or the DCM 306, depending on the DCMs that are included in the amplification module 301. For example, as mentioned above, in some embodiments, the amplification module 301 may only include the DCM 306, the DCMs 307 and 309, or any other combination of DCMs. In embodiments in which only the DCM 106 is included, then the upstream signal may travel from the VOA 310 directly to the WDM 304, from the WDM 304 to the DCM 306, and then to the DWDM 302. However, if the DCM 307 and DCM 309 are included and the DCM 306 is not included, then the upstream signal may travel from the VOA 310 to the DCM 309, from the DCM 309 to the WDM 304, and then directly from the WDM 304 to the DWDM 302. Finally, The DWDM 302 may then demultiplex the combined upstream data signal into one or more output signals, and the one or more output signals may be output from the amplification module 301 and transmitted to the OLT.

FIG. 4 depicts another example system 400 that includes an example amplification module 401 used in conjunction with an OCML 430. In FIG. 4, the OCML 430 may be illustrated in greater detail than the OCMLs depicted in FIG. 3. In some embodiments, the amplification module 401 may be the same as, or similar to, the amplification module 301 depicted in FIG. 3, the amplification module 301 depicted in FIG. 3, or any other amplification module depicted and/or described herein. That is, the amplification module 401 may include at least one or more dense wave division multiplexers (DWDMs) (for example, DWDM 402), one or more wavelength-division multiplexers (WDMs) (for example, WDM 404 and WDM 405), one or more dispersion compensation modules (DCMs) (for example, DCM 409), one or more amplifiers (for example, amplifier 408 and amplifier 414), one or more variable optical amplifiers (VOAs) (for example, VOA 410 and VOA 412). The amplification module 401 may also include one or more Raman pumps 416 and/or an optical switch (not depicted in the figure) as well. The amplification module 401 may also include any other elements depicted in any other amplification module that may not be depicted in the amplification module 401. For example, the amplification module 401 may only depict one DWDM 402 in contrast with the two DWDMs illustrated in the amplification module 301 of FIG. 3. This second DWDM may be added to the amplification module 401 as well, for example, if the amplification module 401 were to transmit output signals to multiple OCMLs or other downstream devices. As a second example, the amplification module 401 may include any number of DCMs in addition to DCM 409. For example, the amplification module 401 may include a DCM between the DWDM 402 and the WDM 404 and/or a DCM between the WDM 404 and the amplifier 408 (corresponding to DCMs 306 and 307 in FIG. 3).

In some embodiments, a signal may traverse through the elements of the amplification module 401 in a similar manner in which a signal may traverse through the elements of the any other amplification module described herein. For example, the DWDM 402 may receive one or more inputs 424. The one or more inputs 424 may be received from an OLT, for example (not shown in the figure). The one or more inputs may include individual signal inputs received over different L or C band channels at different wavelengths and/or wavelength ranges (the specific wavelengths and number of inputs depicted in the figure may merely be exemplary). The DWDM 402 may multiplex the one or more inputs 424 to produce a multi-wavelength downstream optical data signal. The multi-wavelength downstream optical data signal may then be provided to the WDM 204 (or to a DCM that is not depicted in the figure if such a DCM were included in an embodiment). From the WDM 204, the signal may be provided to the amplifier 208, the VOA 210, and the WDM 205. The signal may also be provided to any other elements not depicted in FIG. 4 that may be depicted in other amplification modules (such as a second DWDM, a second DCM, etc.). Finally, the amplification module 401 may output the multi-wavelength downstream optical data signal to the OCML 430. In some cases, the one or more outputs may correspond to the same wavelengths or wavelength ranges included in the one or more inputs 424. That is, the one or more inputs 424 may traverse the amplification module 401 as a combined multi-wavelength downstream optical data signal, and may be separated again before being output from the amplification module 401 and provided to the OCML 430.

In some embodiments, a signal may also transmit in the upstream direction in a similar manner. That is, the OCML 430 may provide one or more upstream signals to the amplification module 401. The amplification module 401 may receive the one or more upstream signals at the Raman pumps 416 (any number of Raman pumps may be used). As depicted in the figure, the Raman pumps may alternatively be included within the OCML 430 instead of the amplification module 401 (for example, shown as Raman pumps 460 in the OCML 430). Any number of Raman pumps may be used in the OCML 430 and/or the amplification module 401. In some cases, Raman pumps may be included in both the OCML 430 and the amplification module 401. Additionally, Raman pumps may be included in any amplification module and/or any OCML depicted in any of the other figures included herein as well (even those that do not depict Raman pumps). The multi-wavelength upstream optical data signal may then be provided to the WDM 405. The WDM 405 may receive the upstream signal and may serve to combine or separate signals in the downstream L band and the upstream C band (in embodiments in which the downstream includes the L band and the upstream includes the C band). From the WDM 405, the upstream signal may travel to the amplifier 414. The amplifier 414 may provide the signal to the VOA 410, which may provide the signal to the DCM 409, and the WDM 405. Finally, The DWDM 402 may then demultiplex the combined upstream data signal into one or more output signals, and the one or more output signals may be output as output signals 426 from the amplification module 401 and transmitted to the OLT.

In some embodiments, the OCML 430 may provide a more detailed depiction of an OCML that may be used in conjunction with an amplification module (for example, amplification module 101, amplification module 201, amplification module 401, and/or any other amplification module) as described herein. Even further depictions of an example OCML may be found in at least FIGS. 4-6 as well. In some embodiments, the OCML 430 may be located at a headend, but may also be located at any other portion of the system 400 (for example, any other portion of a network as described herein). As shown in FIG. 4, OCML 430 may be a smart integrated OCML headend, which may be a circuit comprising one or more DWDMs (for example, DWDM 438), one or more circulators (for example, circulator 442 and 446), one or more DCMs (for example, DCM 440 and 444) (which may be tunable or fixed DCMs), one or more VOAs (for example, VOA 446 and/or VOA 452), one or more WDMs (for example, WDM 464 and WDM 468), one or more amplifiers (for example, optical amplifier 450 and/or optical amplifier 448), one or more filtering elements 458, and one or more optical switches (for example, optical switch 462) to feed a primary optical fiber (for example, Primary Fiber 480) or secondary (backup) optical fiber (for example, Secondary Fiber 482) (as well as any number of additional fibers). The OCML 430 may provide a method for transporting multiple signals using the C band and L band of signal wavelengths. In some instances, the C band may refer to a range of wavelengths from 1528.8 to 1566.3 and the L band may refer to a range of wavelengths from 1568.77 to 1610.49, for example. Examples of signals that may be transported using these wavelength bands may include at least GPON/XGPON/10 GEPON,25 G/50 G PON, 25 G Non-return-to-zero (NRZ), 25 G Quasi-Coherent, 25 and/or 50 G Pulse-Amplitude Modulation (PAM4), 100-600 G Coherent, and/or Duo-Binary signals (and/or any other type of signal) and a field hub or outside plant. The MTC facility may be an inside plant facility where a cable company acquires and combines services to be offered to customers. The MTC facility may provide these combined services to customers, by transmitting and receiving optical signals over a plurality of optical fibers to a field hub or outside plant which connects the plurality of optical fibers to a customer's premise. The OCML 430 may be located in a secondary terminal center (STC) that connects the MTC facility to a field hub or outside plant housing a multiplexer-demultiplexer (MDM) 490. The OCML 430 may also be located in the MTC or in any other location along a transmission path of the signals.

In some embodiments, the OCML 430 may be used to transport a mix of multi-wavelength signals, which may include, for example, 10-400 GbE, GPON, XGPON/1OGE-PON, 25 G Non-return-to-zero (NRZ), 25 G Quasi-Coherent, 25 and/or 50 G Pulse-Amplitude Modulation (PAM4), 100-600 G Coherent, and/or Duo-Binary signals, over the same optical fiber without having active devices such as optical amplifiers in the field. These are merely examples of signals that may be transported, and any other type of signal may also be transported as well. Throughout the disclosure reference may be made to any individual example signal or a combination of example signals, but any other type of signal could similarly be applicable. The OCML 430 may also be configured to support the same wavelengths over a secondary optical fiber via an optical switch in case the primary optical fiber experiences a cut. In one embodiment, an OCML 430, systems, and methods may include various subsystems integrated into a single module including an integrated DWDM passive circuit that combines and separates bi-directional wavelengths in optical fibers propagating in a conventional wavelength window, such as the c band dispersive region of the optical fibers. The OCML 430 may comprise one or more DWDMs, one or more circulators, one or more DCMs (which may be tunable DCMs), one or more VOAs, one or more WDMs, one or more amplifiers, one or more coexistence filtering elements, and one or more optical switches to feed a primary optical fiber or secondary (backup) optical fiber, (as well as any number of additional fibers).

In some embodiments, OCML 430 may comprise at least twenty-four downstream transponders 434 and at least twenty-four upstream transponders 436. In some cases, the OCML 430 may also comprise any other number of downstream transponders 434 and/or upstream transponders 436. That is, while reference may be made herein to "twenty-four" transponders, this should not be taken as limiting, and any other number may also be applicable. The downstream transponders 434 may transmit downstream data over twenty-four wavelengths. The upstream transponders 436 may receive upstream data over, such as, for example, GPON/XGPON/10 GEPON, 25 G Non-return-to-zero (NRZ), 25 G Quasi-Coherent, 25 and/or 50 G Pulse-Amplitude Modulation (PAM4), 100-600 G Coherent, Duo-Binary, and/or any other type of signal. In some instances, twelve of the downstream transponders 434 may use the C band and twelve of the downstream transponders 434 may use the L band. Similarly, twelve of the upstream transponders 436 may use the C band and twelve of the upstream transponders 436 may use the L band. However, any other combination of numbers of wavelengths for the C and L bands may also be applicable as well. For example, all of the downstream transponders 434 may use the L band or the C band and all of the upstream transponders 436 may use the L band or C band. In even further instances, any other wavelengths may also be used. Additionally, the downstream and upstream signal wavelengths may be capable of transporting signals on adjacent channels, rather than using a block of channels for downstream transmission and a block of channels for upstream transmission, with a guard band of a particular number of wavelengths included between the two channel blocks. Alternatively, the downstream and upstream signal wavelengths may still be transmitted in separate blocks, however.

OCML 430 may also comprise one or more PON connectors 432, which may be used to transmit/receive any type of PON signal, such as, for example, GPON, XGPON, NG-PON2, 2 5G/50 G-PON, and/or any other type of PON signal. In some cases, the one or more PON connectors 432 may receive output PON signals from the amplification module 401. OCML 430 may also comprise a primary optical fiber (for example, primary optical fiber 480) and a secondary optical fiber (for example, secondary optical fiber 482) that transmit and receive a plurality of optical signals. Primary optical fiber 480 and secondary optical fiber 482 may transmit a first plurality of signals from OCML 430 to an outside plant, and may receive a second plurality of signals from the outside plant. In some embodiments, any other number of optical fibers may be provided (for example, more than just the primary and secondary optical fibers).

In some embodiments, downstream transponders 434 and upstream transponders 436 may comprise connectors belonging to the laser shock hardening (LSH) family of connectors designed to transmit and receive optical data signals between DWDM 402 and one or more servers (not shown). In other embodiments, downstream transponders 434 and upstream transponders 436 may also comprise E2000 connectors and may utilize a 1.25 millimeter (mm) ferrule. downstream transponders 434 and upstream transponders 436 may be installed with a snap-in and push-pull latching mechanism, and may include a spring-loaded shutter which protects the ferrule from dust and scratches. The shutter may close automatically once the connector is disengaged, locking out impurities, which could later result in network failure, and locking in possibly damaging lasers. downstream transponders 434 and upstream transponders 436 may operate in a single mode or a multimode. In single mode, downstream transponders 434 and upstream transponders 436 only one mode of light may be allowed to propagate. Because of this, the number of light reflections created as the light passes through the core of single-mode downstream transponders 434 and upstream transponders 436 decreases, thereby lowering attenuation and creating the ability for the optical data signal to travel further. Single mode may be for use in long distance, higher bandwidth connections between one or more servers and DWDM 438. In multimode, downstream transponders 434 and upstream transponders 436 may have a large diameter core that allows multiple modes of light to propagate. Because of this, the number of light reflections created as the light passes through the core increases, creating the ability for more data to pass through at a given time. Multimode downstream transponders 434 and upstream transponders 436 may generate high dispersion and an attenuation rate, which may reduce the quality of an optical data signal transmitted over longer distances. Therefore, multimode may be used to transmit optical data signals over shorter distances. In some embodiments, the downstream transponders 434 and upstream transponders 436 may also comprise any other types of connectors as well.

In some embodiments, OCML 430 can transmit and receive up to at least twenty-four bi-directional optical data signals (or more than twenty-four signals in some instances), but the actual number of optical data signals may depend on operational needs. That is, OCML 430 can transport more or less than twenty-four downstream optical signals, or more or less than twenty-four upstream optical data signals, based on the needs of customers' networks. These customer networks may be connected to OCML 430 through an optical ring network (for example, a metro access optical ring network).

The operation of OCML 430 may be described by way of the processing of downstream optical data signals transmitted from OCML 430 to a field hub or outside plant, and the processing of upstream optical data signals received from the field hub or outside plant. In terms of downstream processing, each of the transponders of downstream transponders 434 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty-four transponders in downstream transponders 434 may each receive a SONET/SDH optical data signal, and each of the twenty-four transponders may convert the received SONET/SDH optical data signal into a corresponding second optical data signal, wherein each of the corresponding second optical data signals may have a unique wavelength. That is, the wavelength of each of the corresponding second optical data signals may be distinguishable from the wavelength of any of the other corresponding second optical data signals. Thus downstream transponders 434 may generate twenty-four corresponding second optical data signals each of which has a unique wavelength.

DWDM 438 may receive the twenty-four corresponding second optical data signals over the L and C bands as an input and output a multi-wavelength downstream optical data signal comprising the twenty-four corresponding second optical data signals onto a fiber. More specifically, DWDM 438 may multiplex the twenty-four corresponding second optical data signals onto the fiber, wherein the twenty-four multiplexed corresponding second optical data signals compose the multi-wavelength downstream optical data signal. The multi-wavelength downstream optical data signal may have a wavelength comprising the twenty-four wavelengths of the twenty-four corresponding second optical data signals.

In some embodiments, the multi-wavelength downstream optical data signal may be input to a circulator (e.g., circulator 442). The circulator 442 may allow additional optical wavelengths to be utilized (for example, the full array of wavelengths included in the 48 total channels) and may enable technologies such as Quasi-Coherent and PAM4 (where the DS and UP wavelengths may be closer together) to be transported in an OCML-MDM infrastructure. The circulator 442 may enable the use of the same wavelength for both downstream and upstream and upstream purposes. Circulators may be one-directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. circulator 442 may be a round baud single or dual-stage circulator that receives the downstream optical signal from the DWDM 438 and outputs a corresponding downstream optical signal to DCM 440. In some embodiments, the circulators 442 and 462 may be replaced by WDMs as well (including any other circulators included in any other OCMLs illustrated in any of the figures).

After being output by the circulator 442, the downstream optical data signal may be input into DCM 440 to compensate for dispersion that downstream optical data signal may experience. In some embodiments, DCM 440 may be configured to balance positive and/or negative dispersion that may be introduced to the egress optical data signal by the fiber. In some embodiments, DCM 508 may be configured to compensate for positive (temporal broadening of the egress optical data signal) and/or negative (temporal contraction of the egress optical data signal) dispersion introduced by fiber that is 60 km or greater in length, to reduce the sensitivity or OSNR levels of a transceiver in a DWDM located at a field hub or outside plant. More specifically, DCM 440 may be configured to reduce the sensitivity or OSNR level requirement in a photodetector or fiber-optic sensor in the transceiver, which may drastically reduce the cost of the transceivers used in the DWDM located at the field hub or outside plant. Additionally, the DCM 440 may also be tunable. That is, the DCMs can be tuned based on the transmission distance of a signal. For example, if a signal is being transmitted over a 60 km fiber, the tunable DCM may be tuned differently than if the signal were being transmitted over a 5 km fiber. The tunable DCM may be a Fiber Bragg Grating (FBG) type DCM previously described. Submitting the tunable DCM (for example, the FBG) to a temperature gradient may allow a grating chirp to be changed and, accordingly, the dispersion level of the tunable DCM to be tuned. Seven single gratings can be used for producing negative dispersion over a typical range from −800 to −2000 ps/nm or for producing a similar positive dispersion range. This means that the fiber link can be totally managed for dispersion for all distances which may range from 5 km to 60 km, or even greater distances.

In some embodiments, DCM 440 outputs the downstream optical data signal to amplifier 450. The amplifier 450, as well as any other amplifiers described herein, may allow operation over a full transmission spectrum, which may include at least 48 transmission channels. That is, the amplifier 450 may be a wide-band amplifier. To support 48 channels, the amplifier 450 may optimize gain flatness and noise for the broader channel range (for example, 40 channels included with some of the other OCML systems described herein to 48 channels in OCML 501). A gain of the amplifier 450 may be based at least in part on a distance that a downstream signal has to travel. For example, the gain may be a function of a fiber attenuation coefficient a, which is a measure of the intensity of the attenuation of a beam of light as it traverses a length of an optical fiber segment. The unit of measurement of the fiber attenuation coefficient is decibels (dB) per km (dB/km). For instance, the gain of booster amplifier 450 may be adjusted based at least in part on the attenuation coefficient and length of fiber that the egress optical data signal will travel. More specifically, in some instances, the gain of booster optical amplifier 524 may be $G=e^{(2\alpha L)}$, where a is the fiber attenuation coefficient, as explained above, and L is the length of the fiber (for example, the length of primary fiber 480 and/or the length of secondary fiber 482). The downstream optical data signals received from the DCM 440 may be amplifier by amplifier 450 and may be outputted to variable optical attenuator (VOA) 452.

In some embodiments, VOA 452 may receive the amplified downstream optical data signals as an input, and may be used to reduce the power levels of the downstream optical data signals. The power reduction may done by absorption, reflection, diffusion, scattering, deflection, diffraction, and dispersion, of the amplified downstream optical data signals. VOA 452 may have a working wavelength range in which it absorbs all light energy equally. In some embodiments, VOA 452 may utilize a length of high-loss optical fiber, that operates upon its input optical signal power level in such a way that its output signal power level is less than the input level. The variability of the output power level of VOA 452 may be achieved using a fiber coupler, where some of the power is not sent to the port that outputs, but to another port. Another possibility may be to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 452 may be based on some piece of doped fiber, exhibiting absorption within a certain wavelength range. The VOA 452 may also be tuned in synchronization with any of the tunable DCMs (for example, DCM 450 or any other DCM described herein). That is the tunable DCMs and the VOA 452 may be tuned for the same transmission distance. The VOA 452 may output the amplified downstream optical data signals to circulator 454.

In some embodiments, circulator 454 may be similar to circulator 442. That is, the circulator 454 may allow additional optical wavelengths to be utilized (for example, the full array of wavelengths included in the 48 total channels) and may enable technologies such as Quasi-Coherent and PAM4 (where the DS and UP wavelengths may be closer together) to be transported in an OCML-MDM infrastructure. The circulator 454 may enable the use of the same wavelength for both downstream and upstream and upstream purposes. Circulators may be one-directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. The circulator 454 may output the amplified downstream optical data signals received from the VOA 452 to coexistence element filter 458.

In some embodiments, the coexistence element filter 458 may receive the amplified downstream optical data signals received from the circulator 454, and may also receive signals from the one or more PON connectors 432. The coexistence element filter 458 may be a WDM element that may be used to combine all of these received signals and output one or more of the combined signals on a common output port. The coexistence element filter 458 may allow for different types of data signals to be transmitted on a single network. The coexistence element filter 458 may enable the addition of all the various types of PON signals mentioned in the application to be added to the Ethernet C and L band signals so that all the combined signals can be transported on the pair of two output ports and received by a field MDM. Examples of the coexistence element filter 458 may be provided in at least FIGS. 9A-9C. The coexistence element filter 458 may output one or more optical data signals to optical switch 462.

In some embodiments, the optical switch 462 may output the one or more optical data signals received from the coexistence element filter 458 to a primary fiber 480 and/or a secondary fiber 482 as well as any number of additional fibers not depicted in the figure). Also included on the primary fiber 480 and/or the secondary fiber 482 may be one or more test points (for example, test points 470 and 471 corresponding with primary fiber 480 and test points 473 and 474 corresponding with secondary fiber 482) and/or one or more Optical Time Domain Reflectometry (OTDR) ports (for example, OTDR ports 472 and/or 475). The test points may be used for monitoring downstream and upstream signals being transmitted over the primary fiber 480 and/or secondary fiber 482. The OTDR ports may allow for continuous monitoring of fibers in the presence of data for fiber degradation or fiber cuts. If a fiber cut happens, the OTDR may enable the location to be determined immediately, significantly reducing outages. OTDR functionality may be enabled via a WDM (for example, WDM 464 and/or WDM 468) and an external port (for example, the OTDR ports 472 and/or 475) on the OCML 430 for injecting an OTDR signal (which may be, for example, 1625 or 1650 nm). The WDMs may be located after the optical switch 462, so the OTDR monitoring is independent of which link is carrying downstream traffic. Both the links may always have upstream traffic present, (for example, an MDM 490 may incorporate a 50% splitter, which splits the upstream signal evenly between the primary and secondary fiber). The OCML's OTDR injection ports may be specified with a degree of required isolation between the OTDR's 1625/1650 nm and traffic-bearing C-band wavelengths. This traffic could be 10 G or Coherent 100 G/200 G, for example. The additional insertion loss associated with the components required to inject the OTDR pulse and to protect transmit/receive equipment from the backscattered or transmitted OTDR signals. The additional insertion losses may be ≤0.5 dB and thus can be easily accommodated within the system link budget.

In some embodiments, the optical data signals output to the primary fiber 480 and/or secondary fiber 482 may be transmitted to the MDM 490. The optical data signals may then be received at optical splitter 491 as an ingress optical data signal. Optical splitter 491 may also be referred to as a beam splitter, and may comprise one or more quartz substrates of an integrated waveguide optical power distribution device. However, optical splitter 491 may also be any other type of optical splitter as well. Optical splitter 491 may be a passive optical network device. It may be an optical fiber tandem device comprising one or more input terminals and one or more output terminals. Optical splitter 491 may be Fused Biconical Taper (FBT) splitter or Planar Lightwave Circuit (PLC) splitter. Optical splitter 491 may be a balanced splitter wherein optical splitter 491 comprises 2 input fibers and one or more output fibers over which the ingress optical data signal may be spread proportionally. In some embodiments, the ingress optical data signal may not be spread proportionally across the output fibers of optical splitter 491. In some embodiments, optical splitter 491 may comprise 2 input fibers and 2 output fibers. A first input fiber of optical splitter 474 may be connected to primary fiber 480 and a second input fiber of optical splitter 476 may be connected to secondary fiber 482.

A first output fiber 495 of optical splitter 491 may be connected to a first DWDM 492. A second output fiber 496 of optical splitter 491 may be connected to a second DWDM 494. Because the downstream optical data signals may be multi-wavelength downstream optical data signal, the first DWDM 492 and/or second DWDM 494 may demultiplex the downstream optical data signals into individual optical data signals in accordance with the individual wavelengths of the one or more downstream optical data signals. More specifically, the first DWDM 492 may be provided the PON signals received by the OCML through the one or more PON connectors 432 and the second DWDM 492 may be provided the signals received by the OCML 430 through the one or more downstream transponders 434 (which may be Ethernet signals, for example). That is, the PON signals received from the amplification module 401 and the additional signals received through the OCML may be separated so that they may be provided to their corresponding customers devices. This may allow the OCML to transmit both PON signals as well as other types of signals (for example, Ethernet) over the same fiber(s). Similar to any other DWDM described herein, the first DWDM 492 and second DWDM 494 may serve to demultiplex the one or more downstream optical data signals into their multiple original signals. These demultiplexed signals may then be output. For example, the PON signals may be shown at output 497 and the other signals received by the OCML may be shown as outputs 498. As mentioned above, these output signals may then ultimately be provided to corresponding customer devices.

The operation of MDM 490 may be further described by way of the processing of an upstream optical data signal transmitted to OCML 430. Each of the upstream transponders 499 of the DWDM 494 may receive a SONET/SDH optical data signal and may convert the SONET/SDH optical data signal into an electrical signal. Each of the upstream transponders 499 may receive the SONET/SDH optical data signal from a customer device and/or any additional device included between the MDM 490 and one or more customer devices (such as one or more remote physical (PHY) devices that may not be shown in the figure).

More specifically, a first transceiver in the upstream transponders 499 may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty-four upstream transponders 555 may each receive a SONET/SDH optical data signal, and each of the twenty-four upstream transponders 499 may convert the received SONET/SDH optical data signal into a corresponding second optical data signal, wherein each of the corresponding second optical data signals has a unique wavelength. That is, the wavelength of each of the corresponding second optical data signals may be distinguishable from the wavelength of any of the other corresponding second optical data signals. Thus upstream transponders 499 may generate twenty-four corresponding second optical data signals each of which has a unique wavelength.

DWDM 494 may receive twenty corresponding second optical data signals as an input and output a multi-wavelength upstream optical data signal comprising the twenty-four corresponding second optical data signals. More specifically, DWDM 494 may multiplex the twenty-four corresponding second optical data signals onto the fiber 496 connecting DWDM 494 and optical splitter 491, wherein the twenty multiplexed corresponding second optical data signals compose the multi-wavelength downstream optical data signal. The multi-wavelength optical data signal may have a wavelength comprising the twenty-four wavelengths of the twenty-four corresponding second optical data signals. Additionally, DWDM 492 may receive one or more upstream signals as well (such as, for example, GPON, 25 G/50 G-PON, XG-PON1, NG-PON2, or any other type of signal). These signals may also be outputted by the DWDM 492 to the optical splitter 491. Optical splitter 491 may receive one or more upstream PON signals from the DWDM 492, and may also receive the multi-wavelength upstream optical data signal from the DWDM 494. Optical splitter 491 may output an egress optical data signal, which may be a multi-wavelength optical data signal. Optical splitter 491 may output the egress optical data signal onto primary fiber 480 or secondary fiber 482 connecting the optical splitter 491 to the OCML 430. The signal may then be received by the OCML 430 and may progress through the OCML 430 and/or the amplification module 401 in a similar manner in which it progressed downstream through the OCML 430 and the amplification module 401.

Figure 5:
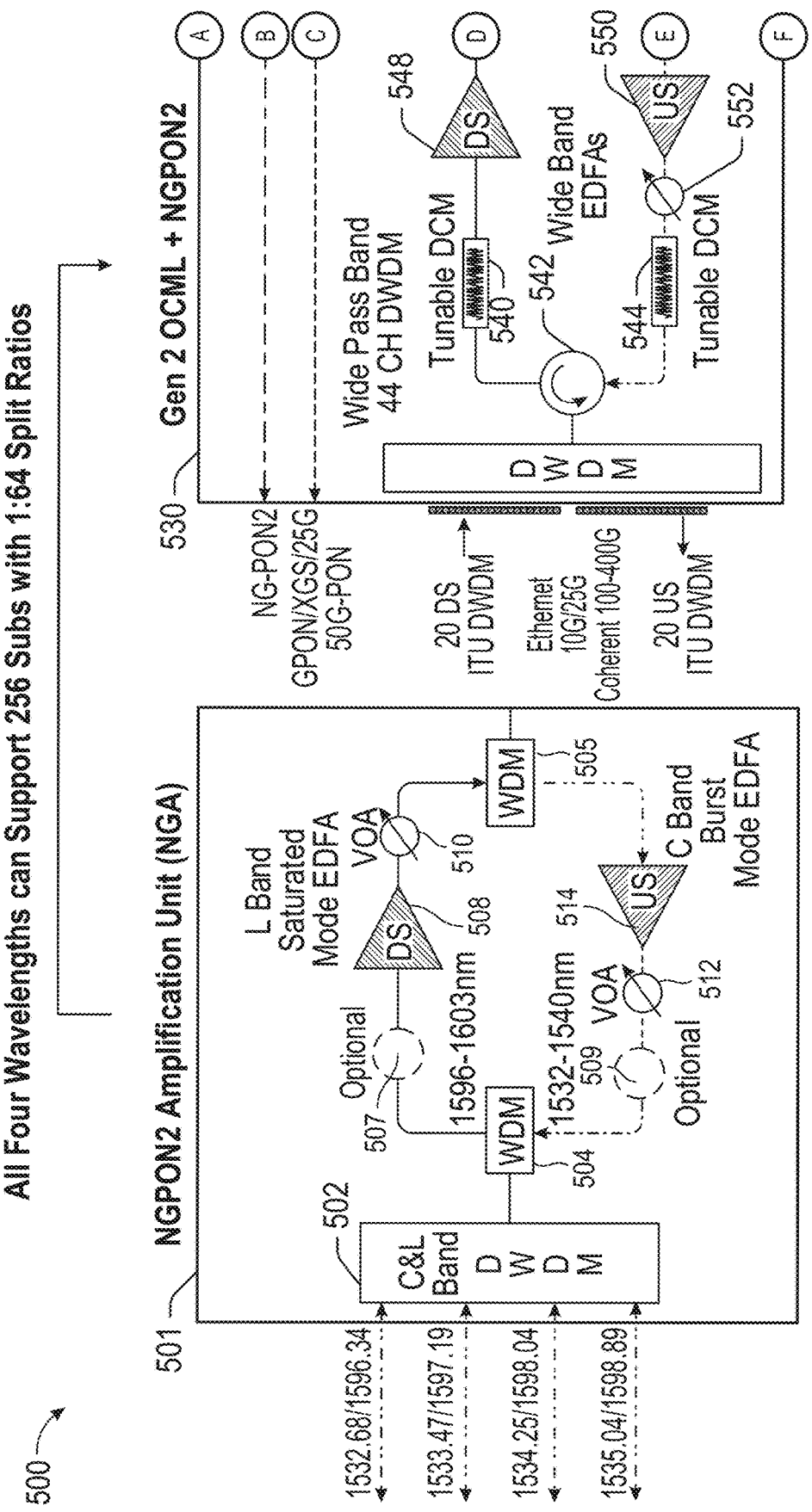
FIG. 5 depicts an amplification module used in conjunction with one or more Optical Communications Module Link (OCML) Extenders, in accordance with the disclosure.

FIG. 5 depicts another example system 500 that includes an example amplification module 501 used in conjunction with an OCML 530. The system 500 may include similar elements as the system 300 depicted in FIG. 3, but may differ from the system in the elements that may be included within the MDM 590 that is downstream from the OCML 530. That is, the amplification module 501 may include at least one or more dense wave division multiplexers (DWDMs) (for example, DWDM 502), one or more wavelength-division multiplexers (WDMs) (for example, WDM 504 and WDM 505), one or more dispersion compensation modules (DCMs) (for example, DCM 507 and/or DCM 509), one or more amplifiers (for example, amplifier 508 and amplifier 514), one or more variable optical amplifiers (VOAs) (for example, VOA 510 and VOA 512). The amplification module 501 may also include one or more Raman pumps 516 and/or an optical switch (not depicted in the figure) as well. The amplification module 501 may also include any other elements depicted in any other amplification module that may not be depicted in the amplification module 501. For example, the amplification module 501 may only depict one DWDM 502 in contrast with the two DWDMs illustrated in the amplification module 201 of FIG. 2. This second DWDM may be added to the amplification module 501 as well, for example, if the amplification module 501 were to transmit output signals to multiple OCMLs or other downstream devices. As a second example, the amplification module 501 may include any number of DCMs in addition to DCM 509. For example, the amplification module 501 may include a DCM between the DWDM 502 and the WDM 504 and/or a DCM between the WDM 504 and the amplifier 508 (corresponding to DCMs 206 and 207 in FIG. 2).

Similarly, in some embodiments, the OCML 530 may be a smart integrated OCML headend, which may be a circuit comprising one or more DWDMs (for example, DWDM 538), one or more circulators (for example, circulator 542 and 546), one or more DCMs (for example, DCM 540 and 544) (which may be tunable or fixed DCMs), one or more VOAs (for example, VOA 546 and/or VOA 552), one or more WDMs (for example, WDM 564 and WDM 568), one or more amplifiers (for example, optical amplifier 550 and/or optical amplifier 548), one or more filtering elements 558, and one or more optical switches (for example, optical switch 562) to feed a primary optical fiber (for example, Primary Fiber 580) or secondary (backup) optical fiber (for example, Secondary Fiber 582) (as well as any number of additional fibers). The OCML 530 may provide a method for transporting multiple signals using the C band and L band of signal wavelengths. In some instances, the C band may refer to a range of wavelengths from 1528.8 to 1566.3 and the L band may refer to a range of wavelengths from 1568.77 to 1610.49, for example. Examples of signals that may be transported using these wavelength bands may include at least GPON/XGPON/10 GEPON,25 G/50 G PON, 25 G Non-return-to-zero (NRZ), 25 G Quasi-Coherent, 25 and/or 50 G Pulse-Amplitude Modulation (PAM4), 100-600 G Coherent, and/or Duo-Binary signals (and/or any other type of signal) and a field hub or outside plant. The MTC facility may be an inside plant facility where a cable company acquires and combines services to be offered to customers. The MTC facility may provide these combined services to customers, by transmitting and receiving optical signals over a plurality of optical fibers to a field hub or outside plant which connects the plurality of optical fibers to a customer's premise. The OCML 530 may be located in a secondary terminal center (STC) that connects the MTC facility to a field hub or outside plant housing a multiplexer-demultiplexer (MDM) 590. The OCML 530 may also be located in the MTC or in any other location along a transmission path of the signals.

In some embodiments, the MDM 590 may include some different elements from the MDM 390 depicted in FIG. 3. That is, the MDM 590 may include a coexistence filer 592 in place of, or in addition to, the first DWDM 392 depicted in FIG. 3. In some embodiments, the optical data signals output to the primary fiber 580 and/or secondary fiber 582 may be transmitted to the MDM 590. The optical data signals may then be received at optical splitter 591 as an ingress optical data signal. Optical splitter 591 may also be referred to as a beam splitter, and may comprise one or more quartz substrates of an integrated waveguide optical power distribution device. However, optical splitter 591 may also be any other type of optical splitter as well. Optical splitter 591 may be a passive optical network device. It may be an optical fiber tandem device comprising one or more input terminals and one or more output terminals. Optical splitter 591 may be Fused Biconical Taper (FBT) splitter or Planar Lightwave Circuit (PLC) splitter. Optical splitter 591 may be a balanced splitter wherein optical splitter 591 comprises 2 input fibers and one or more output fibers over which the ingress optical data signal may be spread proportionally. In some embodiments, the ingress optical data signal may not be spread proportionally across the output fibers of optical splitter 591. In some embodiments, optical splitter 591 may comprise 2 input fibers and 2 output fibers. A first input fiber of optical splitter 591 may be connected to primary fiber 580 and a second input fiber of optical splitter 591 may be connected to secondary fiber 582.

A first output fiber of optical splitter 591 may be connected to a coexistence filter element 592. The coexistence filter element 591 may be similar to coexistence filter element 532 described in FIG. 5, or any other coexistence filter element described herein. A second output fiber of optical splitter 591 may be connected to a DWDM 594. Because the downstream optical data signals may be multi-wavelength downstream optical data signal, DWDM 594 may demultiplex the downstream optical data signals into individual optical data signals in accordance with the individual wavelengths of the one or more downstream optical data signals. More specifically, the one or more downstream optical data signals may be demultiplexed into twenty-four optical data signals (or any other number of optical data signals), each of which may have a unique wavelength. DWDM 594 may output each of the twenty-four optical data signals to each of the downstream transponders 598. Each of the transponders may be in an RPD (not shown) and may convert a received corresponding optical data signal, of the optical data signals, into a corresponding electrical signal. More specifically, a first transceiver in each of the downstream transponders 554 may convert each of the twenty-four optical data signals into the corresponding electrical signal. Each of the downstream transponders 598 may also comprise a second transceiver that may convert the corresponding electrical signal into a SONET/SDH optical data signal with a corresponding SONET/SDH optical data signal wavelength. In some embodiments, each of the twenty-four corresponding SONET/SDH optical data signals may have the same wavelength. In other embodiments, each of the twenty-four corresponding SONET/SDH optical data signals may have unique wavelengths.

Figure 6A:
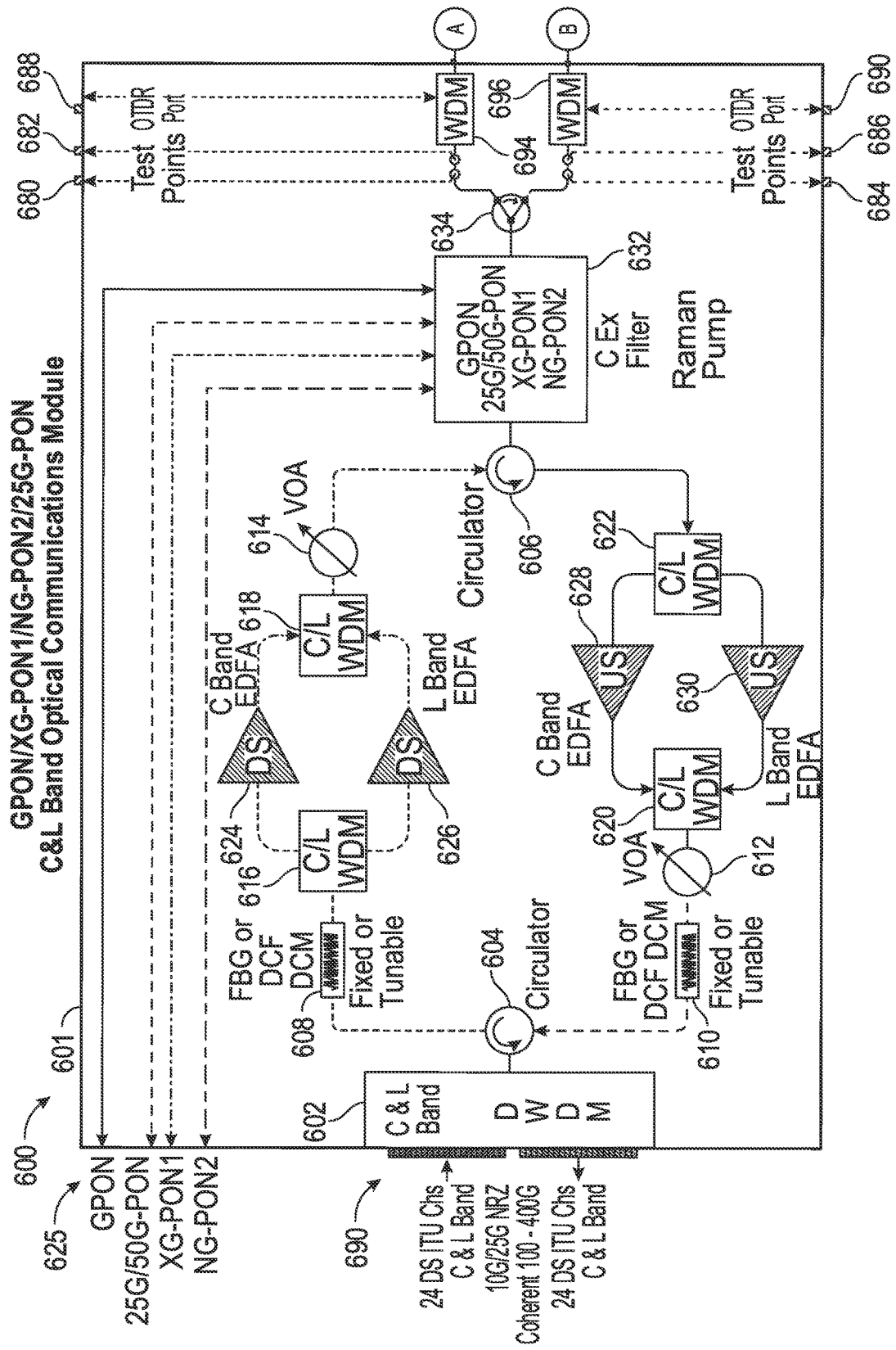
FIG. 6A depicts an example system architecture of an Optical Communications Module Link (OCML) Extender, in accordance with the disclosure.

FIG. 6A depicts an example system 600 architecture of an OCML 601 according to at least one embodiment of the disclosure. The OCML 601 may provide a more detailed depiction of an OCML that may be used in conjunction with an amplification module (for example, amplification module 101, amplification module 201, amplification module 301, and/or any other amplification module) as described herein. As shown in FIG. 6A, OCML 601 may be a smart integrated OCML headend, which may be a circuit comprising one or more DWDMs (for example, DWDM 602), one or more circulators (for example, circulator 604 and 606), one or more DCMs (for example, DCM 608 and 610) (which may be tunable DCMs), one or more VOAs (for example, VOA 612 and/or VOA 614), one or more WDMs (for example, WDM 616, WDM 618, and WDM 620, and WDM 622), one or more amplifiers (for example, optical amplifier 624, optical amplifier 626, optical amplifier 628, and optical amplifier 630), one or more filtering elements 632, and one or more optical switches (for example, optical switch 63) to feed a primary optical fiber (for example, Primary Fiber 636) or secondary (backup) optical fiber (for example, Secondary Fiber 638) (as well as any number of additional fibers). The OCML 601 may provide a method for transporting multiple signals using the C band and L band of signal wavelengths. In some instances, the C band may refer to a range of wavelengths from 1528.8 to 1566.3 and the L band may refer to a range of wavelengths from 1568.77 to 1610.49, for example. Examples of signals that may be transported using these wavelength bands may include at least GPON/XGPON/10 GEPON,25 G/50 GPON, 25 G Non-return-to-zero (NRZ), 25 G Quasi-Coherent, 25 and/or 50 G Pulse-Amplitude Modulation (PAM4), 100-600 G Coherent, and/or Duo-Binary signals (and/or any other type of signal) and a field hub or outside plant. The MTC facility may be an inside plant facility where a cable company acquires and combines services to be offered to customers. The MTC facility may provide these combined services to customers, by transmitting and receiving optical signals over a plurality of optical fibers to a field hub or outside plant which connects the plurality of optical fibers to a customer's premise. The OCML 601 may be located in a secondary terminal center (STC) that connects the MTC facility to a field hub or outside plant housing a multiplexer-demultiplexer (MDM) 650. The OCML 601 may also be located in the MTC or in any other location along a transmission path of the signals.

In some embodiments, the OCML headend may be used to transport a mix of multi-wavelength signals, which may include, for example, 10-400 GbE, GPON, XGPON/10 GEPON, 25 G Non-return-to-zero (NRZ), 25 G Quasi-Coherent, 25 and/or 50 G Pulse-Amplitude Modulation (PAM4), 100-600 G Coherent, and/or Duo-Binary signals, over the same optical fiber without having active devices such as optical amplifiers in the field. These are merely examples of signals that may be transported, and any other type of signal may also be transported as well. Throughout the disclosure reference may be made to any individual example signal or a combination of example signals, but any other type of signal could similarly be applicable. The OCML headend may also be configured to support the same wavelengths over a secondary optical fiber via an optical switch in case the primary optical fiber experiences a cut. In one embodiment, an OCML headend, systems, and methods may include various subsystems integrated into a single module including an integrated DWDM passive circuit that combines and separates bi-directional wavelengths in optical fibers propagating in a conventional wavelength window, such as the c band dispersive region of the optical fibers. The OCML headend may comprise one or more DWDMs, one or more circulators, one or more DCMs (which may be tunable DCMs), one or more VOAs, one or more WDMs, one or more amplifiers, one or more coexistence filtering elements, and one or more optical switches to feed a primary optical fiber or secondary (backup) optical fiber, (as well as any number of additional fibers).

In some embodiments, OCML 601 may comprise at least twenty-four downstream transponders 690 and at least twenty-four upstream transponders 688 (as well as any other number of downstream and/or upstream transponders). The downstream transponders 690 may transmit downstream data over twenty-four wavelengths. The upstream transponders 688 may receive upstream data over, such as, for example, GPON/XGPON/10 GEPON, 25 G Non-return-to-zero (NRZ), 25 G Quasi-Coherent, 25 and/or 50 G Pulse-Amplitude Modulation (PAM4), 100-600 G Coherent, Duo-Binary, and/or any other type of signal. In some instances, twelve of the downstream transponders 690 may use the C band and twelve of the downstream transponders 690 may use the L band. Similarly, twelve of the upstream transponders 688 may use the C band and twelve of the upstream transponders 688 may use the L band. However, any other combination of numbers of wavelengths for the C and L bands may also be applicable as well. For example, all of the downstream transponders 690 may use the L band or the C band and all of the upstream transponders 688 may use the L band or C band. In even further instances, any other wavelengths may also be used. Additionally, the downstream and upstream signal wavelengths may be capable of transporting signals on adjacent channels, rather than using a block of channels for downstream transmission and a block of channels for upstream transmission, with a guard band of a particular number of wavelengths included between the two channel blocks. Alternatively, the downstream and upstream signal wavelengths may still be transmitted in separate blocks, however.

OCML 601 may also comprise one or more PON connectors 625, which may be used to transmit/receive any type of PON signal, such as, for example, GPON, XGPON, NG-PON2, 25 G/50 G-PON, and/or any other type of PON signal. In some cases, the one or more PON connectors 625 may receive output PON signals from an amplification module as illustrated in FIG. 2. OCML 601 may also comprise a primary optical fiber (for example, primary optical fiber 635) and a secondary optical fiber (for example, secondary optical fiber 636) that transmit and receive a plurality of optical signals. Primary optical fiber 635 and secondary optical fiber 636 may transmit a first plurality of signals from OCML 601 to an outside plant, and may receive a second plurality of signals from the outside plant. In some embodiments, any other number of optical fibers may be provided (for example, more than just the primary and secondary optical fibers).

In some embodiments, downstream transponders 690 and upstream transponders 688 may comprise connectors belonging to the laser shock hardening (LSH) family of connectors designed to transmit and receive optical data signals between DWDM 602 and one or more servers (not shown). In other embodiments, downstream transponders 690 and upstream transponders 688 may also comprise E2000 connectors, and may utilize a 1.25 millimeter (mm) ferrule. downstream transponders 690 and upstream transponders 688 may be installed with a snap-in and push-pull latching mechanism, and may include a spring-loaded shutter which protects the ferrule from dust and scratches. The shutter may close automatically once the connector is disengaged, locking out impurities, which could later result in network failure and locking in possibly damaging lasers. Downstream transponders 690 and upstream transponders 688 may operate in a single mode or a multimode. In single mode, downstream transponders 690 and upstream transponders 688 only one mode of light may be allowed to propagate. Because of this, the number of light reflections created as the light passes through the core of single-mode downstream transponders 690 and upstream transponders 688 decreases, thereby lowering attenuation and creating the ability for the optical data signal to travel further. Single mode may be for use in long distance, higher bandwidth connections between one or more servers and DWDM 602. In multimode, downstream transponders 690 and upstream transponders 688 may have a large diameter core that allows multiple modes of light to propagate. Because of this, the number of light reflections created as the light passes through the core increases, creating the ability for more data to pass through at a given time. Multimode downstream transponders 690 and upstream transponders 688, may generate high dispersion and an attenuation rate, which may reduce the quality of an optical data signal transmitted over longer distances. Therefore, multimode may be used to transmit optical data signals over shorter distances. In some embodiments, the downstream transponders 690 and upstream transponders 688 may also comprise any other types of connectors as well.

In some embodiments, OCML 601 can transmit and receive up to at least twenty-four bi-directional optical data signals (or more than twenty-four signals in some instances), but the actual number of optical data signals may depend on operational needs. That is, OCML 601 can transport more or less than twenty-four downstream optical signals, or more or less than twenty-four upstream optical data signals, based on the needs of customers' networks. These customer networks may be connected to OCML 601 through an optical ring network (for example, a metro access optical ring network).

The operation of OCML 601 may be described by way of the processing of downstream optical data signals transmitted from OCML 601 to a field hub or outside plant, and the processing of upstream optical data signals received from the field hub or outside plant. In terms of downstream processing, each of the transponders of downstream transponders 690 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty-four transponders in downstream transponders 690 may each receive a SONET/SDH optical data signal, and each of the twenty-four transponders may convert the received SONET/SDH optical data signal into a corresponding second optical data signal, wherein each of the corresponding second optical data signals may have a unique wavelength. That is, the wavelength of each of the corresponding second optical data signals may be distinguishable from the wavelength of any of the other corresponding second optical data signals. Thus downstream transponders 690 may generate twenty-four corresponding second optical data signals each of which has a unique wavelength.

DWDM 602 may receive the twenty-four corresponding second optical data signals over the L and C bands as an input and output a multi-wavelength downstream optical data signal comprising the twenty-four corresponding second optical data signals onto a fiber. More specifically, DWDM 602 may multiplex the twenty-four corresponding second optical data signals onto the fiber, wherein the twenty-four multiplexed corresponding second optical data signals compose the multi-wavelength downstream optical data signal. The multi-wavelength downstream optical data signal may have a wavelength comprising the twenty-four wavelengths of the twenty-four corresponding second optical data signals.

In some embodiments, the multi-wavelength downstream optical data signal may be input to a circulator (e.g., circulator 604). The circulator 604 may allow additional optical wavelengths to be utilized (for example, the full array of wavelengths included in the 48 total channels) and may enable technologies such as Quasi-Coherent and PAM4 (where the DS and UP wavelengths may be closer together) to be transported in an OCML-MDM infrastructure. The circulator 604 may enable the use of the same wavelength for both downstream and upstream and upstream purposes. Circulators may be one-directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. circulator 604 may be a round baud single or dual-stage circulator that receives the downstream optical signal from the DWDM 602 and outputs a corresponding downstream optical signal to DCM 608. In some embodiments, the circulators 604 and 606 may be replaced by WDMs as well (including any other circulators described herein).

After being output by the circulator 604, the downstream optical data signal may be input into DCM 608 to compensate for dispersion that downstream optical data signal may experience. In some embodiments, DCM 608 may be configured to balance positive and/or negative dispersion that may be introduced to the egress optical data signal by the fiber. In some embodiments, DCM 608 may be configured to compensate for positive (temporal broadening of the egress optical data signal) and/or negative (temporal contraction of the egress optical data signal) dispersion introduced by fiber that is 60 km or greater in length, to reduce the sensitivity or OSNR levels of a transceiver in a DWDM located at a field hub or outside plant. More specifically, DCM 608 may be configured to reduce the sensitivity or OSNR level requirement in a photodetector or fiber-optic sensor in the transceiver, which may drastically reduce the cost of the transceivers used in the DWDM located at the field hub or outside plant. Additionally, the DCM 608 may also be tunable. That is, the DCMs can be tuned based on the transmission distance of a signal. For example, if a signal is being transmitted over a 60 km fiber, the tunable DCM may be tuned differently than if the signal were being transmitted over a 5 km fiber. The tunable DCM may be a Fiber Bragg Grating (FBG) type DCM previously described. Submitting the tunable DCM (for example, the FBG) to a temperature gradient may allow a grating chirp to be changed and, accordingly, the dispersion level of the tunable DCM to be tuned. Seven single gratings can be used for producing negative dispersion over a typical range from −800 to −2000 ps/nm or for producing a similar positive dispersion range. This means that the fiber link can be totally managed for dispersion for all distances which may range from 5 km to 60 km, or even greater distances.

In some embodiments, DCM 608 outputs the downstream optical data signal to WDM 616. WDM 616 may include a portion of a sub-circuit that may be used to separate C band signals and L band signals for transmission. For example, the WDM 616 may separate the signals into C band signals and L band signals, may output the C band signals to amplifier 624, and may output the L band signals to amplifier 626. That is, the C band signals and L band signals may be amplified separately. The amplifier 624 and amplifier 626, as well as any other amplifiers described herein, may allow operation over a full transmission spectrum, which may include at least 48 transmission channels. That is, the amplifier 624 and amplifier 626 may be wide-band amplifiers. To support 48 channels, the amplifier 624 and amplifier 626 may optimize gain flatness and noise for the broader channel range (for example, 40 channels included with some of the other OCML systems described herein to 48 channels in OCML 601). A gain of the amplifier 624 and amplifier 626 may be based at least in part on a distance that a downstream signal has to travel. For example, the gain may be a function of a fiber attenuation coefficient a, which is a measure of the intensity of the attenuation of a beam of light as it traverses a length of an optical fiber segment. The unit of measurement of the fiber attenuation coefficient is decibels (dB) per km (dB/km). For instance, the gain of booster amplifier 624 and amplifier 626 may be adjusted based at least in part on the attenuation coefficient and length of fiber that the egress optical data signal will travel. More specifically, in some instances, the gain of booster optical amplifier 624 may be $G=e^{(2aL)}$ where a is the fiber attenuation coefficient, as explained above, and L is the length of the fiber (for example, the length of primary fiber 676 and/or the length of secondary fiber 674). The downstream optical data signals received from the WDM 616 may be amplified by amplifier 624 and amplifier 626 and may be outputted to WDM 618. The WDM 618 may combine the C and L band signals. The WDM 618 may then output the amplified downstream optical data signals to variable optical attenuator (VOA) 614.

In some embodiments, VOA 614 may receive the amplified downstream optical data signals as an input and may be used to reduce the power levels of the downstream optical data signals. The power reduction may done by absorption, reflection, diffusion, scattering, deflection, diffraction, and dispersion of the amplified downstream optical data signals. VOA 614 may have a working wavelength range in which it absorbs all light energy equally. In some embodiments, VOA 614 may utilize a length of high-loss optical fiber, that operates upon its input optical signal power level in such a way that its output signal power level is less than the input level. The variability of the output power level of VOA 614 may be achieved using a fiber coupler, where some of the power is not sent to the port that outputs but to another port. Another possibility may be to exploit variable coupling losses, which are influenced by the variable positioning of a fiber end. For example, the transverse position of the output fiber or the width of an air gap between two fibers may be varied, obtaining a variable loss without a strong wavelength dependence. This principle may be used for single-mode fibers. VOA 614 may be based on some piece of doped fiber exhibiting absorption within a certain wavelength range. The VOA 614 may also be tuned in synchronization with any of the tunable DCMs (for example, DCM 608). That is, the tunable DCMs and the VOA 614 may be tuned for the same transmission distance. The VOA 614 may output the amplified downstream optical data signals to circulator 606.

In some embodiments, circulator 606 may be similar to circulator 604. That is, the circulator 609 may allow additional optical wavelengths to be utilized (for example, the full array of wavelengths included in the 48 total channels) and may enable technologies such as Quasi-Coherent and PAM4 (where the DS and UP wavelengths may be closer together) to be transported in an OCML-MDM infrastructure. The circulator 606 may enable the use of the same wavelength for both downstream and upstream and upstream purposes. Circulators may be one-directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. The circulator 606 may output the amplified downstream optical data signals received from the VOA 614 to coexistence element filter 632.

In some embodiments, the coexistence element filter 632 may receive the amplified downstream optical data signals received from the VOA 614, and may also receive signals from the one or more PON connectors 624. The coexistence element filter 632 may be a WDM element that may be used to combine all of these received signals and output one or more of the combined signals on a common output port. The coexistence element filter 632 may allow for different types of data signals to be transmitted on a single network. The coexistence element filter 632 may enable the addition of all the various types of PON signals mentioned in the application to be added to the Ethernet C and L band signals so that all the combined signals can be transported on the pair of two output ports and received by a field MDM. Examples of the coexistence element filter 632 may be provided in FIGS. 4A-4C. The coexistence element filter 632 may output one or more optical data signals to optical switch 634.

In some embodiments, the optical switch 634 may output the one or more optical data signals received from the coexistence element filter 632 to a primary fiber 676 and/or a secondary fiber 674 as well as any number of additional fibers not depicted in the figure). Also included on the primary fiber 676 and/or the secondary fiber 674 may be one or more test points (for example, test points 680 and 682 corresponding with primary fiber 676 and test points 684 and 686 corresponding with secondary fiber 674) and/or one or more Optical Time Domain Reflectometry (OTDR) ports (for example, OTDR ports 688 and/or 690). The test points may be used for monitoring downstream and upstream signals being transmitted over the primary fiber 676 and/or secondary fiber 674. The OTDR ports may allow for continuous monitoring of fibers in the presence of data for fiber degradation or fiber cuts. If a fiber cut happens, the OTDR may enable the location to be determined immediately, significantly reducing outages. OTDR functionality may be enabled via a WDM (for example, WDM 694 and/or WDM 696) and an external port (for example, the OTDR ports 688 and/or 690) on the OCML 601 for injecting an OTDR signal (which may be, for example, 1625 or 1650 nm). The WDMs may be located after the optical switch 616, so the OTDR monitoring is independent of which link is carrying downstream traffic. Both the links may always have upstream traffic present (for example, an MDM 650 may incorporate a 50% splitter, which splits the upstream signal evenly between the primary and secondary fiber). The OCML's OTDR injection ports may be specified with a degree of required isolation between the OTDR's 1625/1650 nm and traffic-bearing C-band wavelengths. This traffic could be 10 G or Coherent 100 G/200 G, for example. The additional insertion loss associated with the components required to inject the OTDR pulse and to protect transmit/receive equipment from the backscattered or transmitted OTDR signals. The additional insertion losses may be ≤0.5 dB and thus can be easily accommodated within the system link budget.

In some embodiments, the optical data signals output to the primary fiber 676 and/or secondary fiber 674 may be transmitted to the MDM 650. The optical data signals may then be received at optical splitter 651 as an ingress optical data signal. Optical splitter 651 may also be referred to as a beam splitter, and may comprise one or more quartz substrates of an integrated waveguide optical power distribution device. However, optical splitter 651 may also be any other type of optical splitter as well. Optical splitter 651 may be a passive optical network device. It may be an optical fiber tandem device comprising one or more input terminals and one or more output terminals. Optical splitter 651 may be Fused Biconical Taper (FBT) splitter or Planar Lightwave Circuit (PLC) splitter. Optical splitter 651 may be a balanced splitter wherein optical splitter 651 comprises 2 input fibers and one or more output fibers over which the ingress optical data signal may be spread proportionally. In some embodiments, the ingress optical data signal may not be spread proportionally across the output fibers of optical splitter 651. In some embodiments, optical splitter 651 may comprise 2 input fibers and 2 output fibers. A first input fiber of optical splitter 651 may be connected to primary fiber 676 and a second input fiber of optical splitter 651 may be connected to secondary fiber 674.

A first output fiber of optical splitter 651 may be connected to a coexistence filter element 652. The coexistence filter element 652 may be similar to coexistence filter element 632, coexistence filter element 632, or any other coexistence filter element described herein. A second output fiber of optical splitter 651 may be connected to a DWDM 653. Because the downstream optical data signals may be a multi-wavelength downstream optical data signal, DWDM 653 may demultiplex the downstream optical data signals into individual optical data signals in accordance with the individual wavelengths of the one or more downstream optical data signals. More specifically, the one or more downstream optical data signals may be demultiplexed into twenty-four optical data signals (or any other number of optical data signals), each of which may have a unique wavelength. DWDM 653 may output each of the twenty-four optical data signals to each of the downstream transponders 654. Each of the transponders may be in an RPD (not shown) and may convert a received corresponding optical data signal, of the optical data signals, into a corresponding electrical signal. More specifically, a first transceiver in each of the downstream transponders 654 may convert each of the twenty-four optical data signals into the corresponding electrical signal. Each of the downstream transponders 654 may also comprise a second transceiver that may convert the corresponding electrical signal into a SONET/SDH optical data signal with a corresponding SONET/SDH optical data signal wavelength. In some embodiments, each of the twenty-four corresponding SONET/SDH optical data signals may have the same wavelength. In other embodiments, each of the twenty-four corresponding SONET/SDH optical data signals may have unique wavelengths.

The operation of MDM 653 may be further described by way of the processing of an upstream optical data signal transmitted to headend 601. Each of the upstream transponders 655 of the DWDM 653 may receive a SONET/SDH optical data signal and may convert the SONET/SDH optical data signal into an electrical signal. Each of the upstream transponders 655 may receive the SONET/SDH optical data signal from the RPD. The RPD may also convert one or more electrical signals into the SONET/SDH optical data signal.

More specifically, a first transceiver in the upstream transponders 655 may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty-four upstream transponders 655 may each receive a SONET/SDH optical data signal, and each of the twenty-four upstream transponders 655 may convert the received SONET/SDH optical data signal into a corresponding second optical data signal, wherein each of the corresponding second optical data signals has a unique wavelength. That is, the wavelength of each of the corresponding second optical data signals may be distinguishable from the wavelength of any of the other corresponding second optical data signals. Thus upstream transponders 655 may generate twenty-four corresponding second optical data signals each of which has a unique wavelength.

DWDM 653 may receive twenty corresponding second optical data signals as an input and output a multi-wavelength upstream optical data signal comprising the twenty-four corresponding second optical data signals. More specifically, DWDM 653 may multiplex the twenty-four corresponding second optical data signals onto the fiber connecting DWDM 653 and optical splitter 651, wherein the twenty multiplexed corresponding second optical data signals compose the multi-wavelength downstream optical data signal. The multi-wavelength optical data signal may have a wavelength comprising the twenty-four wavelengths of the twenty-four corresponding second optical data signals. Additionally, coexistence filter element 652 may receive one or more upstream signals as well (such as, for example, GPON, 25 G/50 G-PON, XG-PON1, NG-PON2, or any other type of signal). These signals may also be outputted by the coexistence filter element 652 to the optical splitter 651. Optical splitter 651 may receive one or more upstream PON signals from the coexistence filter element 652, and may also receive the multi-wavelength upstream optical data signal from the DWDM 653. Optical splitter 651 may output an egress optical data signal, which may be a multi-wavelength optical data signal. Optical splitter 651 may output the egress optical data signal onto primary fiber 635 or secondary fiber 636 connecting the optical splitter 651 to the OCML 601.

Figure 6B:
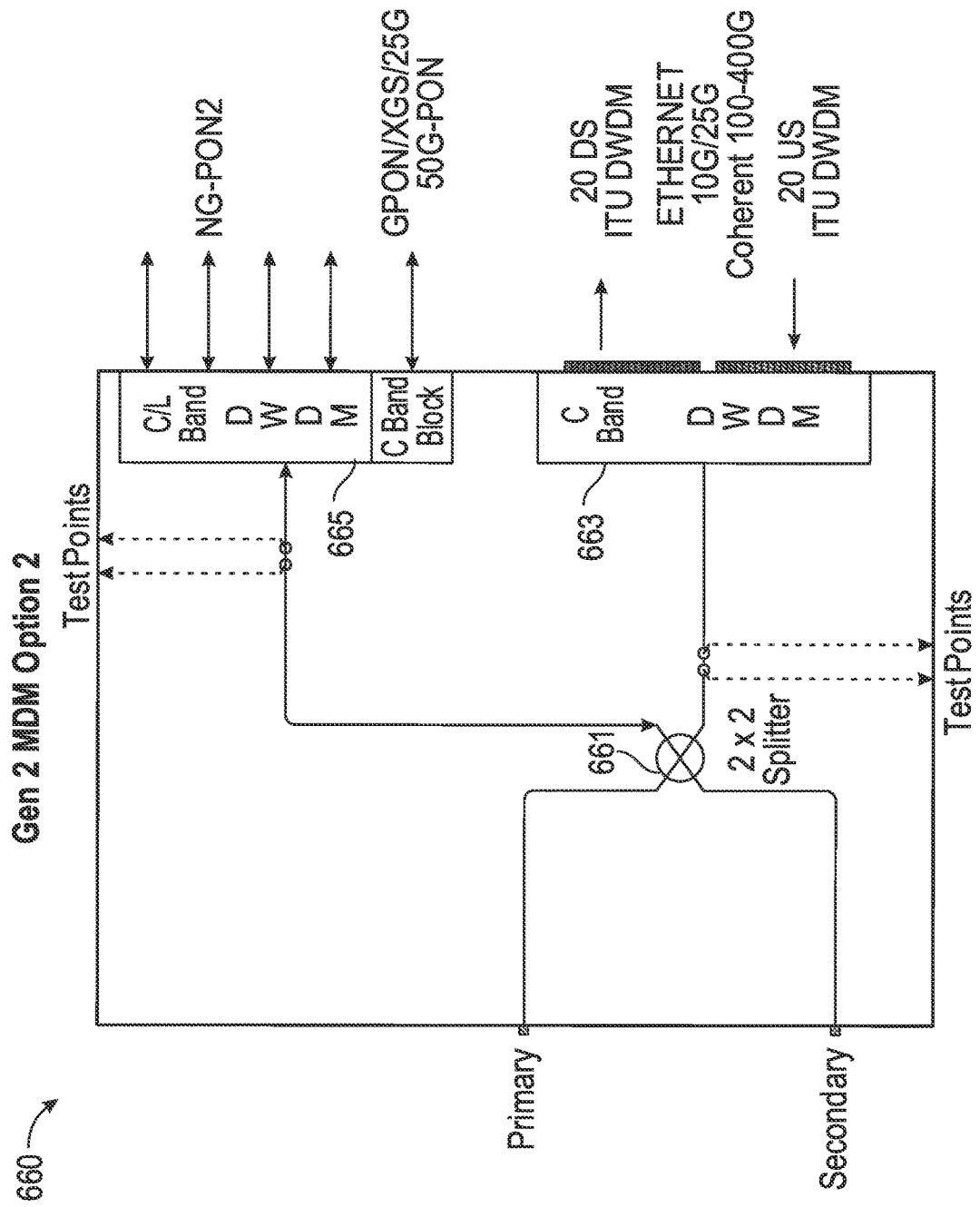
FIG. 6B depicts an example multiplexer-demultiplexer (MDM), in accordance with the disclosure.

In some embodiments, FIG. 6B depicts another example embodiments of an MDM 660. The MDM 660 may be used in place of MDM 650 or any other MDM described herein. MDM 660 may include similar elements as MDM 650. For example, optical splitter 661 may be similar to optical splitter 651 or 651, and/or DWDM 163 may be similar to DWDM 153 and/or DWDM 653. However, the MDM 160 may differ from MDM 150 and MDM 650 in that MDM 160 may include a second DWDM 665. Including the second DWDM 665 may allow for a NG-PON2 DWDM passive to the MDM to be added so that an external DWDM would not be required to separate the NG-PON2 downstream and upstream wavelengths. Incorporating the DWDM 665 into the MDM 660 reduces the overall loss budget and helps with longer-distance signal transmissions.

Returning to FIG. 6A, the operation of OCML 601 may also be described by way of the processing of upstream optical data signals received at OCML 601 from a field hub or outside plant. That is, processing in the opposite signal flow direction as downstream signal processing described above. In some instances, the processing of upstream optical data signals may involve the reverse process of the processing of downstream optical data signals, as described above. That is, the processing may occur starting from the primary fiber 676 and/or secondary fiber 674 and ending with the DWDM 602. In some instances, one difference between upstream and downstream processing may be that WDM 620, WDM 622, amplifier 628, amplifier 630, VOA 612, and DCM 610 may be used. Additionally, the functionality of the components involved in the upstream processing may be the same or similar to the functionality of the components involved in the downstream processing.

In processing of upstream optical data signals, a multi-wavelength ingress optical data signal, comprising one or more of a 10-400 GbE optical data signal, XGPON/lOGE-PON optical data signal, and/or GPON optical data signal (as well as any other data signal), may be an upstream optical data signal received on primary fiber 676 or secondary fiber 674 depending on the position of switch 634. The multi-wavelength ingress optical data signal may be received by coexistence filter element 632. The Coexistence filter element 632 may demultiplex one or more 10-400 GbE optical data signals, XGPON/10 GEPON optical data signals, and/or GPON optical data signals (as well as any type of signal) from ingress optical data signal. Coexistence filter element 632 may transmit the one or more PON signals (for example, GPON, 25 G/50 G-PON, XG-PON1, NP-PON2, as well as any other types of PON signals) to PON connectors 625. Coexistence filter element 632 may transmit the one or more 10-400 GbE optical data signals to circulator 606. The operation of the circulator 609 in upstream signal transmission may be the same as during downstream signal transmission. From circulator 606, the signal may be transmitted to WDM 622. Similarly to WDM 616 in the downstream direction, WDM 622 may be used to separate C band signals and L band signals. C band signals may be provided to optical pre-amplifier 628, and L band signals may be provided to optical pre-amplifier 630, or vice versa. The optical pre-amplifier 628 and optical pre-amplifier 630 may then provide amplified signals to the WDM 620. WDM 620 may then provide the amplified signals to VOA 612, which may function similarly to VOA 614 in the downstream direction. VOA 614 may then provide the amplified signals to DCM 610.

In some embodiments, DCM 610 may be configured to balance positive and/or negative dispersion that may be introduced to a SONET/SDH egress optical data signal that may exit OCML 601 from upstream transponders 688. The SONET/SDH egress optical data signal may be an upstream signal from a field hub or outside plant destined for a MTC. For example, a customer premise may be connected to the field hub or outside plant and may send one or more packets via a SONET/SDH network to the field hub or outside plant, which may, in turn, transmit the one or more packets using 10-400 GbE optical data signals to OCML 601. The one or more packets may be destined for a company web server connected to the MTC via a backbone network. Because OCML 601 may be collocated in an STC that is connected to the MTC via an optical ring network, wherein the connection between the STC and MTC is a SONET/SDH optical network connection, DCM 610 may be configured to compensate for positive and/or negative dispersion on the SONET/SDH optical network connection. That is DCM 610 may be configured to reduce temporal broadening of the SONET/SDH ingress optical data signal or temporal contraction of the SONET/SDH ingress optical data signal.

In some embodiments, circulator 604 may receive the optical data signals from the DCM 610 and may provide the optical data signals to DWDM 602. DWDM 602 may demultiplex one or more 10-400 GbE optical data signals. Because the optical data signals received from the circulator 604 may be a dispersion-compensated amplified version of the multi-wavelength ingress optical data signal, DWDM 602 may demultiplex the one or more optical data signals into individual optical data signals in accordance with the individual wavelengths of any 10-400 GbE optical data signals in the multi-wavelength ingress optical data signal. More specifically, the optical data signals received from the circulator 604 may be demultiplexed into twenty-four 10-400 GbE optical data signals, each of which may have a unique wavelength. DWDM 602 may output each of the twenty 10-400 GbE optical data signals to each of the transponders of upstream transponders 688. Each of the transponders of upstream transponders 688 may convert a received corresponding 10-400 GbE optical data signal, of the 10-400 GbE optical data signals, into a corresponding electrical signal. More specifically, a first transceiver in each of the transponders may convert each of the twenty-four 10-400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty-four corresponding SONET/SDH optical data signals may have the same wavelength. In other embodiments, each of the twenty-four corresponding SONET/SDH optical data signals may have unique wavelengths. The twenty-four transponders of upstream transponders 688 may transmit the twenty-four SONET/SDH optical data signals to the MTC on the SONET/SDH optical network connection. It should be noted that while 10-400 GbE optical data signals are described above, this is merely for exemplary purposes, and any other type of signal may be used as well.

Figure 7:
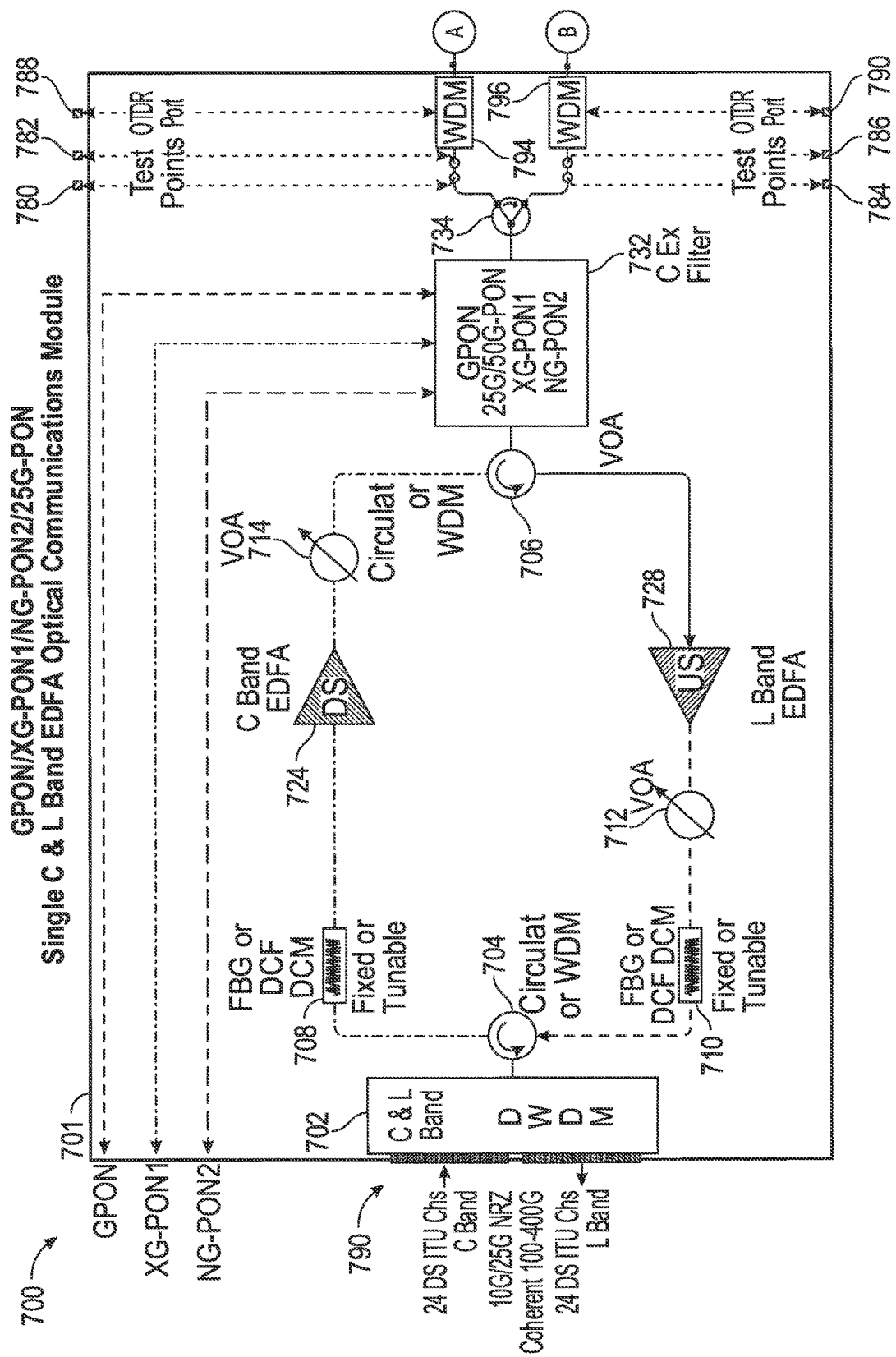
FIG. 7 depicts an alternative embodiment of a multiplexer-demultiplexer (MDM), in accordance with the disclosure.
Figure 8:
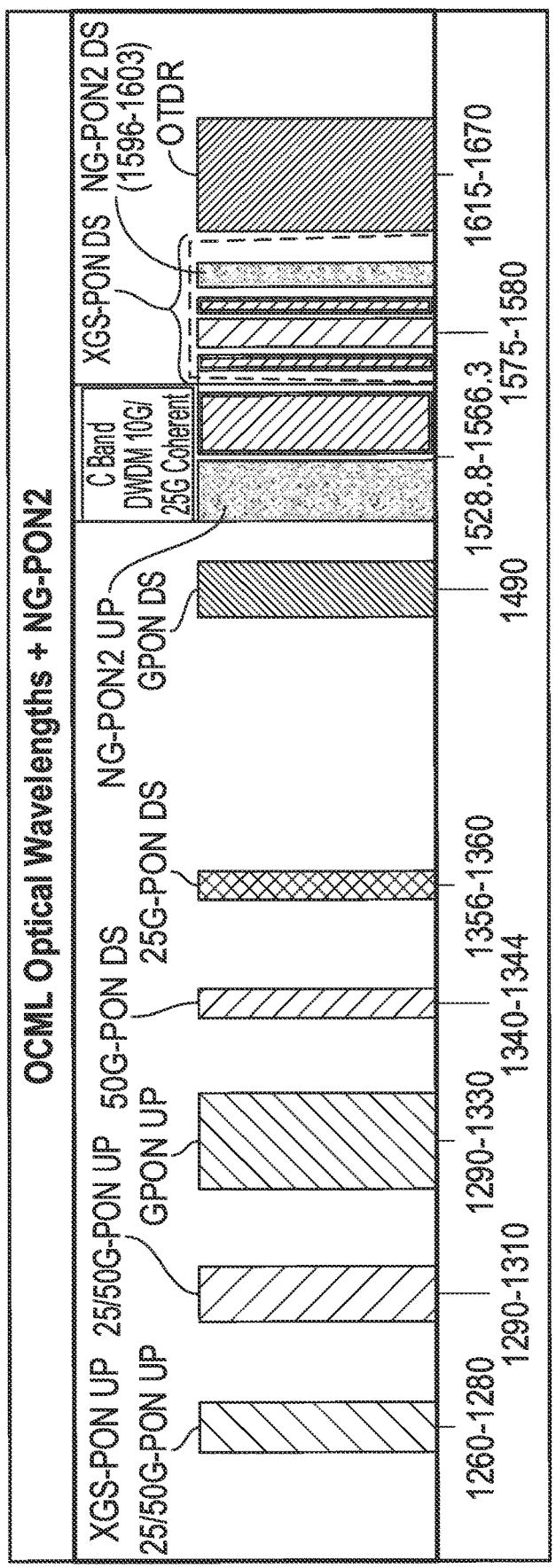
FIG. 8 depicts an example wavelength chart, in accordance with the disclosure.

FIG. 7 depicts an example system 700 architecture of an OCML headend 701 according to at least one embodiment of the disclosure. OCML headend 701 may be similar to OCML 601 and may include some similar components. For example, as shown in FIG. 7, OCML headend 701 may comprise one or more DWDMs (for example, DWDM 702), one or more circulators (for example, circulator 704 and 706), one or more DCMs (for example, DCM 708 and 710) (which may be tunable DCMs), one or more VOAs (for example, VOA 712 and/or VOA 714), one or more filtering elements 732, and one or more optical switches (for example, optical switch 734) to feed a primary optical fiber (for example, Primary Fiber 735) or secondary (backup) optical fiber (for example, Secondary Fiber 736) (as well as any number of additional fibers). The headend 701 may differ from the OCML 501 in that the OCML headend 701 may include optical amplifier 724 and optical amplifier 728 instead of including four WDMs and four optical amplifiers used to separate C and L band signals. The OCML headend 701 configuration depicted in FIG. 7 may be used when only one of the C or L band is used for downstream data transmissions and the other band is used for upstream data transmissions (for example, the C band could be used exclusively for downstream transmission and the L band cold be used exclusively for upstream transmissions, or vice versa). The OCML headend 701 configuration depicted in FIG. 7 may also be used when only one of the C or L band is used for both downstream and upstream transmissions. For example, a portion of the C band could be used for downstream transmissions and a portion of the C band could be used for upstream transmissions (the same may apply to only using the L band instead of the C band). Given that only one of the L band or C band is used for downstream and/or upstream transmissions, the OCML headend 701 may only require one amplifier 724 in the downstream direction and one amplifier 728 in the upstream direction. This may be because signals in only one band may need amplification in the OCML headend 701 instead of amplifying both C and L band signals in the OCML 501. The OCML headend 701 may also differ from OCML 501 in instances where only one of the C band or L band is used for both downstream and upstream transmissions. The OCML headend 201 may differ in these instances in that DWDM 702 may include twenty-four downstream transponders 790 and twenty-four upstream transponders 788 (however, any other number of downstream and/or upstream transponders may be used in OCML headend 701 as well).

Figure 9A:
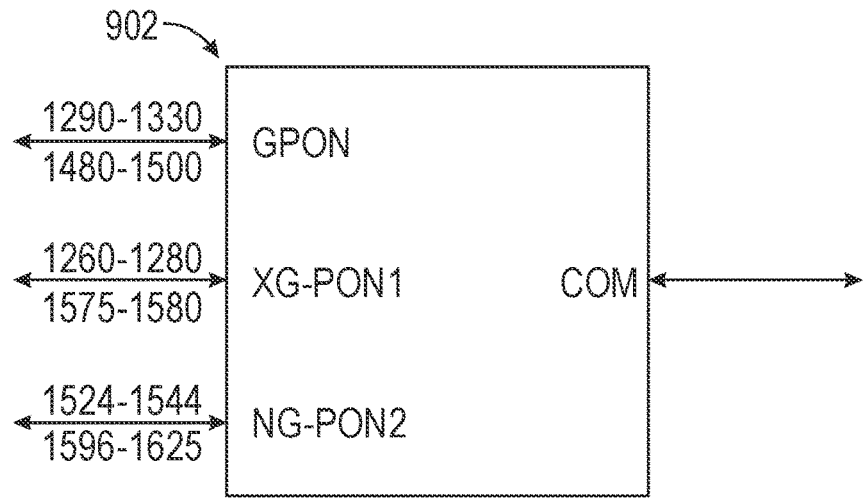
FIGS. 9A-9C depict example embodiments of a filtering component of the OCML, in accordance with the disclosure.
Figure 9B:
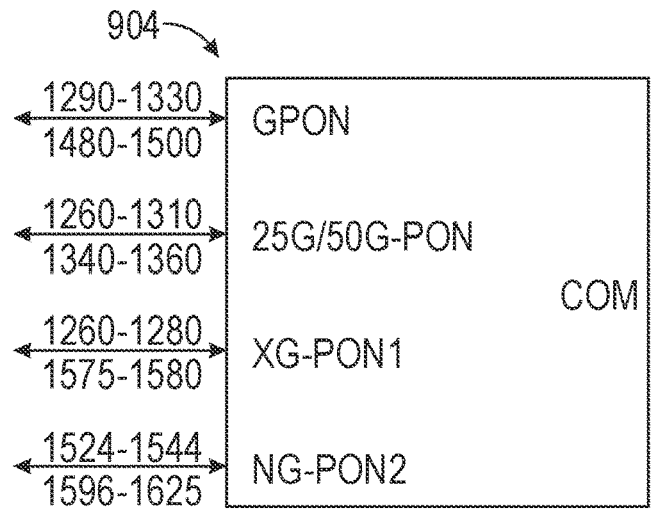
Figure 9C:
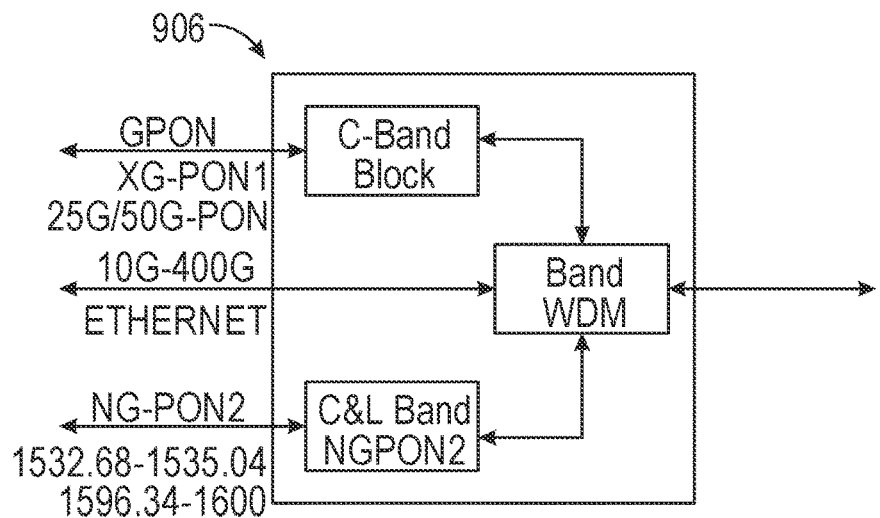

FIGS. 9A-9C depict example embodiments of a filtering component of the OCML (for example, coexistence filtering element 532 or coexistence filtering element 632), in accordance with the disclosure. FIG. 9A may depict a first example embodiment of the filtering element 902. The filtering element 902 may receive as inputs various signal types (for example, GPON, XG-PON1, and/or NG-PON2 signals) and may output the signals on a common port. The signal inputs may be filtered so that only signals in the desired wavelength ranges for the individual signal types may be passed through the filtering element 902. For example, the filtering element 902 may allow wavelengths in the range of 1290-1300 nm and 1480-1500 nm to pass through for GPON signals, wavelengths in the range of 1260-1280 nm and 1575-1580 nm to pass through for XG-PON1 signals, and wavelengths in the range of 1524-1544 nm and 1596-1625 nm to pass through for NG-PON2 signals. FIG. 9B may depict a second example embodiment of a filtering element 904. The filtering element 904 may be similar to filtering element 904, but may also include 25 G/50 G-PON signals as inputs to be filtered by the filtering element 904 as well. FIG. 9C may depict a third example embodiment of a filtering element 906. The filtering element 906 may differ from the filtering element 902 and/or filtering element 904 in that filtering element 906 may include a C-band wavelength filter for GPON, XG-PON1, and/or 25G/50G-PON signal inputs.

Figure 10:
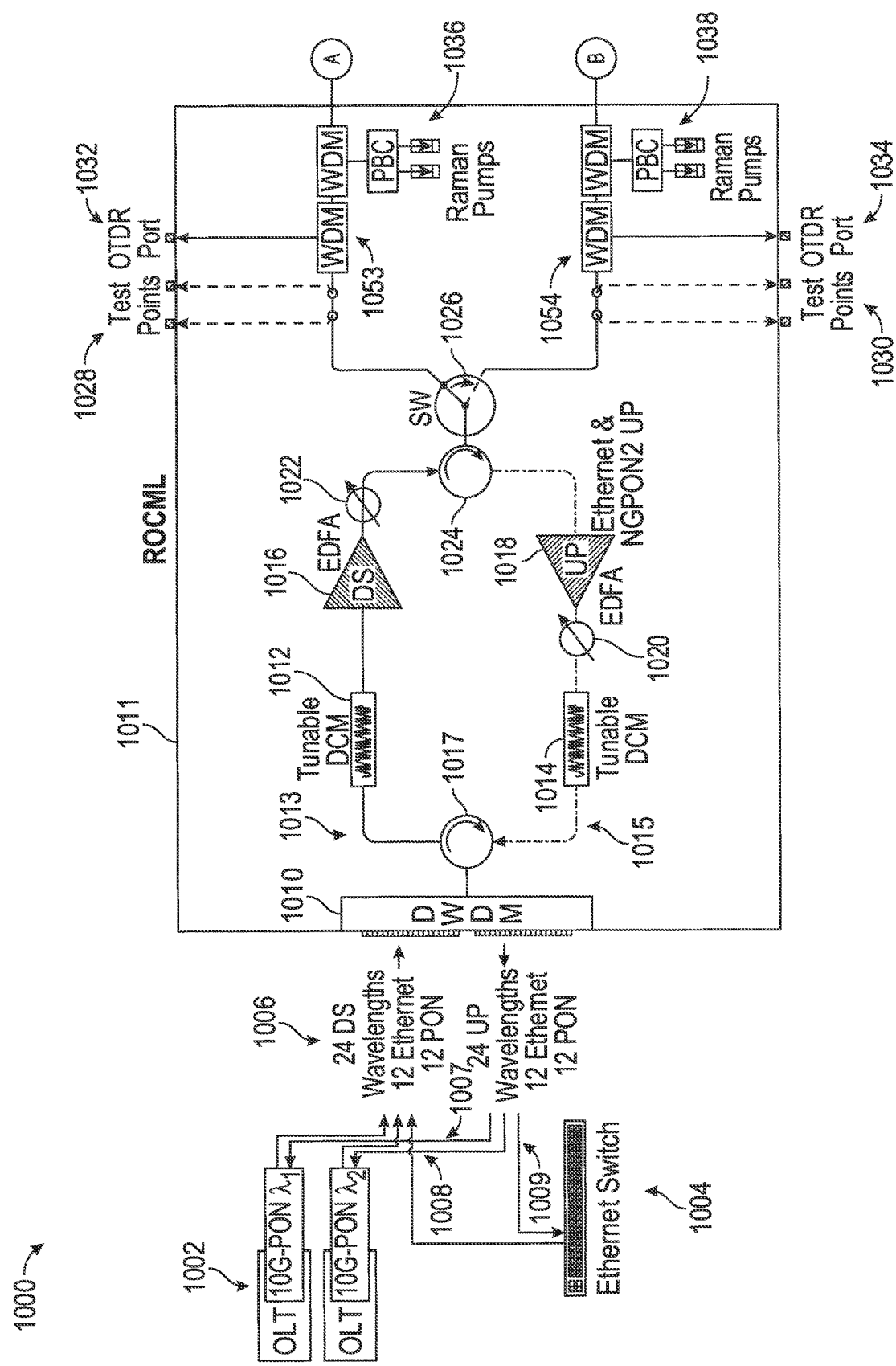
FIG. 10 depicts an example Optical Communications Module Link (OCML) Extender, in accordance with the disclosure.

FIG. 10 depicts an example Optical Communications Module Link (OCML) Extender 1011, in accordance with the disclosure. The OCML 1011 may be a part of an overall system 1000. In some embodiments, the system 1000 may be a network that may involve at least Ethernet and PON signal transmissions. The OCML 1011 included within the system may be similar to OCML 101 depicted in FIG. 1A, but may involve transmitting both Ethernet and PON signals only over the C band in both the downstream and upstream directions. In this manner, the OCML 1011 may include a DWDM 1010 that receives as inputs both Ethernet signals and PON signals. This is in contrast to the configuration of OCML 101 of FIG. 1A in which PON signals are received by a multiplexer 110 that is separate from the DWDM 119 that receives the Ethernet signals.

The system 1000 may include an OCML 1011, one or more optical line termination (OLT) devices 1002 located at a central office, and/or a MDM 1045. In some embodiments, the OCML 1011 described herein may be a single module that is capable of transmitting PON signals received from the one or more OLTs and Ethernet signals received from an Ethernet switch along a single downstream path (for example, a downstream path 1013) to the MDM 1045. The Ethernet and/or PON signals may then be provided to one or more customer devices in the network (not depicted in the figure). The OCML 1011 is also capable of receiving upstream PON and Ethernet signals from the MDM 1045 (which may receive the signals from the customer devices) and transmitting the upstream PON and Ethernet signals to the one or more OLTs 1002 and the one or more Ethernet switches 1004 respectively. The OCML 1011 as described herein is capable of transmitting both the PON and Ethernet signals without the use of a separate amplification module. This reduces the complexity of the system 1000 used for transmitting PON and Ethernet signals through the network.

In some embodiments, as mentioned above, the OCML 1011 may include a single downstream path 1013 for transmitting PON signals 1006. The PON signals 1006 may be received from one or more optical line termination (OLT) devices 1002. For exmaple, the OLT devices 1002 may be included at a central office that is located upstream in a network relative to the OCML 1011, the MDM 1045, and any customer devices (not depicted in the figure). The OLT devices 1002 may also be located at any other location within the network as well. The PON signals 1006 may be received at a DWDM 1010 of the OCML 1011. The DWDM 1010 may be a device that may receive multiple inputs (for example, the PON signals 1006) and combine them into a single output (for example, an output signal including all of the received PON signals 1006). For example, the combined signal may include each of the received PON signals 1006 occupying different wavelengths within a given range of wavelengths. For example, the downstream path 1013 may include transmissions over the C band, which may include wavelengths in the range from approximately 1530-1565 nm (specific examples of wavelengths that may be used for downstream and upstream transmissions of PON signals and Ethernet signals, described below, are provided with respect to FIGS. 11A-11B). However, any other wavelengths may also be used as well. Combining the PON signals 1006 into a combined PON signal using the DWDM 1010 may allow multiple PON signals received as inputs at the OCML 1011 from multiple OLTs to be transmitted over a single fiber through the OCML 1011 and downstream through the network to the MDM 1045.

Similarly, one or more Ethernet signals 1007 may also be received by the DWDM 1010 as well. That is, the OCML 1011 may be configured to receive both the one or more PON signals 1006 and the one or more Ethernet signals 1007 at the same DWDM 1010, and may also be configured to transmit the one or more PON signals 1006 and the one or more Ethernet signals 1007 along the same downstream path 1013 (for example, the same fiber). The Ethernet signals 1007 may be received from one or more Ethernet switches 1004. For example, the Ethernet switches 1004 may be included at a central office that is located upstream in a network relative to the OCML 1011, the MDM 1045, and any customer devices (not depicted in the figure). The one or more Ethernet switches 1004 may also be located at any other location within the network.

From the DWDM 1010, the PON signals and/or Ethernet signals may optionally be transmitted to a dispersion compensation module (DCM) 1012. However, in some cases, the DCM 1012 may not be included within the OCML 1011. The DCM 1012 may be used to compensate for dispersion that PON signals and/or Ethernet signals may experience. In some embodiments, DCM 1012 may be configured to balance positive and/or negative dispersion that may be introduced to the PON signals and/or Ethernet signals by the fiber. In some embodiments, DCM 1012 may be configured to compensate for positive (temporal broadening of the egress optical data signal) and/or negative (temporal contraction of the egress optical data signal) dispersion introduced by fiber, to reduce the sensitivity or OSNR levels of a transceiver in a DWDM 1046 located at a field hub or outside plant. More specifically, DCM 1012 may be configured to reduce the sensitivity or OSNR level requirement in a photodetector or fiber-optic sensor in the transceiver, which may drastically reduce the cost of the transceivers used in the DWDM 1046 located at the field hub or outside plant. Additionally, the DCM 1012 may also be tunable. That is, the DCM 1012 can be tuned based on the transmission distance of a signal. For example, if a signal is being transmitted over a 60 km fiber, the tunable DCM 1012 may be tuned differently than if the signal were being transmitted over a 5 km fiber. The tunable DCM 1012 may be a Fiber Bragg Grating (FBG) type DCM previously described. Submitting the tunable DCM 1012 (for example, the FBG) to a temperature gradient may allow a grating chirp to be changed and, accordingly, the dispersion level of the tunable DCM 1012 to be tuned. Seven single gratings can be used for producing negative dispersion over a typical range from −800 to −2000 ps/nm or for producing a similar positive dispersion range. This means that the fiber link can be totally managed for dispersion for all distances which may range from 5 km to 60 km, or even greater distances.

From the DCM 1012 (if applicable), the PON signals and/or Ethernet signals may be transmitted to an amplifier 1016 (which may be a downstream (DS) amplifier). The amplifier 1016, as well as any other amplifiers described herein, may allow operation over a full transmission spectrum, which may include at least 48 transmission channels (or any other number of channels). That is, the amplifier 1016 may be a wide-band amplifier. Specifically, the amplifier 1016 may be an Erbium-Doped Fiber Amplifier (EDFA), a semiconductor amplifier, or any other type of amplifier. Additionally, in some cases, the amplifier 1016 may be a C band amplifier. To support 48 channels (or any other number of channels), the amplifier 1016 may optimize gain flatness and noise for the broader channel range (for example, 40 channels included with some of the other OCML systems described herein to 48 channels in OCML 101). A gain of the amplifier 1016 may be based at least in part on a distance that a downstream signal has to travel. For example, the gain may be a function of a fiber attenuation coefficient a, which is a measure of the intensity of the attenuation of a beam of light as it traverses a length of an optical fiber segment. The unit of measurement of the fiber attenuation coefficient is decibels (dB) per km (dB/km). For instance, the gain of amplifier 1016 may be adjusted based at least in part on the attenuation coefficient and length of fiber that the egress optical data signal will travel. More specifically, in some instances, the gain of amplifier 1016 may be $G=e^{(2\alpha L)}$, where a is the fiber attenuation coefficient, as explained above, and L is the length of the fiber (for example, the length of primary fiber 1040 and/or the length of secondary fiber 1042).

From the amplifier 1016, the PON signals and/or Ethernet signals may be transmitted to variable optical attenuator (VOA) 1022. VOA 1022 may receive the PON signals and/or Ethernet signals as an input, and may be used to reduce the power levels of the PON signals and/or Ethernet signals. The power reduction may done by absorption, reflection, diffusion, scattering, deflection, diffraction, and dispersion, of the amplified downstream optical data signals. VOA 1022 may have a working wavelength range in which it absorbs all light energy equally. In some embodiments, VOA 1022 may utilize a length of high-loss optical fiber that operates upon its input optical signal power level in such a way that its output signal power level is less than the input level. The variability of the output power level of VOA 1022 may be achieved using a fiber coupler, where some of the power is not sent to the port that outputs, but to another port. Another possibility may be to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 1022 may be based on some piece of doped fiber, exhibiting absorption within a certain wavelength range. The VOA 1022 may also be tuned in synchronization with any of the tunable DCMs (for example, DCM 1012). That is the tunable DCMs and the VOA 1022 may be tuned for the same transmission distance. It should be noted that while the figure may only show VOA(s) as being associated with the downstream Ethernet signals. However, VOAs may also be used for downstream PON signals and the upstream Ethernet/PON signals for better control and optimization of optical receive power levels.

From VOA 1022, the multi-wavelength downstream optical data signal may be transmitted to circulator 1024 (which may also be a WDM). Circulator 1024 may function similarly to circulator 1017. The circulator 1024 may allow additional optical wavelengths to be utilized (for example, the full array of wavelengths included in the 48 total channels, or any other number of channels) and may enable technologies such as Quasi-Coherent and PAM4 (where the downstream and upstream wavelengths may be closer together) to be transported in an OCML-MDM infrastructure. The circulator 1024 may enable the use of the same wavelength for both downstream and upstream and upstream purposes. Circulators may be one-directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. Circulator 1024 may be a round baud single or dual-stage circulator.

From the circulator 1024, the PON and/or Ethernet signals may then be transmitted to an optical switch 1026. The optical switch 1026 may connect the circulator 1024, and/or any other element of the OCML 1011, to a primary optical fiber 1040, which effectively may connect the OCML 1011 passive circuit to the outside plant. The optical switch 1026 may also connect the circulator 1024, and/or any other element of the OCML 1011 circuit, to a secondary optical fiber 1042 connecting the OCML 1011 passive circuit to the outside plant. The optical switch 1026 may be in a first position that connects the circulator 1024 to the primary optical fiber 1040, and may be in a second position that connects the circulator 1024 to the secondary optical fiber 1042. The optical switch 1026 may be in the second position when the primary optical fiber 1040 is disconnected or unresponsive. Any number of additional optical fibers may be connected to the optical switch 1026 as well.

Additionally, the primary optical fiber 1040 and second optical fiber 1042 may include one or more test points and/or one or more Optical Time Domain Reflectometry (OTDR) ports (for example, primary optical fiber 1040 may include one or more test points 1028 and/or OTDR port 1032, and secondary optical fiber 1042 may include one or more test points 1030 and/or OTDR port 1034). The test points may be used for monitoring downstream and upstream signals being transmitted over the primary fiber 1040 and/or secondary fiber 1042. The OTDR ports may allow for continuous monitoring of fibers in the presence of data for fiber degradation or fiber cuts. If a fiber cut happens, the OTDR may enable the location to be determined immediately, significantly reducing outages. OTDR functionality may be enabled via a WDM (for example, WDM 1053 and/or WDM 1054) and an external port (for example, the OTDR ports 1032 and/or 1034) on the OCML 1011 for injecting an OTDR signal (which may be, for example, 1625 or 1650 nm, or any other wavelength). The WDMs may be located after the optical switch 1026, so the OTDR monitoring is independent of which link is carrying downstream traffic. Both the links may always have upstream traffic present, (for example, an MDM 1045 may incorporate a 50% splitter, which splits the upstream signal evenly between the primary and secondary fiber). The OCML's OTDR injection ports may be specified with a degree of required isolation between the OTDR's wavelengths and traffic-bearing C-band wavelengths (or any other wavelengths). This traffic could be 10 G or Coherent 100 G/200 G/400 G, for example, as well as any other types of network traffic. The additional insertion loss is associated with the components required to inject the OTDR pulse and to protect transmit/receive equipment from the backscattered or transmitted OTDR signals. The additional insertion losses may be ≤0.5 dB (and/or any other insertion losses) and thus can be easily accommodated within the system link budget.

In some embodiments, the one or more PON signals and/or Ethernet signals output to the primary fiber 1040 and/or secondary fiber 1042 may be transmitted to the MDM 1045. The PON and/or Ethernet signals may then be received at optical splitter 1044 as an ingress optical data signal. Optical splitter 1044 may also be referred to as a beam splitter, and may comprise one or more quartz substrates of an integrated waveguide optical power distribution device. However, optical splitter 1044 may also be any other type of optical splitter as well. Optical splitter 1044 may be a passive optical network device. It may be an optical fiber tandem device comprising one or more input terminals and one or more output terminals. Optical splitter 1044 may be Fused Biconical Taper (FBT) splitter or Planar Lightwave Circuit (PLC) splitter. Optical splitter 1044 may be a balanced splitter wherein optical splitter 1044 comprises two input fibers and one or more output fibers over which the ingress optical data signal may be spread proportionally. In some embodiments, the ingress optical data signal may not be spread proportionally across the output fibers of optical splitter 1044. In some embodiments, optical splitter 1044 may comprise two input fibers and two output fibers. A first input fiber of optical splitter 1044 may be connected to primary fiber 1040 and a second input fiber of optical splitter 1044 may be connected to secondary fiber 1042.

The output fiber of optical splitter 1044 may be connected to a DWDM 1046. The DWDM 1046 may be similar to DWDM 1010 or any other coexistence filter element described herein. Because the downstream signals may be multi-wavelength downstream optical data signals, including both multiple PON signals and multiple Ethernet signals, the DWDM 1046 may receive one or more PON signals and one or more Ethernet signals. The DWDM 1046 may then demultiplex the one or more PON signals and one or more Ethernet signals from combined signals into the original multiple PON signals and Ethernet signals received at the OCML 1011. For example, the DWDM 1046 may receive the combined PON signal from the optical splitter 1044 and may demultiplex the combined PON signal into the original one or more PON signals received by the OCML 1011 at the DWDM 1010 from the one or more OLTs. The MDM 1045 may then output the one or more PON signals as one or more output PON signals (for example, output PON signals 1050. Similarly, the DWDM 1046 may receive the Ethernet signals from the optical splitter 1044 and may demultiplex the multi-wavelength downstream optical data signal into the original one or more Ethernet signals 1008 received by the OCML 1011 at the DWDM 1010 from the Ethernet switch 1004. The MDM 1045 may then output the one or more Ethernet signals as one or more output Ethernet signals 1502. In this manner, the one or more PON signals and one or more Ethernet signals may be transmitted across a network using a single OCML 1011 over a single fiber (for example, primary fiber 1040 and/or secondary fiber 1042 without having to use additional modules for amplification purposes).

The above description of FIG. 10 may correspond to signals (for example, the one or more PON signals and/or the one or more Ethernet signals) being transmitted in the downstream direction (for example, from the one or more OLTs and the Ethernet switch to the MDM 1045). Similarly, signals may be transmitted in the upstream direction (for example, from the MDM 1045 back upstream to the one or more OLTs 1002 and the one or more Ethernet switches 1004).

Beginning with PON signals, the MDM 1045 may receive one or more upstream PON signals at the DWDM 1046. In some cases, the upstream PON signals may be received at the same wavelengths associated with the one or more output PON signals described above. Examples of wavelengths that may be reserved for downstream and/or upstream PON and/or Ethernet signal transmissions may be provided with respect to FIGS. 11A-11B. The upstream PON signals may then be multiplexed by the DWDM 1046, which may output a combined upstream PON signal, and may transmit the combined upstream PON signal to the optical spliter 1044. The DWDM 1046 may similarly receive one or more upstream Ethernet signals 1052. The DWDM 1046 may also multiplex the upstream Ethernet signals 1502 and output a combined upstream Ethernet signal to the optical splitter 1044. The optical splitter 142 may then transmit the combined upstream Ethernet signal and combined upstream PON signals over a single fiber (for example, the primary optical fiber 1040 or the secondary optical fiber 1042). Reference to separate "combined PON signals" and "combined Ethernet signals" may simply mean that PON signals and Ethernet signals may be transmitted over different wavelengths on the same fiber. Thus, the system 1000 involves transmission of PON signals and Ethernet signals over the same optical fiber in both the downstream and upstream directions.

From the MDM 1045, the combined upstream Ethernet signal and combined upstream PON signal may be received by the OCML 1011. In the upstream direction, the OCML 1011 may use one or more Raman pumps (for example, one or more Raman pumps 1036 associated with the primary optical fiber 1040 and/or one or more Raman pumps 1038 associated with the secondary optical fiber 1042. Several Raman pumps with wavelengths and power levels optimized for maximum gain can be utilized. For instance, shorter links (<40 km) may only need two pumps, while longer (+60 m) links may utilize three pumps. The pump power and wavelengths may be chosen to maximize gain in the upstream C band signals used for the ethernet and NGPON2 in the ROCML configuration. The combined upstream Ethernet signal and combined upstream PON signal may then be provided to the WDM 1036 or the WDM 1034 (depending on the fiber that is used to transmit the combined upstream Ethernet signal and combined upstream PON signal from the MDM 1045 to the OCML 1011), and the combined upstream Ethernet signal and combined upstream PON signal may then be provided to the optical switch 1026.

From the optical switch 1026, the upstream Ethernet signals and/or PON signals may be provided to circulator 1024. From the circulator 1024, the upstream Ethernet signals and/or PON signals may follow an upstream path 1015 through the OCML 1011. That is, from the circulator 1024, the upstream Ethernet signals and/or PON signals may be transmitted to the amplifier 1018. From the amplifier 1018, upstream Ethernet signals and/or PON signals may be transmitted to VOA 1014. From VOA 1014, upstream Ethernet signals and/or PON signals may be transmitted to DCM 1014 (which may function similarly to optional DCM 1012). From the DCM 1014, the upstream Ethernet signals and/or PON signals may be transmitted to the circulator 1017 and from the circulator 1017 back to the DWDM 1010. The DWDM 1010 may then demultiplex the upstream Ethernet signals and/or PON signals into the original one or more upstream Ethernet signals and the one or more upstream PON signals received at the MDM 1045. These demultiplexed signals may then be output back to the one or more OLTs 1002 and the one or more Ethernet switches 1004. For example, the DWDM 1010 may demultiplex the upstream Ethernet signal and output one or more upstream output Ethernet signals 1009 to the one or more Ethernet switch 1004. Likewise, the DWDM 1010 may demultiplex the combined upstream PON signal and output one or more upstream output PON signals 1008 to the one or more OLTs 1002. In this manner, as mentioned above, both Ethernet and PON signals may be transmitted across a network in the downstream and upstream directions using a single OCML 1011 that may provide sufficient amplification for the Ethernet, and PON signals through the use of the one or more Raman pumps in the upstream direction.

FIGS. 11I-11B depict example transmissions wavelengths, in accordance with the disclosure. Particularly, FIGS. 11A-11B illustrates two configurations (for example, a first configuration shown in first table 1100 and a second configuration shown in second table 1110) of wavelengths reserved for Ethernet and PON signals in the downstream and upstream direction through a network. The first table 1100, and second table 1110, show that the Ethernet and PON signals may share wavelengths included in the C band. Particularly, there may be 48 wavelengths in the C band, and 24 of these wavelengths may be reserved for downstream transmissions and 24 wavelengths may be reserved for upstream transmissions. Of the 24 downstream and upstream wavelengths, 12 may be reserved for PON signals, and 12 may be reserved for Ethernet signals. However, this is not intended to be limiting and any other number of wavelengths may be used for either of the signal types in either the downstream or upstream direction.

The first table 1100 shows a first example configuration of wavelengths for the downstream and upstream Ethernet and PON signals transmitted by the OCML 1011. For example, table 1100 shows that certain wavelengths between 1527.99 and 1545.32 may be reserved for PON signal trasnmissions in the downstream direction, and wavelengths between 1528.77 and 1546.12 may be reserved for PON signal transmissions in the upstream direction. Table 1100 also shows that certain wavelengths between 1546.92 and 1564.68 may be reserved for Ethernet signal trasnmissions in the downstream direction, and wavelengths between 1547.72 and 1565.5 may be reserved for Ethernet signal transmissions in the upstream direction. More specific wavelengths that may be used for these downstream and upstream PON and Ethernet signal transmissions may be listed in the first table 1100.

The second table 1110 shows a second example configuration of wavelengths for the downstream and upstream Ethernet and PON signals transmitted by the OCML 1011. For example, table 1110 shows that certain wavelengths between 1537.4 and 1546.92 may be reserved for PON signal trasnmissions in the downstream direction, and wavelengths between 1527.99 and 1536.61 may be reserved for PON signal transmissions in the upstream direction. Table 1110 also shows that certain wavelengths between 1557.36 and 1566.31 may be reserved for Ethernet signal trasnmissions in the downstream direction, and wavelengths between 1547.72 and 1556.56 may be reserved for Ethernet signal transmissions in the upstream direction. Specific wavelengths that may be used for these downstream and upstream PON and Ethernet signal transmissions may be listed in the second table 1110.

The first example configuration shown in table 1100 and second example configuration shown in table 1110 are merely intended to exemplify some of the different wavelengths that may be reserved for PON and Ethernet transmissions using the OCML 1011 described herein and are not intended to be limiting in any way. Any other combination of wavelengths may also be used for the Ethernet and PON signal transmissions in either the downstream or upstream direction.

Figure 12A:
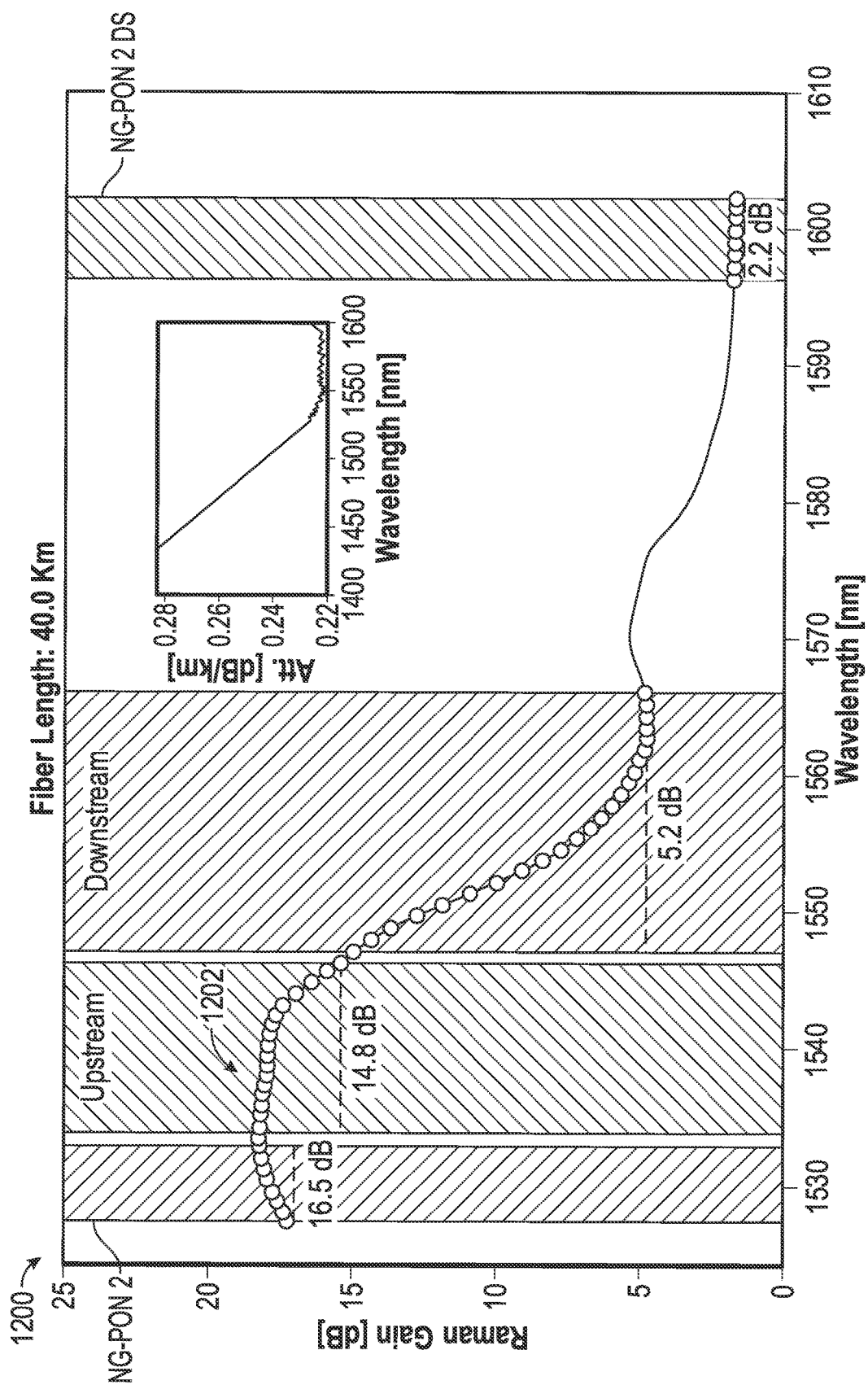
FIGS. 12A-12B depict example Raman pump gain plots, in accordance with the disclosure.
Figure 12B:
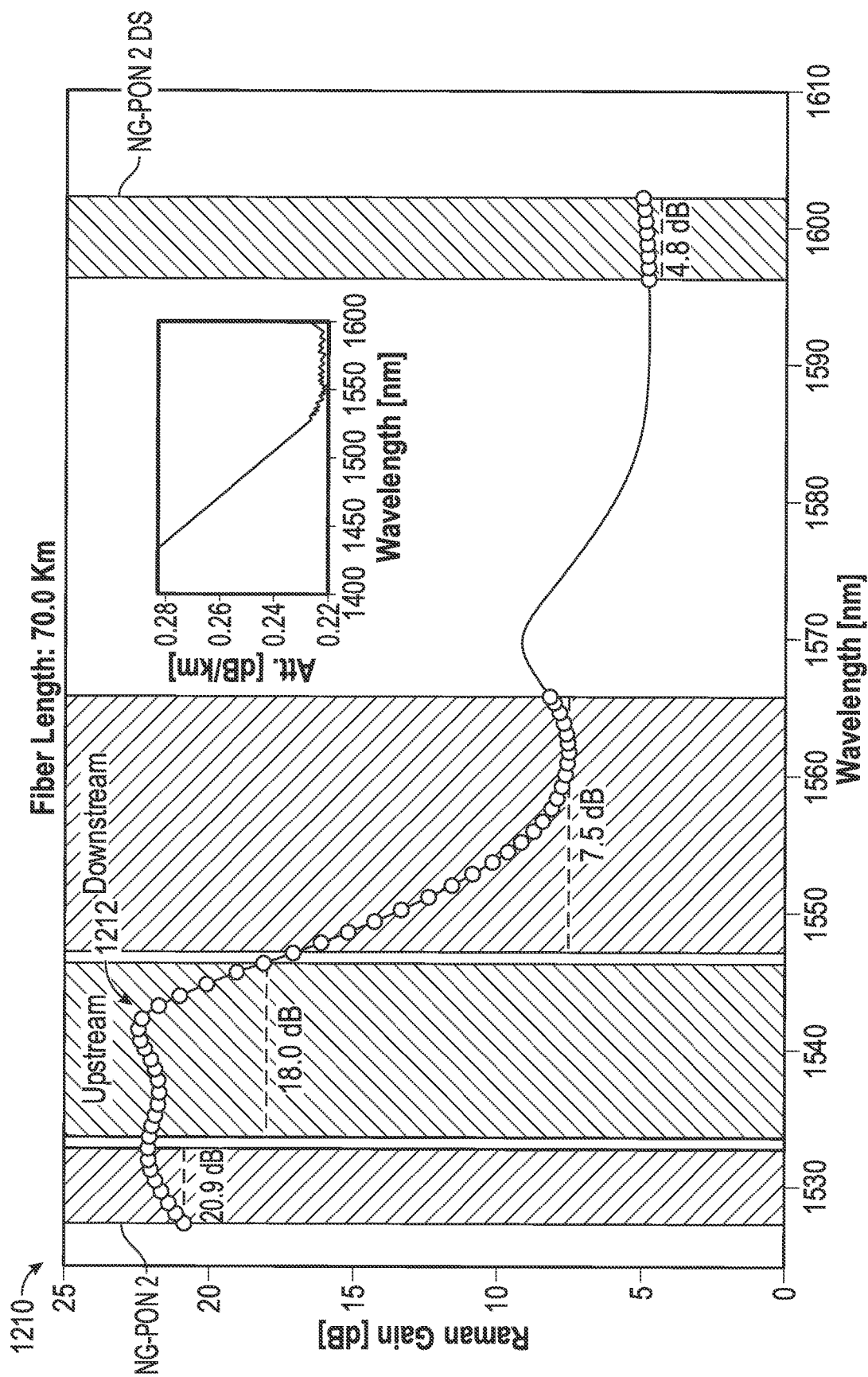

FIGS. 12A-12B depict example Raman pump gain plots (for example, plot 1200 and plot 1210), in accordance with the disclosure. Particularly, the plots may show gain profiles for any Raman pumps that are used in the OCML 1011 (and/or any other OCML described herein), such as Raman pumps 1036 and 1038, for example. In one or more embodiments, the gain of the one or more Raman pumps may be configured such that the gain is maximized in the upstream direction and the gain is also maximized for PON signals in the upstream direction. However, the gain may also be maximized for Ethernet signals as well (and may be maximized in the downstream direction). The points of maximum gain may be shown as first portion 1202 of plot 1200 and second portion 1212 of plot 1210. In some cases, a single Raman pump may provide 10 dB of projected gain and two Raman pumps may provide 16 dB or projected gain (however, any other number of Raman pumps may also be used as well).

Figure 13:
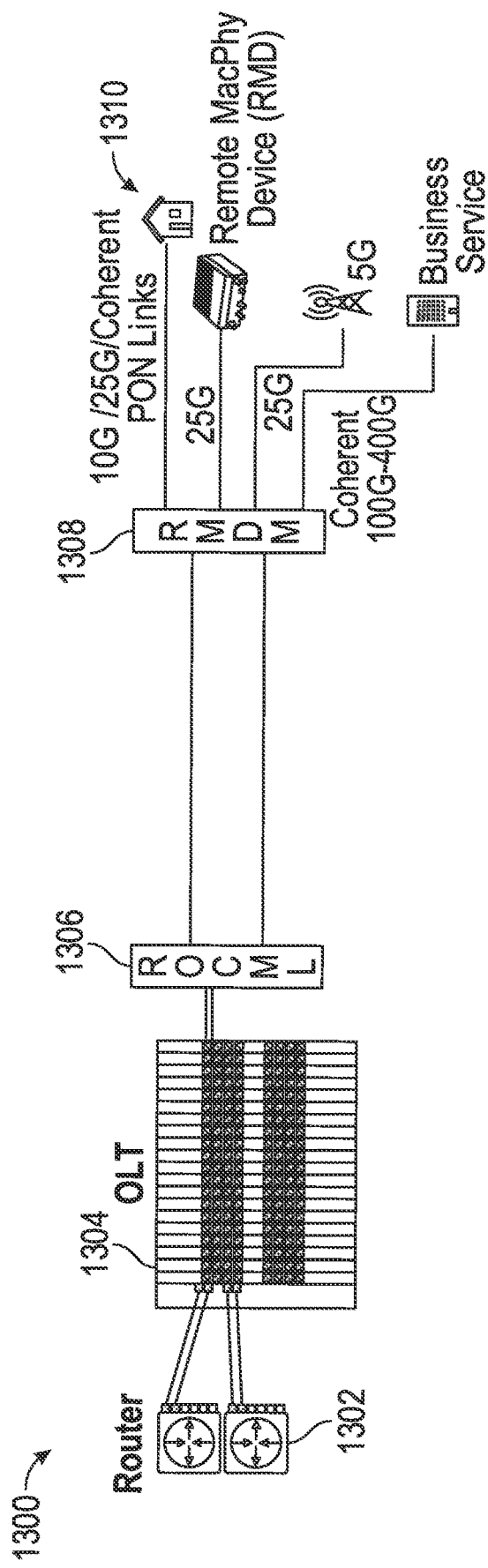
FIG. 13 depicts an example system, in accordance with the disclosure.

FIG. 13 depicts an example system 1300, in accordance with the disclosure. The system 1300 illustrates that a centralized OLT 1304 connected to routers for downstream and/or upstream traffic can be utilized in a network to provide PON services to subscribers up to 80 km away without using remote OLTs in the field. In the figure, the OCML 1306 and the MDM 1308 may be the same as, or similar to, OCML 1011 and MDM 1045. The figure also illustrates an Ethernet 25 G uplink signal to an RMD for DOCSIS 4.0 applications. High-capacity Coherent 100 G-400 G signals can also be used for business services as well as 25G Ethernet signals for 5 G networks, for example.

Figure 14:
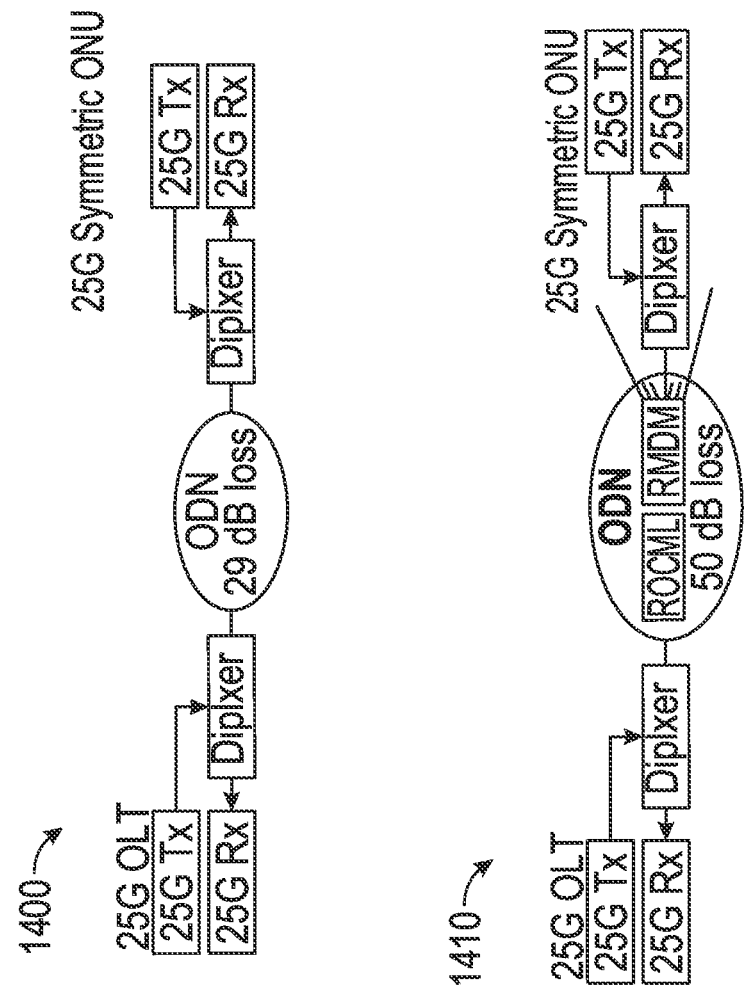
FIG. 14 depicts an example system, in accordance with the disclosure.

FIG. 14 depicts an example system 1410, in accordance with the disclosure. FIG. 14 illustrates a comparison between a conventional 25 GS-PON solution (for example, shown as system 1400) with a 25 G PON "ROCML" network (for example, shown as system 1410). The 25 GS-PON solution may involve a single wavelength network limited to a 29 dB loss budget over short 20 km links, whereas the ROCML PON network extends the reach to 80 km or greater distances utilizing several DWDM wavelengths, with an extended loss budget of greater than 50 dB (or any other loss budget).

Figure 15:
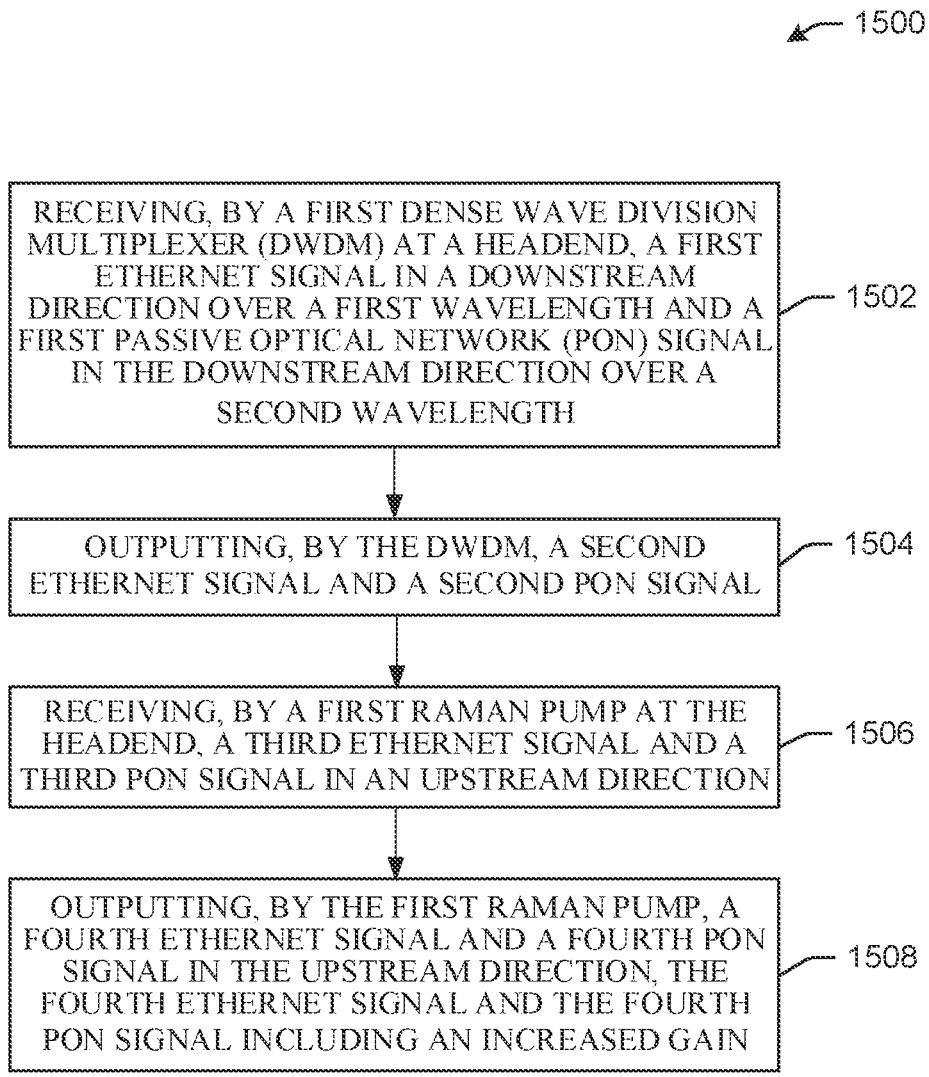
FIG. 15 depicts an example method, in accordance with the disclosure.

FIG. 15 is an example method 1500. Block 1502 of the method may include receiving, by a first dense wave division multiplexer (DWDM) at a headend, a first Ethernet signal in a downstream direction over a first wavelength and a first passive optical network (PON) signal in the downstream direction over a second wavelength. Block 1504 of the method 1500 may include outputting, by the DWDM, a second Ethernet signal and a second PON signal. Block 1506 of the method may include receiving, by a first Raman pump at the headend, a third Ethernet signal and a third PON signal in an upstream direction. Block 1508 of the method 1500 may include outputting, by the first Raman pump, a fourth Ethernet signal and a fourth PON signal in the upstream direction, the fourth Ethernet signal and the fourth PON signal including an increased gain.

In some embodiments, both the first wavelength and the second wavelength are both included within a C band of wavelengths. In some embodiments, the first PON signal is received in the downstream direction from an optical line termination (OLT) system. In some embodiments, the first Ethernet signal is received in the downstream direction from an Ethernet switch. In some embodiments, the method 1500 may further include receiving, by a first circulator or wave division multiplexer (WDM), the second Ethernet signal, and the second PON signal from the first DWDM. The method 1500 may further include outputting, by the first circulator or WDM, a fourth Ethernet signal, and a fourth PON signal. The method 1500 may further include receiving, by a dispersion correction module (DCM), the fourth Ethernet signal and the fourth PON signal. The method 1500 may further include outputting, by the DCM, a fifth Ethernet signal, and a fifth PON signal. The method 1500 may further include receiving, by a first amplifier, the fifth Ethernet signal, and the fifth PON signal. The method 1500 may further include outputting, by the first amplifier, a sixth Ethernet signal, and a sixth PON signal. The method 1500 may further include receiving, by a first variable optical attenuator (VOA), the sixth Ethernet signal and the sixth PON signal. The method 1500 may further include outputting by the first VOA a seventh Ethernet signal and a seventh PON signal. The method 1500 may further include receiving, by a second circulator or WDM, the seventh Ethernet signal, and the seventh PON signal. The method 1500 may further include outputting, by the second circulator or the second WDM, an eighth Ethernet signal, and an eighth PON signal. The method 1500 may further include a second amplifier, a second VOA, and a second tunable DCM in the upstream direction.

Any of the signals described with respect to the method 1500 (for example, first Ethernet signal, second Ethernet signal, first PON signa, second PON signal, etc.) may be the same signals or different signals.

The operations described and depicted in the illustrative process flow of FIG. 15 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 15 may be performed.

Figure 16:
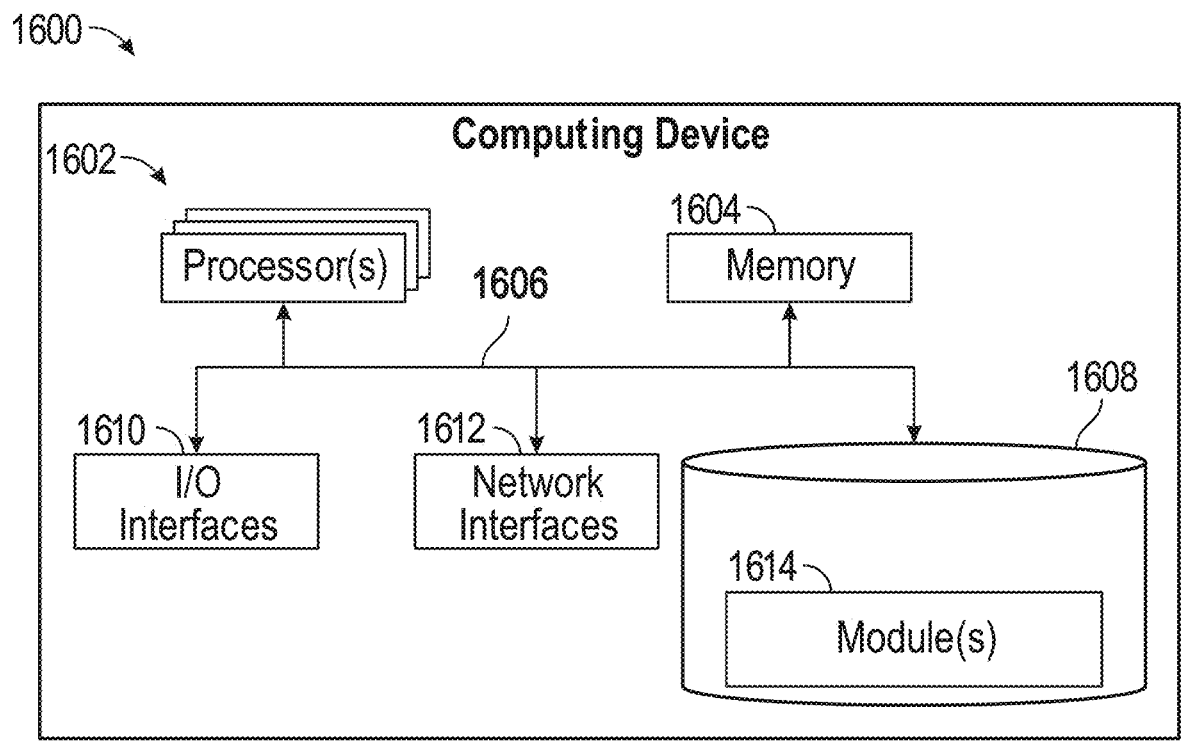
FIG. 16 depicts an example computing system, in accordance with the disclosure.

FIG. 16 illustrates an example computing device 1600, in accordance with one or more embodiments of this disclosure. The computing device 1600 may be representative of any devices described herein that may perform any active processing operations. The computing device 1600 may include at least one processor 1602 that executes instructions that are stored in one or more memory devices (referred to as memory 1604). The instructions can be, for instance, instructions for implementing the functionality described as being carried out by one or more modules and systems disclosed above or instructions for implementing one or more of the methods disclosed above. The processor(s) 1602 can be embodied in, for example, a CPU, multiple CPUs, a GPU, multiple GPUs, a TPU, multiple TPUs, a multi-core processor, a combination thereof, and the like. In some embodiments, the processor(s) 1602 can be arranged in a single processing device. In other embodiments, the processor(s) 1602 can be distributed across two or more processing devices (for example, multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory.

Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (for example, manufactured) to perform the functions described herein.

The processor(s) 1602 can access the memory 1604 by means of a communication architecture 1606 (for example, a system bus). The communication architecture 1606 may be suitable for the particular arrangement (localized or distributed) and type of the processor(s) 1602. In some embodiments, the communication architecture 1606 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms, such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 1604 can also retain data.

Each computing device 1600 also can include mass storage 1608 that is accessible by the processor(s) 1602 by means of the communication architecture 1606. The mass storage 1608 can include machine-accessible instructions (for example, computer-readable instructions and/or computer-executable instructions). In some embodiments, the machine-accessible instructions may be encoded in the mass storage 1608 and can be arranged in components that can be built (for example, linked and compiled) and retained in computer-executable form in the mass storage 1608 or in one or more other machine-accessible non-transitory storage media included in the computing device 1600. Such components can embody, or can constitute, one or many of the various modules disclosed herein. Execution of the modules, individually or in combination, by at least one of the processor(s) 1602, can cause the computing device 1600 to perform any of the operations described herein.

Each computing device 1600 can also include one or more input/output interface devices 1610 (referred to as I/O interface 1610) that can permit or otherwise facilitate external devices to communicate with the computing device 1600. For instance, the I/O interface 1610 may be used to receive and send data and/or instructions from and to an external computing device.

The computing device 1600 also includes one or more network interface devices 1612 (referred to as network interface(s) 1612) that can permit or otherwise facilitate functionally coupling the computing device 1600 with one or more external devices. Functionally coupling the computing device 1600 to an external device can include establishing a wireline connection or a wireless connection between the computing device 1600 and the external device. The network interface device 1612 can include one or many antennas and a communication processing device that can permit wireless communication between the computing device 1600 and another external device. For example, between a vehicle and a smart infrastructure system, between two smart infrastructure systems, etc. Such a communication processing device can process data according to defined protocols of one or several radio technologies. The radio technologies can include, for example, 3 G, Long Term Evolution (LTE), LTE-Advanced, 5 G, IEEE 802.11, IEEE 802.11, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 612 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit" can be utilized interchangeably and can be generically referred to as functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (for example, data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (for example, data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any method or technology for storage of information, such as machine-accessible instructions (for example, computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. An optical communication module link extender (OCML) system comprising:
   a first dense wave division multiplexer (DWDM) at a headend, wherein the first DWDM is configured to receive a first Ethernet signal in a downstream direction over a first wavelength and output a second Ethernet signal, wherein the first DWDM is further configured to receive a first passive optical network (PON) signal in the downstream direction over a second wavelength and output a second PON signal;
   a first circulator or wave division multiplexer (WDM) configured to receive the second Ethernet signal and the second PON signal from the first DWDM and output a third Ethernet signal and a third PON signal;
   a dispersion correction module (DCM) configured to receive the third Ethernet signal and the third PON signal and output a fourth Ethernet signal and a fourth PON signal; and
   a first Raman pump at the headend and on a primary fiber or a secondary fiber, the first Raman pump configured to increase a gain of a fifth Ethernet signal and a fifth PON signal in an upstream direction.

2. The system of claim 1, wherein both the first wavelength and the second wavelength are both included within a C band of wavelengths.

3. The system of claim 1, wherein the first DWDM is configured to receive the first PON signal from an optical line termination (OLT) system.

4. The system of claim 1, wherein the first DWDM is configured to receive the first Ethernet signal in the downstream direction from an Ethernet switch.

5. The system of claim 1, further comprising a first amplifier configured to receive the fourth Ethernet signal and the fourth PON signal and output a sixth Ethernet signal and a sixth PON signal.

6. The system of claim 5, further comprising a first variable optical attenuator (VOA) configured to receive the sixth Ethernet signal and the sixth PON signal and output a seventh Ethernet signal and a seventh PON signal.

7. The system of claim 6, further comprising a second circulator or second WDM configured to receive the seventh Ethernet signal and the seventh PON signal and output an eighth Ethernet signal and an eighth PON signal.

8. The system of claim 7, further comprising an optical switch configured to receive the eighth Ethernet signal and the eighth PON signal and output a ninth Ethernet signal and a ninth PON signal over a primary fiber or a secondary fiber to a mode division multiplexer (MDM) system.

9. The system of claim 8, wherein the MDM further comprises an optical splitter configured to receive the first Ethernet signal and the first PON signal, and output the first Ethernet signal and the first PON signal in the downstream direction to a second DWDM.

10. The system of claim 1, further comprising an amplifier, a VOA, and a tunable DCM in the upstream direction.

11. A method comprising:
    receiving, by a first dense wave division multiplexer (DWDM) at a headend, a first Ethernet signal in a downstream direction over a first wavelength and a first passive optical network (PON) signal in the downstream direction over a second wavelength;
    outputting, by the DWDM, a second Ethernet signal and a second PON signal;
    receiving, by a first circulator or wave division multiplexer (WDM), the second Ethernet signal, and the second PON signal from the first DWDM;
    outputting, by the first circulator or WDM, a third Ethernet signal, and a third PON signal;
    receiving, by a dispersion correction module (DCM), the third Ethernet signal and the third PON signal;
    outputting, by the DCM, a fourth Ethernet signal, and a fourth PON signal;
    receiving, by a first Raman pump at the headend, a fifth Ethernet signal and a fifth PON signal in an upstream direction; and
    outputting, by the first Raman pump, a sixth Ethernet signal, and a sixth PON signal in the upstream direction, the sixth Ethernet signal and the sixth PON signal including an increased gain.

12. The method of claim 11, wherein both the first wavelength and the second wavelength are both included within a C band of wavelengths.

13. The method of claim 11, wherein the first PON signal is received in the downstream direction from an optical line termination (OLT) system.

14. The method of claim 11, wherein the first Ethernet signal is received in the downstream direction from an Ethernet switch.

15. The method of claim 11, further comprising:
    receiving, by a first amplifier, the fourth Ethernet signal, and the fourth PON signal; and
    outputting, by the first amplifier, a seventh Ethernet signal, and a seventh PON signal.

16. The method of claim 15, further comprising:
    receiving, by a first variable optical attenuator (VOA), the seventh Ethernet signal, and the seventh PON signal; and
    outputting, by the first VOA, an eighth Ethernet signal and an eighth PON signal.

17. The method of claim 16, further comprising:
    receiving, by a second circulator or WDM, the eighth Ethernet signal and the eighth PON signal; and
    outputting, by the second circulator or the second WDM, a ninth Ethernet signal, and a ninth PON signal.

18. The method of claim 11, further comprising an amplifier, a VOA, and a tunable DCM in the upstream direction.

* * * * *